(12) United States Patent
Brookhart

(10) Patent No.: US 8,484,043 B2
(45) Date of Patent: Jul. 9, 2013

(54) METHOD AND SYSTEM FOR MEDICAL PROCEDURE ACTIVITY-BASED COSTING AND MARGIN ANALYSIS

(76) Inventor: Duane Brookhart, Montgomery, AL (US)

( * ) Notice: Subject to any disclaimer, the term of this patent is extended or adjusted under 35 U.S.C. 154(b) by 1225 days.

(21) Appl. No.: 11/525,090

(22) Filed: Sep. 22, 2006

(65) Prior Publication Data

US 2007/0067247 A1    Mar. 22, 2007

Related U.S. Application Data

(60) Provisional application No. 60/719,186, filed on Sep. 22, 2005.

(51) Int. Cl.
*G06Q 50/00* (2006.01)

(52) U.S. Cl.
USPC .......................................................... 705/2

(58) Field of Classification Search
USPC ......................................................... 705/2, 3
See application file for complete search history.

(56) References Cited

U.S. PATENT DOCUMENTS

| | | | | |
|---|---|---|---|---|
| 5,819,228 A | * | 10/1998 | Spiro | 705/2 |
| 5,915,241 A | * | 6/1999 | Giannini | 705/2 |
| 2002/0077854 A1 | * | 6/2002 | Porterfield | 705/2 |
| 2002/0082862 A1 | * | 6/2002 | Kelley et al. | 705/2 |
| 2004/0243438 A1 | * | 12/2004 | Mintz | 705/2 |
| 2006/0074712 A1 | * | 4/2006 | Jorgensen et al. | 705/2 |

OTHER PUBLICATIONS

Medicare RBRVS: The Physician's Guide, edited by Mark J. Segal and Rose B. Heald. American Medical Association, Chicago, IL. 1996.

Glass, Kathryn P. and Jeffrey R. Anderson, "Relative Value Units: From A to Z (Part I of IV)", Journal of Medical Practice Mgmt. 17(5): 225-228. Mar./Apr. 2002.
Glass, Kathryn P. and Jeffrey R. Anderson, "Relative Value Units and Productivity: Part 2 of 4", Journal of Medical Practice Management 17(6): 285-290. May/Jun. 2002.
Glass, Kathryn P. and Jeffrey R. Anderson, "Relative Value Units and Cost Analysis, Part 3 of 4", Journal of Medical Practice Management 18(2): 66-70. Sep./Oct. 2002.
Glass, Kathryn P. and Jeffrey R. Anderson, "Relative Value Units: From A to Z (Part 4 of 4)", Journal of Medical Practice Mgmt. 18(3): 120-123. Nov./Dec. 2002.
Income Distribution—Relative Value Units (RVUs). Item 5137, Medical Group Mgmt. Association, Englewood, CO. Sep. 2002.
Glass, Kathryn P. RVUs: Applications for Medical Practice Success. Dubuque, IA by Kendall/Hunt Publishing for Medical Group Mgmt. Assoc. Englewood, Co. 2003.
Berlin, Mark R. and Tommy H. Smith, "Eval. of Activity Based Costing Versus Resource-Based Relative Value Costing", Journal of Med. Practice Mgmt. 19(4):219-227. Jan./Feb. 2004.

(Continued)

*Primary Examiner* — Gerald J. O'Connor
*Assistant Examiner* — Trang Nguyen
(74) *Attorney, Agent, or Firm* — Dickinson Wright PLLC

(57) ABSTRACT

The invention provides a method and system for performing activity-based costing and procedure margin analysis for medical practices. Medical practice costs are allocated across relevant production activity based on procedure-specific, location-specific, modifier-adjusted Relative Value Units. Procedure production volumes, production costs and Payer fees are integrated and analyzed to determine such values as Procedure volumes, Procedure costs, Procedure Margins, Payer Margins and Percent Payer Margins. The results are presented in meaningful reports, tables and graphs, including representations by Practice, Provider, Procedure, and Payer.

13 Claims, 44 Drawing Sheets

Data Organization and Process

OTHER PUBLICATIONS

Resource Based Relative Value Scale: A Comprehensive Guide to Medicare Physician Fee Schedule. Practice Mgmt. Info. Corp. (PMIC), 4727 Wilshire Blvd., LA, CA 90010.2006.

Elliott, Sherry C. "Enhn. Pract. Perf. Using the Res.-Bas. Rel. Val. Sys.". Audio Con., Mar. 25, 2004, spon. by Med. Grp Mgmt. Assoc., 104 Inverne Ter East, Englewood, CO 80112-5305.

Mandolesi, Stephen, "Put Your Contract Under the Fin. Microscope . . . and Find Out What It's Really Worth". Private Payer Contract Solutions presentation in Atlanta, GA on Jul. 21-22, 2005, sponsored by DecisionHealth, 11300 Rockville Pike, Suite 1100, Rockville, MD 20852.

* cited by examiner

WOMEN'S HEALTH CARE ASSOCIATES
PERIOD ENDING 123105 WITH 2005 WEIGHTS

| DOCTOR | MD Work | Practice | Malpractice | Total PLM RVUS |
|---|---|---|---|---|
| Meredith | 14,580 | 12,022 | 2,401 | 29,003 |
|  | 12.0% | 12.3% | 11.7% | 12.1% |
| Jackson | 14,999 | 12,229 | 2,512 | 29,740 |
|  | 12.3% | 12.5% | 12.2% | 12.4% |
| Weimer | 13,087 | 10,483 | 2,189 | 25,759 |
|  | 10.8% | 10.7% | 10.7% | 10.7% |
| Vetter | 12,517 | 9,868 | 1,946 | 24,332 |
|  | 10.3% | 10.1% | 9.5% | 10.1% |
| Lassiter | 11,405 | 9,464 | 1,834 | 22,703 |
|  | 9.4% | 9.7% | 8.9% | 9.5% |
| Davis | 13,517 | 10,693 | 2,434 | 26,643 |
|  | 11.1% | 10.9% | 11.9% | 11.1% |
| Tanner | 14,118 | 10,478 | 2,269 | 26,865 |
|  | 11.6% | 10.7% | 11.1% | 11.2% |
| Goodwin | 8,437 | 6,570 | 1,359 | 16,366 |
|  | 6.9% | 6.7% | 6.6% | 6.8% |
| Andrews | 6,148 | 5,865 | 865 | 12,879 |
|  | 5.1% | 6.0% | 4.2% | 5.4% |
| Pascal | 7,009 | 5,993 | 1,505 | 14,507 |
|  | 5.8% | 6.1% | 7.3% | 6.0% |
| Bates | 5,060 | 4,053 | 1,091 | 10,204 |
|  | 4.2% | 4.1% | 5.3% | 4.3% |
| Other | 611 | 264 | 126 | 1,000 |
|  | .5% | .3% | .6% | .4% |
| Total | 121,488 | 97,982 | 20,531 | 240,001 |
|  | 100.0% | 100.0% | 100.0% | 100.0% |

Figure 2A

WOMEN'S HEALTH CARE ASSOCIATES
PAYER MIX BY PLM RVUS
PERIOD ENDING 123105 WITH 2005 WEIGHTS

| INSURANCE | PLM RVUS |
|---|---|
| BLUE CROSS | 113,532 |
|  | 47.3% |
| MEDICAID | 45,083 |
|  | 18.8% |
| SELF PAY | 30,923 |
|  | 12.9% |
| TRICARE | 21,768 |
|  | 9.1% |
| OTHER | 12,626 |
|  | 5.3% |
| MEDICARE | 6,227 |
|  | 2.6% |
| UNITED HC | 6,040 |
|  | 2.5% |
| FAMILY CLINIC | 2,791 |
|  | 1.2% |
| CIGNA | 1,011 |
|  | .4% |
| Total | 240,001 |
|  | 100.0% |

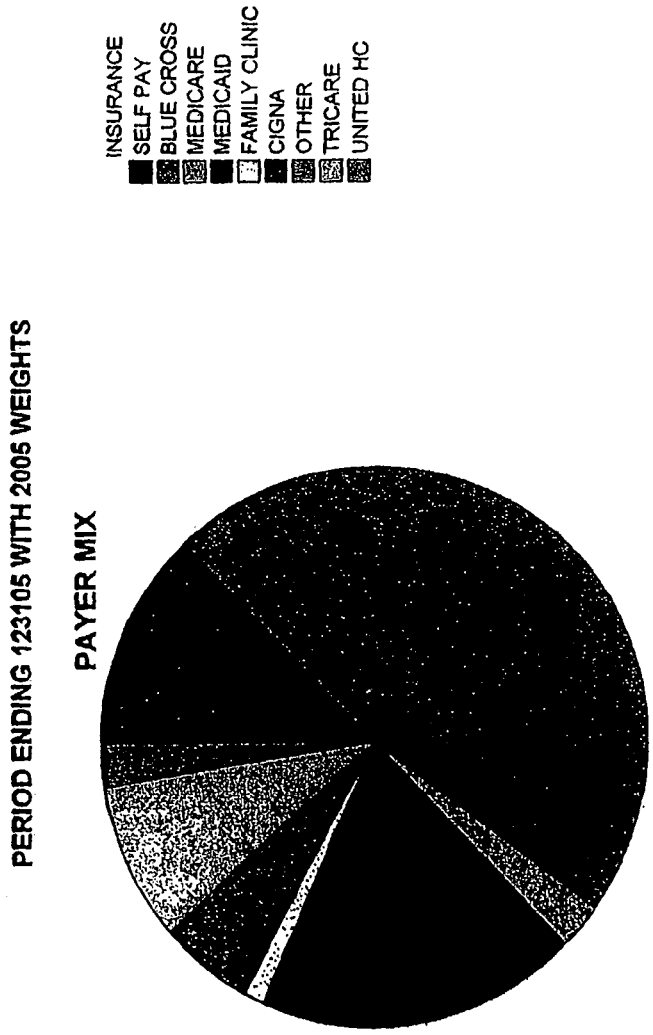

Figure 5A

WOMEN'S HEALTH CARE ASSOCIATES
PROCEDURE COSTS AND SELECTED PAYER MARGINS

| CODE | LOCATION | DESCRIPTION | AGGREGATE VOLUME | PROCEDURE COST | MEDICAID MARGIN | OTHER GOVT MARGIN | COMMERCIAL PAYER MARGIN |
|---|---|---|---|---|---|---|---|
| | | Unknown | 1 | | | | |
| 10060 | 01 | Drainage of skin abscess | 8 | 95.91 | -25.91 | -8.81 | -30.91 |
| 10060 | 02 | Drainage of skin abscess | 1 | 85.69 | -15.69 | 1.41 | -20.69 |
| 10180 | 01 | Complex drainage, wound | 1 | 212.15 | -59.15 | -53.10 | 33.85 |
| 11100 | 01 | Biopsy, skin lesion | 2 | 79.75 | -21.75 | -35.89 | -22.75 |
| 11200 | 01 | Removal of skin tags | 12 | 70.87 | -18.87 | -15.55 | -14.87 |
| 11400 | 01 | Exc tr-ext b9+marg 0.5 < cm | 3 | 109.53 | -30.53 | -10.62 | -52.53 |
| 11400 | 02 | Exc tr-ext b9+marg 0.5 < cm | 3 | 69.04 | 9.96 | 29.87 | -12.04 |
| 11401 | 01 | Exc tr-ext b9+marg 0.6-1 cm | 3 | 128.18 | -35.18 | -45.55 | -46.18 |
| 11420 | 01 | Exc h-f-nk-sp b9+marg 0.5 < | 3 | 107.54 | -29.54 | -37.31 | -42.54 |
| 11421 | 01 | Exc h-f-nk-sp b9+marg 0.6-1 | 3 | 137.36 | -37.36 | -43.75 | -58.36 |
| 11422 | 01 | Exc h-f-nk-sp b9+marg 1.1-2 | 1 | 153.52 | -42.52 | -14.31 | -28.52 |
| 11422 | 02 | Exc h-f-nk-sp b9+marg 1.1-2 | 2 | 119.96 | -8.96 | 19.25 | 5.04 |
| 11423 | 02 | Exc h-f-nk-sp b9+marg 2.1-3 | 1 | 141.59 | -8.59 | 24.18 | 13.41 |
| 11426 | 01 | Exc h-f-nk-sp b9+marg > 4 cm | 6 | 295.06 | -81.06 | -71.93 | -50.06 |
| 11976 | 01 | Removal of contraceptive cap | 1 | 142.58 | -62.58 | -47.02 | -100.58 |
| 13131 | 01 | Repair of wound or lesion | 1 | 260.78 | | 32.22 | 264.63 |
| 13160 | 02 | Late closure of wound | 1 | 740.37 | | -68.69 | -15.69 |
| 17000 | 01 | Destroy benign/premlg lesion | 1 | 60.69 | | -19.54 | |
| 3D | | Unknown | 145 | | | | |
| 44200 | 02 | Laparoscopy, enterolysis | 1 | 878.39 | | -77.91 | -148.39 |
| 44615-80 | 02 | Intestinal stricturoplasty A | 1 | 240.53 | | -100.19 | 121.97 |
| 44615 | 02 | Intestinal stricturoplasty | 1 | 962.11 | | -85.00 | 487.89 |
| 44955 | 02 | Appendectomy add-on | 1 | 88.69 | | -7.73 | -88.69 |
| 44970 | 02 | Laparoscopy, appendectomy | 1 | 542.70 | | -48.50 | 364.30 |
| 46750 | 02 | Repair of anal sphincter | 1 | 638.45 | | -55.49 | 612.55 |
| 46917 | 02 | Laser surgery, anal lesions | 1 | 123.91 | | | |
| 49000-78 | 02 | Exploration of abdomen RTOR | 1 | 542.21 | -139.46 | -48.21 | 396.04 |
| 49000-80 | 02 | Exploration of abdomen AS | 26 | 180.74 | -96.82 | -75.35 | 132.01 |
| 49000 | 02 | Exploration of abdomen | 45 | 722.95 | -185.95 | -64.28 | 528.05 |
| 49200 | 02 | Removal of abdominal lesion | 1 | 641.67 | | -56.55 | 557.33 |
| 49320 | 02 | Diag laparo separate proc | 78 | 325.39 | | -29.02 | 334.61 |
| 49321 | 02 | Laparoscopy, biopsy | 7 | 340.17 | | -30.39 | 484.83 |
| 49900 | 01 | Repair of abdominal wall | 2 | 780.83 | | -69.78 | |
| 50715 | 02 | Release of ureter | 4 | 1160.23 | | -101.11 | |
| 51550 | 02 | Partial removal of bladder | 3 | 926.77 | | -77.36 | 523.23 |
| 51701 | 02 | Irrigation of bladder | 18 | 96.51 | -30.51 | -52.06 | |
| 51701 | 01 | Insert bladder catheter | 1 | 79.32 | | -53.05 | |
| 51702 | 02 | Insert temp bladder cath | 3 | 97.55 | | -69.66 | |
| 51720 | 01 | Treatment of bladder lesion | 12 | 147.80 | -39.80 | -47.10 | |
| 51726 | 01 | Complex cystometrogram | 81 | 349.43 | -98.43 | -33.62 | -217.43 |
| 51741 | 02 | Electro-uroflowmetry, first | 80 | 78.99 | -20.99 | | |
| 51772 | 01 | Urethra pressure profile | 79 | 275.76 | -27.76 | | -180.76 |
| 51784 | 01 | Anal/urinary muscle study | 76 | 213.00 | -59.00 | | |
| 51795 | 02 | Urine voiding pressure study | 80 | 336.10 | -95.10 | | |
| 51840-80 | 02 | Attach bladder/urethra AS | 3 | 168.69 | -73.01 | -70.07 | 194.06 |
| 51840 | 02 | Attach bladder/urethra | 2 | 674.77 | -76.77 | -58.37 | 776.23 |
| 52000-51 | 01 | Cystoscopy MP | 1 | 57.03 | 17.97 | 36.71 | 5.47 |
| 52000 | 02 | Cystoscopy | 54 | 114.06 | 35.94 | 73.41 | 10.94 |
| 53060 | 02 | Drainage of urethra abscess | 1 | 192.25 | | -40.34 | -51.25 |
| 54150 | 01 | Circumcision | 1 | 237.76 | -65.76 | -23.16 | -141.76 |

WOMEN'S HEALTH CARE ASSOCIATES
PROCEDURE COSTS AND SELECTED PAYER MARGINS

| CODE | LOCATION | DESCRIPTION | AGGREGATE VOLUME | PROCEDURE COST | MEDICAID MARGIN | OTHER GOVT MARGIN | COMMERCIAL PAYER MARGIN |
|---|---|---|---|---|---|---|---|
| 54150 | 02 | Circumcision | 1012 | 104.61 | 67.39 | 109.99 | -9.61 |
| 56350 | 01 | Unknown | 1 | | | | |
| 56405 | 01 | I & D of vulva/perineum | 14 | 113.11 | -32.11 | -10.45 | 60.89 |
| 56405 | 02 | I & D of vulva/perineum | 1 | 106.17 | -25.17 | -3.51 | 67.83 |
| 56420 | 01 | Drainage of gland abscess | 10 | 144.99 | | -13.94 | -41.99 |
| 56420 | 02 | Drainage of gland abscess | 2 | 100.12 | | 30.93 | 2.88 |
| 56440 | 02 | Surgery for vulva lesion | 9 | 189.95 | | -17.03 | 246.05 |
| 56501 | 01 | Destroy, vulva lesions, sim | 34 | 133.14 | -36.14 | -12.44 | -13.14 |
| 56501 | 02 | Destroy, vulva lesions, sim | 6 | 113.44 | -16.44 | 7.26 | 6.56 |
| 56515 | 01 | Destroy vulva lesion/s compl | 1 | 216.22 | | -43.65 | 260.78 |
| 56605-25 | 01 | Biopsy of vulva/perineum SP | 4 | 88.38 | -24.38 | -8.20 | 85.62 |
| 56605 | 01 | Biopsy of vulva/perineum | 27 | 88.38 | -24.38 | -8.20 | 85.62 |
| 56605 | 02 | Biopsy of vulva/perineum | 2 | 66.12 | -2.12 | 14.06 | 107.88 |
| 56606 | 01 | Biopsy of vulva/perineum | 3 | 42.74 | -7.74 | -12.75 | -8.74 |
| 56606 | 02 | Biopsy of vulva/perineum | 3 | 509.71 | | -45.88 | 823.29 |
| 56620 | 02 | Partial removal of vulva | 2 | 179.89 | | -16.34 | 66.11 |
| 56700 | 02 | Partial removal of hymen | 1 | 67.02 | -37.10 | -27.94 | 64.98 |
| 56810-80 | 02 | Repair of perineum AS | 20 | 268.08 | -81.08 | -23.80 | 259.92 |
| 56810 | 02 | Repair of perineum | 1 | | | | |
| 56820-25 | 01 | Unknown SP | 4 | 155.71 | | -41.59 | -155.71 |
| 56821 | 01 | Exam/biopsy of vulva w/scope | 1 | 407.43 | | -36.35 | -69.43 |
| 57010 | 02 | Drainage of pelvic abscess | 1 | 305.98 | | -27.11 | -49.98 |
| 57023 | 02 | I & d vag hematoma, non-ob | 14 | 116.35 | -31.35 | -28.29 | 221.65 |
| 57061 | 01 | Destroy vag lesions, simple | 3 | 200.68 | | -38.63 | 189.32 |
| 57065 | 01 | Destroy vag lesions, complex | 1 | 93.16 | -45.16 | -28.09 | -20.16 |
| 57100 | 01 | Biopsy of vagina | 1 | 127.62 | | .33 | 200.38 |
| 57105 | 02 | Biopsy of vagina | 1 | 436.53 | | -39.16 | -436.53 |
| 57106 | 02 | Remove vagina wall, partial | 3 | 179.74 | | 3.76 | 87.26 |
| 57135 | 02 | Remove vagina lesion | 1 | 76.56 | | -28.93 | -9.56 |
| 57160-25 | 01 | Insert pessary/other device | 40 | 76.56 | | -28.93 | -9.56 |
| 57160 | 01 | Insert pessary/other device | 2 | 94.91 | -25.91 | -46.56 | -53.91 |
| 57170 | 01 | Fitting of diaphragm/cap | 6 | 356.60 | -90.60 | -32.13 | -84.60 |
| 57210 | 01 | Repair vagina/perineum | 4 | 76.41 | -43.45 | -31.93 | 145.34 |
| 57220-80 | 02 | Revision of urethra AS | 11 | 305.65 | -99.65 | -27.64 | 581.35 |
| 57220 | 02 | Revision of urethra | 2 | 101.76 | -42.40 | -42.37 | 74.99 |
| 57240-80 | 02 | Repair bladder & vagina AS | 3 | 407.05 | -36.05 | -35.84 | 299.95 |
| 57240 | 02 | Repair bladder & vagina | 8 | 94.44 | | -39.43 | 51.56 |
| 57250-80 | 02 | Repair rectum & vagina AS | 19 | 377.76 | | -33.96 | 206.24 |
| 57250 | 02 | Repair rectum & vagina | 13 | 136.62 | | -56.98 | 46.63 |
| 57260-80 | 02 | Repair of vagina AS | 20 | 546.48 | | -48.75 | 186.52 |
| 57260 | 02 | Repair of vagina | 1 | 363.53 | -98.53 | -32.19 | 125.97 |
| 57265-51 | 02 | Extensive repair of vagina M | 4 | 181.77 | -96.97 | -75.74 | 62.98 |
| 57265-80 | 02 | Extensive repair of vagina A | 5 | 727.07 | -197.07 | -64.38 | 251.93 |
| 57265 | 02 | Extensive repair of vagina | 1 | | | | |
| 57267-80 | 02 | Unknown AS | 3 | 113.74 | | -47.45 | 216.76 |
| 57268-80 | 02 | Repair of bowel bulge AS | 4 | 454.95 | | -40.67 | 867.05 |
| 57268 | 02 | Repair of bowel bulge | 2 | 234.44 | | -97.50 | 96.06 |
| 57280-80 | 02 | Suspension of vagina AS | 2 | 937.74 | | -81.89 | 384.26 |
| 57280 | 02 | Suspension of vagina | 15 | 120.03 | | -50.37 | 213.22 |
| 57282-80 | 02 | Colpopexy, extraperitoneal A | 19 | 480.10 | | -44.73 | 852.90 |
| 57282 | 02 | Colpopexy, extraperitoneal | 2 | 345.80 | -32.80 | -29.78 | |
| 57283-51 | 02 | Colpopexy, intraperitoneal M | | | | | |

Figure 5B

WOMEN'S HEALTH CARE ASSOCIATES
PROCEDURE COSTS AND SELECTED PAYER MARGINS

| CODE | LOCATION | DESCRIPTION | AGGREGATE VOLUME | PROCEDURE COST | MEDICAID MARGIN | OTHER GOVT MARGIN | COMMERCIAL PAYER MARGIN |
|---|---|---|---|---|---|---|---|
| 57283-80 | 02 | Colpopexy, intraperitoneal A | 18 | 172.90 | -91.94 | -71.77 | |
| 57283 | 02 | Colpopexy, intraperitoneal | 20 | 691.61 | -185.61 | -59.56 | |
| 57284 | 02 | Repair paravaginal defect | 1 | 825.79 | -286.79 | -72.91 | 635.21 |
| 57288-51 | 02 | Repair bladder defect MP | 1 | 391.02 | -104.52 | -32.80 | 336.48 |
| 57288-80 | 02 | Repair bladder defect AS | 37 | 195.51 | -103.83 | -80.88 | 168.24 |
| 57288 | 02 | Repair bladder defect | 45 | 782.04 | -209.04 | -65.61 | 672.96 |
| 57300-80 | 02 | Repair rectum-vagina fistula | 1 | 123.89 | | -51.62 | 283.61 |
| 57300 | 02 | Repair rectum-vagina fistula | 1 | 495.56 | | -43.87 | 1134.44 |
| 57305-80 | 02 | Repair rectum-vagina fistula | 1 | 211.93 | | -88.29 | |
| 57305 | 02 | Repair rectum-vagina fistula | 1 | 847.72 | | -74.91 | |
| 57400 | 01 | Dilation of vagina | 1 | 141.60 | | -12.35 | -8.60 |
| 57410 | 02 | Pelvic examination | 9 | 109.52 | -.52 | 27.01 | 32.48 |
| 57420-25 | 01 | Exam of vagina w/scope SP | 1 | 120.66 | | -33.11 | |
| 57420 | 01 | Exam of vagina w/scope | 5 | 120.66 | | -33.11 | |
| 57421-25 | 01 | Exam/biopsy of vag w/scope S | 1 | 165.81 | | -43.81 | |
| 57421 | 01 | Exam/biopsy of vag w/scope | 2 | 165.81 | | -43.81 | |
| 57452-25 | 01 | Exam of cervix w/scope SP | 2 | 113.69 | -30.69 | -27.29 | 5.31 |
| 57452 | 01 | Exam of cervix w/scope | 101 | 113.69 | -30.69 | -27.29 | 5.31 |
| 57454-25 | 01 | Bx/curett of cervix w/scope | 5 | 164.53 | -44.53 | -14.93 | -9.53 |
| 57454 | 01 | Bx/curett of cervix w/scope | 284 | 164.53 | -44.53 | -14.93 | -9.53 |
| 57454 | 02 | Bx/curett of cervix w/scope | 2 | 146.65 | -26.65 | 2.95 | 8.35 |
| 57455 | 01 | Biopsy of cervix w/scope | 97 | 152.20 | -41.20 | -14.01 | |
| 57455 | 02 | Biopsy of cervix w/scope | 1 | 121.19 | -10.19 | 17.00 | |
| 57456-25 | 01 | Endocerv curettage w/scope S | 2 | 143.23 | -39.23 | -40.19 | -143.23 |
| 57456 | 01 | Endocerv curettage w/scope | 42 | 143.23 | -39.23 | -40.19 | -143.23 |
| 57460 | 01 | Bx of cervix w/scope, leep | 74 | 340.20 | -95.20 | | |
| 57460 | 02 | Bx of cervix w/scope, leep | 25 | 177.51 | 67.49 | | |
| 57500-25 | 01 | Biopsy of cervix SP | 18 | 135.99 | -37.99 | -75.61 | -39.99 |
| 57500 | 01 | Biopsy of cervix | 4 | 135.99 | -37.99 | -75.61 | -39.99 |
| 57505-25 | 01 | Endocervical curettage SP | 83 | 104.21 | -28.21 | -9.83 | 74.79 |
| 57505 | 01 | Endocervical curettage | 6 | 104.21 | -28.21 | -9.83 | 74.79 |
| 57505 | 02 | Endocervical curettage | 21 | 91.08 | -15.08 | 3.30 | 87.92 |
| 57511 | 01 | Cryocautery of cervix | 18 | 151.44 | -41.44 | -28.62 | -32.44 |
| 57520 | 01 | Conization of cervix | 1 | 285.62 | -50.62 | 8.57 | 268.38 |
| 57800 | 01 | Dilation of cervical canal | 18 | 62.23 | | -15.20 | 43.77 |
| 58100-25 | 02 | Biopsy of uterus lining SP | 1 | 116.75 | -31.75 | -10.72 | -5.75 |
| 58100-53 | 01 | Biopsy of uterus lining DP | 191 | 116.75 | -31.75 | -10.72 | -5.75 |
| 58100 | 01 | Biopsy of uterus lining | 1 | 94.87 | -9.87 | 11.16 | 16.13 |
| 58100 | 02 | Biopsy of uterus lining | 27 | 230.73 | -41.73 | -20.90 | 138.27 |
| 58120 | 01 | Dilation and curettage | 10 | 215.04 | -26.04 | -5.21 | 153.96 |
| 58120 | 02 | Dilation and curettage | 19 | 228.82 | -122.10 | -95.36 | 118.68 |
| 58140-80 | 02 | Myomectomy abdom method AS | 1 | 915.27 | -248.27 | -81.13 | 474.73 |
| 58140 | 02 | Myomectomy abdom method | 2 | 133.84 | | | |
| 58145-80 | 02 | Myomectomy vag method AS | 2 | 535.38 | | | |
| 58145 | 02 | Myomectomy vag method | 2 | 295.10 | | -122.90 | -295.10 |
| 58146-80 | 02 | Myomectomy abdom complex AS | 2 | 1180.38 | | -104.13 | -1180.38 |
| 58146 | 02 | Myomectomy abdom complex | 220 | 239.01 | 119.81 | -99.56 | 12.99 |
| 58150-80 | 02 | Total hysterectomy AS | 222 | 956.05 | -211.05 | -84.45 | 51.95 |
| 58150 | 02 | Total hysterectomy | 5 | 320.31 | -190.87 | -133.35 | 16.69 |
| 58152-80 | 02 | Total hysterectomy AS | 7 | 1281.23 | -472.23 | -112.72 | 66.77 |
| 58152 | 02 | Total hysterectomy | | | | | |

WOMEN'S HEALTH CARE ASSOCIATES
PROCEDURE COSTS AND SELECTED PAYER MARGINS

| CODE | LOCATION | DESCRIPTION | AGGREGATE VOLUME | PROCEDURE COST | MEDICAID MARGIN | OTHER GOVT MARGIN | COMMERCIAL PAYER MARGIN |
|---|---|---|---|---|---|---|---|
| 58180-50 | 02 | Partial hysterectomy BP | 1 | 1425.44 | | -123.94 | 641.56 |
| 58180 | 02 | Partial hysterectomy | 1 | 950.29 | | -82.62 | 427.71 |
| 58260-80 | 02 | Vaginal hysterectomy AS | 62 | 206.53 | -102.85 | -86.08 | 45.47 |
| 58260 | 02 | Vaginal hysterectomy | 72 | 826.13 | -178.13 | -73.27 | 181.87 |
| 58262-80 | 02 | Vag hyst including t/o AS | 16 | 232.98 | -117.94 | -97.08 | 44.02 |
| 58262 | 02 | Vag hyst including t/o | 18 | 931.93 | -212.93 | -82.53 | 176.07 |
| 58263-80 | 02 | Vag hyst w/t/o & vag repair | 21 | 251.99 | -154.39 | -104.97 | 52.51 |
| 58263 | 02 | Vag hyst w/t/o & vag repair | 24 | 1007.94 | -397.94 | -89.12 | 210.06 |
| 58267-80 | 02 | Vag hyst w/urinary repair AS | 1 | 267.39 | | -111.40 | 176.36 |
| 58267 | 02 | Vag hyst w/urinary repair | 1 | 1069.54 | | -94.61 | 705.46 |
| 58290-80 | 02 | Vag hyst complex AS | 1 | 296.29 | | -123.42 | -296.29 |
| 58290 | 02 | Vag hyst complex | 2 | 1185.15 | | -104.71 | -1185.15 |
| 58300 | 01 | Insert intrauterine device | 75 | 97.13 | -.13 | -43.07 | 8.87 |
| 58301 | 01 | Remove intrauterine device | 27 | 105.12 | -29.12 | -9.79 | -64.12 |
| 58322 | 01 | Remove intrauterine device | 6 | 74.48 | 1.52 | 20.85 | -33.48 |
| 58322 | 01 | Artificial insemination | 10 | 93.12 | -93.12 | -34.07 | 80.88 |
| 58340 | 02 | Catheter for hysterography | 123 | 62.64 | -62.64 | 76.03 | 41.36 |
| 58350 | 02 | Reopen fallopian tube | 59 | 78.89 | -78.89 | 11.25 | -5.89 |
| 58545 | 02 | Laparoscopic myomectomy | 3 | 917.41 | | -81.24 | -917.41 |
| 58550-80 | 02 | Laparo-asst vag hysterectomy | 18 | 225.64 | -120.36 | -94.04 | 51.36 |
| 58550 | 02 | Laparo-asst vag hysterectomy | 20 | 902.57 | -244.57 | -80.07 | 205.43 |
| 58552-80 | 02 | Laparo-vag hyst incl t/o AS | 43 | 250.41 | -133.29 | -104.09 | -250.41 |
| 58552 | 02 | Laparo-vag hyst incl t/o | 45 | 1001.63 | -269.63 | -87.12 | -1001.63 |
| 58553 | 02 | Laparo-vag hyst, complex | 1 | 1177.88 | | -103.98 | -1177.88 |
| 58555 | 02 | Hysteroscopy, dx, sep proc | 60 | 229.52 | -47.52 | -20.71 | 130.48 |
| 58555 | 02 | Hysteroscopy, dx, sep proc | 10 | 206.17 | -24.17 | 2.64 | 153.83 |
| 58558-51 | 01 | Hysteroscopy, biopsy MP | 1 | 146.09 | -39.59 | -12.87 | 101.41 |
| 58558-80 | 01 | Hysteroscopy, biopsy AS | 1 | 73.04 | -38.96 | -30.41 | 50.71 |
| 58558 | 01 | Hysteroscopy, biopsy | 34 | 292.17 | -79.17 | -25.73 | 202.83 |
| 58558 | 01 | Hysteroscopy, biopsy | 162 | 292.17 | -79.17 | -25.73 | 202.83 |
| 58560 | 02 | Hysteroscopy, resect septum | 1 | 426.07 | | -37.37 | 230.93 |
| 58561 | 02 | Hysteroscopy, remove myoma | 3 | 604.63 | | -52.95 | 102.37 |
| 58562 | 02 | Hysteroscopy, remove fb | 1 | 319.20 | | -28.05 | |
| 58563 | 01 | Hysteroscopy, ablation | 1 | 2326.51 | -661.51 | -244.90 | -1516.51 |
| 58563 | 02 | Hysteroscopy, ablation | 212 | 377.12 | 1287.88 | 1704.49 | 432.88 |
| 58605 | 02 | Division of fallopian tube | 186 | 337.30 | -61.30 | -22.74 | 254.70 |
| 58611 | 02 | Ligate oviduct(s) add-on | 117 | 85.78 | -15.78 | -7.45 | -85.78 |
| 58660 | 02 | Laparoscopy, lysis | 50 | 698.96 | -188.96 | -61.81 | 31.04 |
| 58661 | 02 | Laparoscopy, remove adnexa | 54 | 682.60 | -184.60 | -60.20 | 568.40 |
| 58662 | 02 | Laparoscopy, excise lesions | 187 | 739.97 | -199.97 | -65.50 | 116.03 |
| 58670 | 02 | Laparoscopy, tubal cautery | 114 | 370.41 | -66.41 | -33.14 | 495.59 |
| 58673 | 02 | Laparoscopy, salpingostomy | 1 | 856.64 | | -75.75 | 9.36 |
| 58700 | 02 | Removal of fallopian tube | 1 | 760.87 | | -67.77 | 80.13 |
| 58720-80 | 02 | Removal of ovary/tube(s) AS | 3 | 180.09 | -90.01 | -75.06 | 86.16 |
| 58720 | 02 | Removal of ovary/tube(s) | 5 | 720.35 | -157.35 | -63.93 | 344.65 |
| 58750-80 | 02 | Repair oviduct AS | 3 | 234.09 | | -97.60 | 359.66 |
| 58750 | 02 | Repair oviduct | 10 | 936.37 | | -83.26 | 1438.63 |
| 58760 | 02 | Remove tubal obstruction | 1 | 841.93 | | -76.18 | 1387.07 |
| 58822 | 02 | Drain ovary abscess, percut | 2 | 641.82 | | -56.50 | 619.18 |
| 58925-51 | 02 | Removal of ovarian cyst(s) M | 1 | 358.93 | -131.43 | | |
| 58925-80 | 02 | Removal of ovarian cyst(s) A | 3 | 179.46 | -106.66 | | |

Figure 5E

WOMEN'S HEALTH CARE ASSOCIATES
PROCEDURE COSTS AND SELECTED PAYER MARGINS

| CODE | LOCATION | DESCRIPTION | AGGREGATE VOLUME | PROCEDURE COST | MEDICAID MARGIN | OTHER GOVT MARGIN | COMMERCIAL PAYER MARGIN |
|---|---|---|---|---|---|---|---|
| 58925 | 02 | Removal of ovarian cyst(s) | 5 | 717.85 | -262.85 | | |
| 58956-80 | 02 | Bso, omentectomy w/tah AS | 1 | 342.03 | | -144.24 | |
| 58956 | 02 | Bso, omentectomy w/tah | 1 | 1368.11 | | -131.93 | |
| 58960-80 | 02 | Unknown AS | | | | | |
| 59000-25 | 02 | Amniocentesis, diagnostic SP | 1 | 88.90 | -24.90 | 36.51 | 2.10 |
| 59000 | 01 | Amniocentesis, diagnostic | 21 | 139.97 | -75.97 | -14.56 | -48.97 |
| 59000 | 02 | Amniocentesis, diagnostic | 14 | 88.90 | -24.90 | 36.51 | 2.10 |
| 59020 | 01 | Fetal contract stress test | 11 | 65.21 | -15.21 | 17.27 | 10.79 |
| 59020 | 02 | Fetal contract stress test | | 65.21 | -15.21 | 17.27 | 10.79 |
| 59025 | 01 | Fetal non-stress test | 1791 | 42.86 | -11.86 | 2.59 | 15.14 |
| 59025 | 02 | Fetal non-stress test | 665 | 42.86 | -11.86 | 2.59 | 15.14 |
| 59150 | 02 | Treat ectopic pregnancy | 22 | 795.03 | -223.03 | -80.38 | 60.97 |
| 59151 | 02 | Treat ectopic pregnancy | 7 | 788.41 | -221.41 | -79.77 | 646.59 |
| 59160 | 02 | D & c after delivery | 4 | 211.82 | -25.82 | 16.10 | 213.18 |
| 59320 | 01 | Revision of cervix | 19 | 167.75 | -35.75 | 1.50 | 309.25 |
| 59400 | 02 | Obstetrical care | 24 | 1698.29 | -398.29 | -172.62 | 300.71 |
| 59400 | 02 | Obstetrical care MP | 1448 | 1698.29 | -398.29 | -172.62 | 300.71 |
| 59409-51 | 02 | Obstetrical care | 1 | 430.17 | 44.83 | 27.99 | 184.83 |
| 59409 | 01 | Obstetrical care | 4 | 860.34 | 89.66 | 55.98 | 369.66 |
| 59409 | 02 | Obstetrical care | 40 | 860.34 | 89.66 | 55.98 | 369.66 |
| 59410 | 01 | Obstetrical care | 1 | 960.08 | 39.92 | 38.24 | 305.92 |
| 59410 | 02 | Obstetrical care | 60 | 960.08 | 39.92 | 38.24 | 305.92 |
| 59412-53 | 01 | Antepartum manipulation DP | 1 | 114.03 | 7.97 | 2.80 | -114.03 |
| 59412-53 | 02 | Antepartum manipulation DP | 1 | 114.03 | 7.97 | 2.80 | -114.03 |
| 59412 | 02 | Antepartum manipulation | 5 | 114.03 | 7.97 | 2.80 | -114.03 |
| 59425 | 02 | Antepartum care only | 39 | 390.63 | -109.63 | -39.95 | -36.63 |
| 59425 | 02 | Antepartum care only | 1 | 304.90 | -23.90 | 45.78 | 49.10 |
| 59426 | 01 | Antepartum care only | 18 | 684.22 | -193.22 | -70.06 | -151.22 |
| 59426 | 02 | Antepartum care only | 1 | 526.63 | -35.63 | 87.53 | 6.37 |
| 59430 | 01 | Care after delivery | 2120 | 150.17 | | -24.64 | -111.17 |
| 59510-80 | 02 | Cesarean delivery AS | 11 | 481.30 | -273.30 | -204.58 | 18.45 |
| 59510 | 01 | Cesarean delivery | 3 | 1925.19 | -625.19 | -195.69 | 73.81 |
| 59510 | 02 | Cesarean delivery | 646 | 1925.19 | -625.19 | -195.69 | 73.81 |
| 59514-80 | 00 | Cesarean delivery only AS | 555 | 253.91 | -101.91 | -82.13 | 153.59 |
| 59514 | 01 | Cesarean delivery only | 50 | 1015.65 | -65.65 | 57.99 | 614.35 |
| 59515 | 02 | Cesarean delivery | 1 | 1143.61 | | 14.07 | 522.39 |
| 59610 | 02 | Vbac delivery | 17 | 1794.85 | -494.85 | -182.33 | 204.15 |
| 59612 | 02 | Vbac delivery only | 1 | 964.97 | | 5.40 | 265.03 |
| 59841 | 02 | Treatment of miscarriage | 182 | 290.44 | -81.44 | -18.06 | 140.56 |
| 59841 | 00 | Abortion | 5 | 366.98 | -89.98 | -20.24 | 43.02 |
| 59871 | 02 | Remove cerclage suture | 7 | 146.52 | | 5.03 | 330.48 |
| 64435 | 01 | N block inj, paracervical | 18 | 156.13 | -43.13 | -74.46 | -92.13 |
| 64450 | 01 | N block, other peripheral | 3 | 101.41 | -43.41 | -9.25 | 1.59 |
| 64450 | 02 | N block, other peripheral | 1015 | 73.69 | -15.69 | 18.47 | 29.31 |
| 64640 | 02 | Injection treatment of nerve | 19 | 189.12 | | 59.37 | 15.88 |
| 76075-GA | 01 | Dxa bone density, axial GA | 1 | 135.50 | -51.50 | -15.28 | -6.50 |
| 76075-TC | 01 | Dxa bone density, axial TC | 9 | 119.39 | | | |
| 76075-TC | 00 | Dxa bone density, axial TC | 1 | 119.39 | | | |
| 76075 | 01 | Dxa bone density, axial | 402 | 135.50 | -51.50 | -15.28 | -6.50 |
| 76076 | 01 | Dxa bone density/peripheral | 5 | 41.48 | | -4.44 | 23.52 |
| 76375 | 01 | 3d/holograph reconstr add-on | 206 | 144.85 | | -16.64 | |

WOMEN'S HEALTH CARE ASSOCIATES
PROCEDURE COSTS AND SELECTED PAYER MARGINS

| CODE | LOCATION | DESCRIPTION | AGGREGATE VOLUME | PROCEDURE COST | MEDICAID MARGIN | OTHER GOVT MARGIN | COMMERCIAL PAYER MARGIN |
|---|---|---|---|---|---|---|---|
| 76705 | 01 | Echo exam of abdomen | 2 | 86.78 | | -8.94 | 3.22 |
| 76770 | 01 | Us exam abdo back wall, comp | 2 | 115.88 | | -11.99 | 74.12 |
| 76801 | 01 | Ob us < 14 wks, single fetus | 1493 | 135.11 | -82.90 | -13.69 | -135.11 |
| 76801 | 02 | Ob us < 14 wks, single fetus | 6 | 135.11 | -82.90 | -13.69 | -135.11 |
| 76802 | 01 | Ob us < 14 wks, addnl fetus | 41 | 68.54 | -42.10 | -8.95 | |
| 76805 | 01 | Ob us >/= 14 wks, sngl fetus | 2286 | 135.11 | -50.11 | -13.69 | -35.11 |
| 76805 | 02 | Ob us >/= 14 wks, sngl fetus | 27 | 135.11 | -50.11 | -13.69 | -35.11 |
| 76810 | 01 | Ob us >/= 14 wks, addl fetus | 4 | 100.33 | | -10.58 | 14.67 |
| 76815 | 01 | Ob us, limited, fetus(s) | 2940 | 90.65 | -33.65 | -9.23 | -15.65 |
| 76815 | 02 | Ob us, limited, fetus(s) | 28 | 90.65 | -33.65 | -9.23 | -15.65 |
| 76816 | 01 | Ob us, follow-up, per fetus | 410 | 90.28 | -43.28 | -8.72 | |
| 76817 | 01 | Transvaginal us, obstetric | 184 | 98.63 | -38.18 | -9.76 | |
| 76818 | 01 | Fetal biophys profile w/nst | 14 | 121.08 | -55.08 | -11.98 | 13.92 |
| 76818 | 02 | Fetal biophys profile w/nst | 6 | 121.08 | -55.08 | -11.98 | 13.92 |
| 76830 | 01 | Transvaginal us, non-ob | 1860 | 96.69 | -25.69 | -9.93 | 25.31 |
| 76830 | 02 | Transvaginal us, non-ob | 6 | 96.69 | -25.69 | -9.93 | 25.31 |
| 76831 | 01 | Echo exam, uterus | 6 | 98.63 | | -9.93 | |
| 76831 | 02 | Echo exam, uterus | 1 | 98.63 | | -9.93 | |
| 76856 | 01 | Us exam, pelvic, complete | 228 | 96.69 | -20.69 | -9.93 | 49.31 |
| 76857 | 01 | Us exam, pelvic, limited | 17 | 85.18 | -45.18 | -8.99 | 5.82 |
| 76946 | 01 | Echo guide for amniocentesis | 9 | 80.55 | -80.55 | -8.75 | 39.45 |
| 76946 | 02 | Echo guide for amniocentesis | 11 | 80.55 | -80.55 | -8.75 | 39.45 |
| 76970 | 01 | Ultrasound exam follow-up | 29 | 62.27 | -62.27 | -6.46 | |
| 81000 | 01 | Urinalysis, nonauto w/scope | 153 | .00 | 4.00 | 3.93 | |
| 81001 | 01 | Urinalysis, auto w/scope | 1 | .00 | | 3.93 | |
| 81002 | 01 | Urinalysis nonauto w/o scope | 512 | .00 | 3.00 | 3.16 | 4.50 |
| 81003 | 01 | Urinalysis, auto, w/o scope | 1 | .00 | 3.00 | 2.78 | |
| 81005 | 01 | Urinalysis | 647 | .00 | 2.00 | 2.68 | 6.00 |
| 81007 | 01 | Urine screen for bacteria | 50 | .00 | 3.00 | 4.39 | |
| 81015 | 01 | Microscopic exam of urine | 1 | .00 | 3.00 | 3.75 | |
| 81025 | 01 | Urine pregnancy test | 1125 | .00 | 3.00 | 7.83 | 8.10 |
| 82120 | 01 | Amines, vaginal fluid qual | 771 | .00 | 4.00 | 4.66 | |
| 82270 | 02 | Test for blood, feces | 1110 | .00 | 3.00 | 4.02 | 4.20 |
| 82670 | 01 | Assay of estradiol | 396 | .00 | 27.30 | 34.58 | |
| 83001 | 01 | Gonadotropin (FSH) | 386 | .00 | 22.00 | 23.01 | |
| 83002 | 01 | Gonadotropin (LH) | 215 | .00 | 21.00 | 22.92 | |
| 83986 | 01 | Assay of body fluid acidity | 861 | .00 | 3.00 | 4.43 | |
| 84144 | 01 | Assay of progesterone | 1849 | .00 | 20.00 | 25.82 | 8.73 |
| 84144 | 02 | Assay of progesterone | 1 | .00 | 20.00 | 25.82 | 8.73 |
| 84146 | 01 | Assay of prolactin | 208 | .00 | 24.00 | 23.99 | |
| 84403 | 01 | Assay of total testosterone | 71 | .00 | | 4.02 | |
| 84436 | 01 | Assay of total thyroxine | 1 | .00 | | 8.51 | |
| 84443 | 01 | Assay of thyroid stim hormone | 895 | .00 | 23.21 | 20.79 | |
| 84479 | 01 | Assay of thyroid (t3 or t4) | 1 | .00 | | 8.01 | |
| 84481 | 01 | Free assay (FT-3) | 1 | .00 | | | |
| 84702 | 01 | Chorionic gonadotropin test | 1532 | .00 | 12.00 | 18.63 | 8.10 |
| 84703 | 01 | Chorionic gonadotropin assay | 4 | .00 | | 9.29 | |
| 85014 | 01 | Hematocrit | 57 | .00 | 3.00 | 2.93 | |
| 85018 | 01 | Hemoglobin | 32 | .00 | 3.00 | 2.93 | |
| 85025 | 01 | Complete cbc w/auto diff wbc | 1181 | .00 | 10.00 | 9.62 | |
| 86304 | 01 | Immunoassay, tumor, ca 125 | 10 | .00 | | 25.75 | |

Figure 5F

WOMEN'S HEALTH CARE ASSOCIATES
PROCEDURE COSTS AND SELECTED PAYER MARGINS

| CODE | LOCATION | DESCRIPTION | AGGREGATE VOLUME | PROCEDURE COST | MEDICAID MARGIN | OTHER GOVT MARGIN | COMMERCIAL PAYER MARGIN |
|---|---|---|---|---|---|---|---|
| 86312 | 01 | Unknown | 18 | | | | |
| 86585 | 01 | TB tine test | 2 | 7.69 | | -.90 | -1.69 |
| 86588 | 01 | Unknown | 12 | | | | |
| 87081 | 01 | Culture screen only | 1 | .00 | | | |
| 87210 | 01 | Smear, wet mount, saline/ink | 1714 | .00 | 5.00 | 5.28 | 5.00 |
| 87210 | 02 | Smear, wet mount, saline/ink | 4 | .00 | 5.00 | 5.28 | 5.00 |
| 87430 | 01 | Strep a ag, eia | 4 | .00 | | 14.85 | 16.00 |
| 87480 | 01 | Candida, dna, dir probe | 4 | .00 | | 24.82 | 59.50 |
| 87490 | 01 | Chylmd trach, dna, dir probe | 18 | .00 | 25.00 | 24.82 | |
| 87510 | 01 | Gardner vag, dna, dir probe | 4 | .00 | 25.00 | 24.82 | |
| 87590 | 01 | N.gonorrhoeae, dna, dir prob | 17 | .00 | 25.00 | 24.82 | 59.50 |
| 87797 | 01 | Detect agent nos, dna, dir | 3 | .00 | 25.00 | 24.82 | |
| 87880 | 01 | Strep a assay w/optic | 1 | .00 | | | 59.50 |
| 88150 | 01 | Cytopath, c/v, manual | 4 | .00 | | 13.07 | 8.50 |
| 89320 | 01 | Semen analysis, complete | 4 | .00 | | 14.92 | |
| 89330 | 01 | Evaluation, cervical mucus | 1 | .00 | | | |
| 90215 | 01 | Unknown | 66 | | | | |
| 90384 | 01 | Rh ig, full-dose, lm | 1 | 18.54 | | | -12.54 |
| 90471 | 01 | Immunization admin | 34 | .00 | 8.00 | -1.73 | 7.50 |
| 90658 | 01 | Flu vaccine, 3 yrs & >, im | 1 | .00 | | | .00 |
| 90749 | 01 | Vaccine toxoid | 6 | .00 | | | |
| 90772 | 01 | Unknown | 1413 | 18.90 | -18.90 | -1.25 | -13.90 |
| 90782 | 01 | Injection, sc/im | 39 | 16.71 | -16.71 | -1.08 | |
| 90788 | 01 | Injection of antibiotic | 57 | .00 | | | |
| 99000 | 01 | Specimen handling | 35 | 37.15 | -7.15 | -14.36 | -.15 |
| 99201 | 01 | Office/outpatient visit, new | 610 | 66.17 | -13.17 | -5.71 | -16.17 |
| 99202 | 02 | Office/outpatient visit, new | 1 | 48.66 | 4.34 | 11.80 | 1.34 |
| 99202 | 01 | Office/outpatient visit, new | 1293 | 98.65 | -20.65 | -8.56 | -24.65 |
| 99203 | 02 | Office/outpatient visit, new | 1 | 74.94 | 3.06 | 15.15 | -.94 |
| 99203 | 01 | Office/outpatient visit, new | 565 | 139.87 | -28.87 | -37.57 | -36.87 |
| 99204 | 01 | Office/outpatient visit, new | 1 | 177.45 | -35.45 | -41.39 | -22.45 |
| 99205-25 | 01 | Office/outpatient visit, new | 37 | 177.45 | -35.45 | -41.39 | -22.45 |
| 99205-FP | 01 | Office/outpatient visit, new | 214 | 177.45 | -35.45 | -41.39 | -22.45 |
| 99205 | 01 | Office/outpatient visit, new | 1 | 21.46 | -4.46 | -12.78 | 5.54 |
| 99211-FP | 01 | Office/outpatient visit, est | 283 | 21.46 | -4.46 | -3.50 | 5.54 |
| 99211 | 01 | Office/outpatient visit, est | 1 | 38.97 | -7.97 | -3.50 | -3.97 |
| 99212-25 | 02 | Office/outpatient visit, est | 8 | 38.97 | -7.97 | -3.50 | -3.97 |
| 99212-FP | 01 | Office/outpatient visit, est | 3545 | 38.97 | -7.97 | -3.50 | -3.97 |
| 99212 | 02 | Office/outpatient visit, est | 1 | 25.11 | 5.89 | 10.36 | 9.89 |
| 99212 | 01 | Office/outpatient visit, est | 407 | 53.29 | -11.29 | -4.61 | -8.29 |
| 99213-FP | 01 | Office/outpatient visit, est | 6748 | 53.29 | -11.29 | -4.61 | -8.29 |
| 99213 | 02 | Office/outpatient visit, est | 20 | 36.88 | 5.12 | 11.80 | 8.12 |
| 99213 | 01 | Office/outpatient visit, est | 152 | 83.78 | -16.78 | -7.17 | -25.78 |
| 99214-FP | 02 | Office/outpatient visit, est | 2493 | 83.78 | -16.78 | -7.17 | -25.78 |
| 99214 | 01 | Office/outpatient visit, est | 2 | 61.16 | 5.84 | 15.45 | -3.16 |
| 99214 | 01 | Office/outpatient visit, est | 1 | 122.48 | -24.48 | -31.99 | -36.48 |
| 99215-25 | 01 | Office/outpatient visit, est | 2 | 122.48 | -24.48 | -31.99 | -36.48 |
| 99215-FP | 01 | Office/outpatient visit, est | 47 | 122.48 | -24.49 | -31.99 | -36.48 |
| 99215 | 01 | Office/outpatient visit, est | 1 | 73.17 | -22.17 | -5.72 | -10.17 |
| 99217 | 02 | Observation care discharge | 87 | 73.17 | -22.17 | -5.72 | -10.17 |

Figure 5G

WOMEN'S HEALTH CARE ASSOCIATES
PROCEDURE COSTS AND SELECTED PAYER MARGINS

| CODE | LOCATION | DESCRIPTION | AGGREGATE VOLUME | PROCEDURE COST | MEDICAID MARGIN | OTHER GOVT MARGIN | COMMERCIAL PAYER MARGIN |
|---|---|---|---|---|---|---|---|
| 99218 | 02 | Observation care | 1 | 69.89 | | -5.36 | 4.11 |
| 99219 | 01 | Observation care | 11 | 116.26 | -35.26 | -8.89 | -22.26 |
| 99219 | 02 | Observation care | 485 | 116.26 | -35.26 | -8.89 | -22.26 |
| 99220 | 02 | Observation care | 8 | 163.32 | | -12.53 | |
| 99222 | 01 | Initial hospital care | 4 | 116.99 | -35.99 | -8.98 | -22.99 |
| 99222 | 02 | Initial hospital care | 297 | 116.99 | -35.99 | -8.98 | -22.99 |
| 99223 | 02 | Initial hospital care | 13 | 162.93 | -49.93 | -12.42 | |
| 99231 | 01 | Subsequent hospital care | 10 | 35.31 | | -2.72 | 3.69 |
| 99232 | 01 | Subsequent hospital care | 40 | 57.70 | -17.70 | -4.36 | -8.70 |
| 99232 | 02 | Subsequent hospital care | 1063 | 57.70 | -17.70 | -4.36 | -8.70 |
| 99233 | 02 | Subsequent hospital care | 8 | 82.05 | | -6.20 | |
| 99238 | 01 | Hospital discharge day | 6 | 73.14 | -22.14 | -5.65 | -10.14 |
| 99238 | 02 | Hospital discharge day | 257 | 73.14 | -22.14 | -5.65 | -10.14 |
| 99241 | 01 | Office consultation | 127 | 51.05 | -51.05 | -18.21 | 22.95 |
| 99242 | 01 | Office consultation | 250 | 93.75 | -93.75 | -8.20 | -2.75 |
| 99242 | 02 | Office consultation | 7 | 72.59 | -72.59 | 12.96 | 18.41 |
| 99243 | 01 | Office consultation | 113 | 124.98 | -124.98 | -10.89 | -17.98 |
| 99243 | 02 | Office consultation | 8 | 97.26 | -97.26 | 16.83 | 9.74 |
| 99244 | 01 | Office consultation | 187 | 176.44 | -176.44 | -14.93 | -38.44 |
| 99244 | 02 | Office consultation | 3 | 143.61 | -143.61 | 17.90 | -5.61 |
| 99245 | 01 | Office consultation | 83 | 228.60 | -228.60 | -52.69 | -75.60 |
| 99251 | 02 | Initial inpatient consult | 1 | 37.26 | | -3.02 | 36.74 |
| 99252 | 02 | Initial inpatient consult | 3 | 74.86 | | -6.02 | 16.14 |
| 99253 | 02 | Initial inpatient consult | 36 | 102.32 | -102.32 | -8.10 | 3.68 |
| 99254 | 02 | Initial inpatient consult | 4 | 147.03 | -147.03 | -11.41 | |
| 99261 | 02 | Follow-up inpatient consult | 3 | 23.15 | | -1.79 | |
| 99271 | 02 | Confirmatory consultation | 1 | 39.34 | | -16.23 | 14.85 |
| 99272 | 02 | Confirmatory consultation | 7 | 66.42 | | -22.79 | 34.66 |
| 99273 | 02 | Confirmatory consultation | 9 | 92.28 | -92.28 | -29.70 | |
| 99274 | 02 | Confirmatory consultation | 2 | 124.26 | | -34.47 | -18.28 |
| 99275 | 01 | Confirmatory consultation | 1 | 158.59 | | -39.75 | |
| 99282 | 02 | Emergency dept visit | 1 | 28.80 | | -2.26 | 18.20 |
| 99283 | 01 | Emergency dept visit | 2 | 64.71 | -22.71 | -5.07 | -5.71 |
| 99283 | 02 | Emergency dept visit | 144 | 64.71 | -22.71 | -5.07 | -5.71 |
| 99284 | 02 | Emergency dept visit | 6 | 101.07 | -35.07 | -7.90 | -28.07 |
| 99285 | 02 | Emergency dept visit | 1 | 158.36 | -54.36 | -12.43 | |
| 99384 | 01 | Prev visit, new, age 12-17 | 16 | 120.43 | | -41.55 | -58.43 |
| 99385 | 01 | Prev visit, new, age 18-39 | 498 | 120.43 | | -41.55 | -55.43 |
| 99386 | 01 | Prev visit, new, age 40-64 | 167 | 141.83 | -141.83 | -12.01 | -89.83 |
| 99386 | 02 | Prev visit, new, age 40-64 | 2 | 141.83 | -141.83 | -12.01 | -89.83 |
| 99387 | 01 | Prev visit, new, age 65 & over | 20 | 104.62 | -104.62 | 25.20 | -52.62 |
| 99394 | 01 | Prev visit, est, age 12-17 | 17 | 153.81 | | -48.06 | -79.81 |
| 99395 | 01 | Prev visit, est, age 18-39 | 1850 | 97.88 | | -28.01 | -46.88 |
| 99395 | 02 | Prev visit, est, age 18-39 | 4 | 98.98 | -71.98 | -8.29 | -47.98 |
| 99396 | 01 | Prev visit, est, age 40-64 | 1013 | 75.63 | -48.63 | 15.06 | -24.63 |
| 99397 | 01 | Prev visit, est, age 65 & over | 72 | 109.49 | | -30.61 | -50.49 |
| 99402-FP | 01 | Preventive counseling, indiv | 1 | 120.74 | | -32.77 | -56.74 |
| 99402 | 01 | Preventive counseling, indiv | 69 | 71.94 | -58.94 | -22.20 | -71.94 |
| A4338 | 01 | Indwelling catheter latex | 2 | 71.94 | -58.94 | -22.20 | -71.94 |
| A4561 | 01 | Pessary rubber, any type | 5 | .00 | | | .00 |
| A4562 | 01 | Pessary, non rubber, an | 8 | .00 | | | .00 |

Figure 5H

WOMEN'S HEALTH CARE ASSOCIATES
PROCEDURE COSTS AND SELECTED PAYER MARGINS

| CODE | LOCATION | DESCRIPTION | AGGREGATE VOLUME | PROCEDURE COST | MEDICAID MARGIN | OTHER GOVT MARGIN | COMMERCIAL PAYER MARGIN |
|---|---|---|---|---|---|---|---|
| BACK | 01 | Unknown | 5 | | | | |
| BIKIN | 01 | Unknown | 108 | | | | |
| BLEAC | 01 | Unknown | 1 | | | | |
| BODY | 01 | Unknown | 207 | | | | |
| BREND | 01 | Unknown | 2 | | | | |
| CHEST | 01 | Unknown | 27 | | | | |
| CLEAN | 01 | Unknown | 4 | | | | |
| CREAM | 01 | Unknown | 7 | | | | |
| ELAMA | 01 | Unknown | 4 | | | | |
| ERR -80 | 02 | Unknown AS | 174 | | | | |
| ERR | 01 | Unknown | 35 | | | | |
| ERR | 02 | Unknown | 2 | | | | |
| EYECR | 01 | Unknown | 146 | | | | |
| FACE | 01 | Unknown | 12 | | | | |
| FACEV | 01 | Unknown | 3 | | | | |
| FOREA | 01 | Unknown | 31 | | | | |
| G0008 | 01 | Admin influenza virus vac | 4 | .00 | | | 6.00 |
| G0101 | 01 | CA screen;pelvic/breast exam | 1 | 37.85 | | -14.70 | -2.85 |
| G0107 | 01 | CA screen; fecal blood test | 2 | .00 | | 4.02 | |
| G0351 | 01 | Therapeutic/diagnostic injec | 138 | 18.54 | | -1.23 | |
| HIV | 01 | Unknown | 285 | | | | |
| IOB | 01 | Unknown | 2408 | | | | |
| IOB | 02 | Unknown | 1 | | | | |
| J0696 | 01 | Ceftriaxone sodium injection | 120 | .00 | | | 15.82 |
| J0704 | 01 | Betamethasone sod phosp/4 MG | 4 | .00 | | | 2.38 |
| J0970 | 01 | Estradiol valerate injection | 1 | .00 | | | 26.65 |
| J1000 | 01 | Depo-estradiol cypionate inj | 2 | .00 | | | |
| J1030 | 01 | Methylprednisolone 40 MG inj | 13 | .00 | | | |
| J1050 | 01 | Unknown | 1 | .00 | | | |
| J1051 | 01 | Medroxyprogesterone inj | 12 | .00 | | | .00 |
| J1055 | 01 | Medroxyprogester acetate inj | 74 | .00 | | | 7.64 |
| J1080 | 01 | Testosterone cypionat 200 MG | 4 | .00 | | | 9.41 |
| J1094 | 01 | Inj dexamethasone acetate | 4 | .00 | | | 18.85 |
| J1390 | 01 | Estradiol valerate 20 MG inj | 97 | .00 | | | 1.32 |
| J1950 | 01 | Leuprolide acetate /3.75 MG | 470 | .00 | | | 90.35 |
| J2001 | 01 | Lidocaine injection | 13 | .00 | | | |
| J2790 | 01 | Rho d immune globulin inj | 98 | .00 | | | 28.00 |
| J3140 | 01 | Testosterone suspension inj | 2 | .00 | | | 1.00 |
| J3301 | 01 | Triamcinolone acetonide inj | 18 | .00 | | | 1.60 |
| J3420 | 01 | Vitamin b12 injection | 4 | .00 | | | 1.00 |
| J3480 | 01 | Inj potassium chloride | 2 | .00 | | | 1.00 |
| J3490-FP | 01 | Drugs unclassified injection | 6 | .00 | | | .00 |
| J3490-SB | 01 | Drugs unclassified injection | 363 | .00 | | | .00 |
| J3490 | 01 | Drugs unclassified injection | 167 | .00 | | | .00 |
| J7300 | 01 | Intraut copper contraceptive | 25 | .00 | | | 326.88 |
| J7302 | 01 | Levonorgestrel iu contracept | 74 | .00 | | | 395.00 |
| J7304 | 01 | Contraceptive hormone patch | 32 | .00 | | | |
| J9260 | 01 | Methotrexate sodium inj | 13 | .00 | 4.00 | | 4.16 |
| LABFE | 01 | Unknown | 2 | | | | |
| LEGS | 01 | Unknown | 22 | | | | |
| LEGVE | 01 | Unknown | 24 | | | | |

Figure 51

WOMEN'S HEALTH CARE ASSOCIATES
PROCEDURE COSTS AND SELECTED PAYER MARGINS

| CODE | LOCATION | DESCRIPTION | AGGREGATE VOLUME | PROCEDURE COST | MEDICAID MARGIN | OTHER GOVT MARGIN | COMMERCIAL PAYER MARGIN |
|---|---|---|---|---|---|---|---|
| LOTIO | 01 | Unknown | 25 | . | . | . | . |
| MASQU | 01 | Unknown | 1 | . | . | . | . |
| POST | 01 | Unknown | 2332 | . | . | . | . |
| PP | 01 | Unknown | 28 | . | . | . | . |
| PP | 02 | Unknown | 198 | . | . | . | . |
| PRE | 01 | Unknown | 1244 | . | . | . | . |
| Q0091 | 01 | Obtaining screen pap smear | 43 | 40.11 | . | -20.96 | . |
| Q0111 | 01 | Wet mounts/ w preparations | 173 | .00 | . | 5.28 | . |
| Q0124 | 01 | Unknown | 2 | . | . | . | . |
| ROB | 01 | Unknown | 23233 | . | . | . | . |
| ROB | 02 | Unknown | 8 | . | . | . | . |
| S4845 | 01 | Unknown | 1 | . | . | . | . |
| S4993-FP | 01 | Contraceptive pills for bc | 24 | .00 | . | . | . |
| S4993 | 01 | Contraceptive pills for bc | 1040 | .00 | . | . | -40.11 |
| SERVI | 01 | Unknown | 42 | . | . | . | . |
| SEX | 01 | Unknown | 13 | . | . | . | . |
| SPERM | 01 | Unknown | 5 | . | . | . | . |
| TAPE | 01 | Unknown | 3 | . | . | . | . |
| TRIPL | 01 | Unknown | 41 | . | . | . | . |
| UNDER | 01 | Unknown | 43 | . | . | . | . |
| VIDEO | 01 | Unknown | 15 | . | . | . | . |
| WEIGH | 01 | Unknown | 310 | . | . | . | . |
| Z5320 | 01 | Unknown | 3 | . | . | . | . |

Figure 5J

WOMEN'S HEALTH CARE ASSOCIATES
MARKET BASKET PROCEDURES AND COSTS

| CODE | DESCRIPTION | AGGREGATE VOLUME | PROCEDURE COST | MAJOR PAYER FEE | AGGREGATE COST | MAJOR PAYER COLLECTIONS | MAJOR PAYER MARGIN |
|---|---|---|---|---|---|---|---|
| 59400 | Obstetrical care | 1448 | 1698.29 | 1999.00 | 2459123.08 | 2894552.00 | 435428.92 |
| 59510 | Cesarean delivery | 646 | 1925.19 | 1999.00 | 1243675.63 | 1291354.00 | 47678.37 |
| 59430 | Care after delivery | 2120 | 150.17 | 39.00 | 318352.56 | 82680.00 | -235672.56 |
| 76805 | Ob us >/= 14 wks, sngl fetus | 2286 | 135.11 | 100.00 | 308851.50 | 228600.00 | -80251.50 |
| 76815 | Ob us, limited, fetus(s) | 2940 | 90.65 | 75.00 | 266511.85 | 220500.00 | -46011.85 |
| 58150 | Total hysterectomy | 222 | 956.05 | 1008.00 | 212243.63 | 223776.00 | 11532.37 |
| 99214 | Office/outpatient visit, est | 2493 | 83.78 | 58.00 | 208853.88 | 144594.00 | -64259.88 |
| 76801 | Ob us < 14 wks, single fetus | 1493 | 135.11 | .00 | 201712.73 | .00 | -201712.73 |
| 99395 | Prev visit, est, age 18-39 | 1850 | 98.98 | 51.00 | 183103.91 | 94350.00 | -88753.91 |
| 76830 | Transvaginal us, non-ob | 1860 | 96.69 | 122.00 | 179847.43 | 226920.00 | 47072.57 |
| 59514-80 | Cesarean delivery only AS | 555 | 253.91 | 407.50 | 140921.80 | 226162.50 | 85240.70 |
| 58662 | Laparoscopy, excise lesions | 187 | 739.97 | 856.00 | 138374.81 | 160072.00 | 21697.19 |
| 99203 | Office/outpatient visit, new | 1293 | 98.65 | 74.00 | 127550.57 | 95682.00 | -31868.57 |
| 99396 | Prev visit, est, age 40-64 | 1013 | 109.49 | 59.00 | 110911.26 | 59767.00 | -51144.26 |
| 58563 | Hysteroscopy, ablation | 212 | 377.12 | 810.00 | 79948.85 | 171720.00 | 91771.15 |
| 99204 | Office/outpatient visit, new | 565 | 139.87 | 103.00 | 79024.33 | 58195.00 | -20829.33 |
| 59025 | Fetal non-stress test | 1791 | 42.86 | 58.00 | 76768.32 | 103878.00 | 27109.68 |
| 64450 | N block, other peripheral | 1015 | 73.69 | 103.00 | 74796.85 | 104545.00 | 29748.15 |
| 58605 | Division of fallopian tube | 186 | 337.30 | 692.00 | 62738.54 | 128712.00 | 65973.46 |
| 99385 | Prev visit, new, age 18-39 | 498 | 120.43 | 65.00 | 59974.83 | 32370.00 | -27604.83 |
| 99219 | Observation care | 485 | 116.26 | 94.00 | 56385.28 | 45590.00 | -10795.28 |
| 59812 | Treatment of miscarriage | 182 | 290.44 | 431.00 | 52859.74 | 78442.00 | 25582.26 |
| 58150-80 | Total hysterectomy AS | 220 | 239.01 | 252.00 | 52582.88 | 55440.00 | 2857.12 |
| 99202 | Office/outpatient visit, new | 610 | 66.17 | 50.00 | 40365.71 | 30500.00 | -9865.71 |
| 99205 | Office/outpatient visit, new | 214 | 177.45 | 155.00 | 37973.63 | 33170.00 | -4803.63 |
| 99222 | Initial hospital care | 297 | 116.99 | 94.00 | 34745.40 | 27918.00 | -6827.40 |
| 99244 | Office consultation | 187 | 176.44 | 138.00 | 32993.61 | 25806.00 | -7187.61 |
| 59025 | Fetal non-stress test | 665 | 42.86 | 58.00 | 28504.15 | 38570.00 | 10065.85 |
| 90782 | Injection, sc/im | 1413 | 18.90 | 5.00 | 26709.69 | 7065.00 | -19644.69 |
| 76856 | Us exam, pelvic, complete | 228 | 96.69 | 146.00 | 22045.81 | 33288.00 | 11242.19 |
| 99238 | Hospital discharge day | 257 | 73.14 | 63.00 | 18797.26 | 16191.00 | -2606.26 |
| Sum | | | | | 6937249.52 | 6940409.50 | 3159.98 |

Figure 6

WOMEN'S HEALTH CARE ASSOCIATES
PERIOD ENDING 123105 WITH 2005 WEIGHTS

| DOCTOR | MD Work | Practice | Malpractice | Total PLM RVUS |
|---|---|---|---|---|
| Meredith | 14,580 | 12,022 | 2,401 | 29,003 |
|  | 12.0% | 12.3% | 11.7% | 12.1% |
| Jackson | 14,999 | 12,229 | 2,512 | 29,740 |
|  | 12.3% | 12.5% | 12.2% | 12.4% |
| Weimer | 13,087 | 10,483 | 2,189 | 25,759 |
|  | 10.8% | 10.7% | 10.7% | 10.7% |
| Vetter | 12,517 | 9,868 | 1,946 | 24,332 |
|  | 10.3% | 10.1% | 9.5% | 10.1% |
| Lassiter | 11,405 | 9,464 | 1,834 | 22,703 |
|  | 9.4% | 9.7% | 8.9% | 9.5% |
| Davis | 13,517 | 10,693 | 2,434 | 26,643 |
|  | 11.1% | 10.9% | 11.9% | 11.1% |
| Tanner | 14,118 | 10,478 | 2,269 | 26,865 |
|  | 11.6% | 10.7% | 11.1% | 11.2% |
| Goodwin | 8,437 | 6,570 | 1,359 | 16,366 |
|  | 6.9% | 6.7% | 6.6% | 6.8% |
| Andrews | 6,148 | 5,865 | 865 | 12,879 |
|  | 5.1% | 6.0% | 4.2% | 5.4% |
| Pascal | 7,009 | 5,993 | 1,505 | 14,507 |
|  | 5.8% | 6.1% | 7.3% | 6.0% |
| Bates | 5,060 | 4,053 | 1,091 | 10,204 |
|  | 4.2% | 4.1% | 5.3% | 4.3% |
| Other | 611 | 264 | 126 | 1,000 |
|  | .5% | .3% | .6% | .4% |
| Total | 121,488 | 97,982 | 20,531 | 240,001 |
|  | 100.0% | 100.0% | 100.0% | 100.0% |

WOMEN'S HEALTH CARE ASSOCIATES
Established Patient Mix for Selected Services

| | | Meredith | | Jackson | | DOCTOR Weimer | | Vetter | |
|---|---|---|---|---|---|---|---|---|---|
| | | Sum | Column Sum % | Sum | Column Sum % | Sum | Column Sum % | Sum | Column Sum % |
| CPTCODE | 99211 | 10 | .8% | 24 | 1.5% | 68 | 4.1% | 7 | .5% |
| | 99212 | 538 | 41.2% | 193 | 11.7% | 548 | 32.7% | 87 | 6.6% |
| | 99213 | 533 | 40.8% | 1,052 | 64.0% | 779 | 46.5% | 632 | 48.1% |
| | 99214 | 225 | 17.2% | 375 | 22.8% | 268 | 16.0% | 566 | 43.0% |
| | 99215 | | .0% | 1 | .1% | 14 | .8% | 23 | 1.7% |
| Total Visits | | 1,306 | 100.0% | 1,645 | 100.0% | 1,677 | 100.0% | 1,315 | 100.0% |

9/5/2006

WOMEN'S HEALTH CARE ASSOCIATES
Established Patient Mix for Selected Services

| | | Lassiter | | Davis | | DOCTOR Tanner | | Goodwin | |
|---|---|---|---|---|---|---|---|---|---|
| | | Sum | Column Sum % | Sum | Column Sum % | Sum | Column Sum % | Sum | Column Sum % |
| CPTCODE | 99211 | 76 | 4.2% | 18 | 2.0% | 13 | 1.1% | 12 | 1.1% |
| | 99212 | 663 | 36.9% | 442 | 48.3% | 268 | 22.1% | 176 | 16.8% |
| | 99213 | 860 | 47.8% | 331 | 36.2% | 616 | 50.9% | 573 | 54.8% |
| | 99214 | 200 | 11.1% | 123 | 13.4% | 311 | 25.7% | 279 | 26.7% |
| | 99215 | | .0% | 1 | .1% | 2 | .2% | 6 | .6% |
| Total Visits | | 1,799 | 100.0% | 915 | 100.0% | 1,210 | 100.0% | 1,046 | 100.0% |

WOMEN'S HEALTH CARE ASSOCIATES
Established Patient Mix for Selected Services

| | | DOCTOR | | | | | | | |
|---|---|---|---|---|---|---|---|---|---|
| | | Andrews | | Pascal | | Bates | | Total Visits | |
| | | Sum | Column Sum % | Sum | Column Sum % | Sum | Column Sum % | Sum | Column Sum % |
| CPTCODE | 99211 | 46 | 2.3% | 8 | 5.5% | 1 | 1.6% | 283 | 2.2% |
| | 99212 | 558 | 27.6% | 62 | 42.8% | 11 | 17.7% | 3,546 | 27.0% |
| | 99213 | 1,274 | 63.1% | 74 | 51.0% | 44 | 71.0% | 6,768 | 51.5% |
| | 99214 | 141 | 7.0% | 1 | .7% | 6 | 9.7% | 2,495 | 19.0% |
| | 99215 | | .0% | | .0% | | .0% | 47 | .4% |
| Total Visits | | 2,019 | 100.0% | 145 | 100.0% | 62 | 100.0% | 13,139 | 100.0% |

WOMEN'S HEALTH CARE ASSOCIATES
Established Patient Mix for Selected Services

| | | CPTCODE | | | | | | | |
|---|---|---|---|---|---|---|---|---|---|
| | | 99211 | | 99212 | | 99213 | | 99214 | |
| | | Sum | Row Sum % | Sum | Row Sum % | Sum | Row Sum % | Sum | Row Sum % |
| DOCTOR | Meredith | 10 | .8% | 538 | 41.2% | 533 | 40.8% | 225 | 17.2% |
| | Jackson | 24 | 1.5% | 193 | 11.7% | 1,052 | 64.0% | 375 | 22.8% |
| | Weimer | 68 | 4.1% | 548 | 32.7% | 779 | 46.5% | 268 | 16.0% |
| | Vetter | 7 | .5% | 87 | 6.6% | 632 | 48.1% | 566 | 43.0% |
| | Lassiter | 76 | 4.2% | 663 | 36.9% | 860 | 47.8% | 200 | 11.1% |
| | Davis | 18 | 2.0% | 442 | 48.3% | 331 | 36.2% | 123 | 13.4% |
| | Tanner | 13 | 1.1% | 268 | 22.1% | 616 | 50.9% | 311 | 25.7% |
| | Goodwin | 12 | 1.1% | 176 | 16.8% | 573 | 54.8% | 279 | 26.7% |
| | Andrews | 46 | 2.3% | 558 | 27.6% | 1,274 | 63.1% | 141 | 7.0% |
| | Pascal | 8 | 5.5% | 62 | 42.8% | 74 | 51.0% | 1 | .7% |
| | Bates | 1 | 1.6% | 11 | 17.7% | 44 | 71.0% | 6 | 9.7% |
| | Total Visits | 283 | 2.2% | 3,546 | 27.0% | 6,768 | 51.5% | 2,495 | 19.0% |

WOMEN'S HEALTH CARE ASSOCIATES
Established Patient Mix for Selected Services

| | | CPTCODE | | | |
|---|---|---|---|---|---|
| | | 99215 | | Total Visits | |
| | | Sum | Row Sum % | Sum | Row Sum % |
| DOCTOR | Meredith | · | .0% | 1,306 | 100.0% |
| | Jackson | 1 | .1% | 1,645 | 100.0% |
| | Weimer | 14 | .8% | 1,677 | 100.0% |
| | Vetter | 23 | 1.7% | 1,315 | 100.0% |
| | Lassiter | · | .0% | 1,799 | 100.0% |
| | Davis | 1 | .1% | 915 | 100.0% |
| | Tanner | 2 | .2% | 1,210 | 100.0% |
| | Goodwin | 6 | .6% | 1,046 | 100.0% |
| | Andrews | · | .0% | 2,019 | 100.0% |
| | Pascal | · | .0% | 145 | 100.0% |
| | Bates | · | .0% | 62 | 100.0% |
| | Total Visits | 47 | .4% | 13,139 | 100.0% |

WOMEN'S HEALTH CARE ASSOCIATES
New Patient Mix for Selected Services

| | | CPTCODE | | | | | | | |
|---|---|---|---|---|---|---|---|---|---|
| | | 99201 | | 99202 | | 99203 | | 99204 | |
| DOCTOR | | Sum | Row Sum % | Sum | Row Sum % | Sum | Row Sum % | Sum | Row Sum % |
| | Meredith | 1 | .5% | 8 | 4.3% | 108 | 58.4% | 68 | 36.8% |
| | Jackson | 3 | 1.4% | 20 | 9.7% | 173 | 83.6% | 10 | 4.8% |
| | Weimer | 10 | 3.0% | 75 | 22.5% | 150 | 45.0% | 98 | 29.4% |
| | Vetter | | .0% | 6 | 2.8% | 41 | 18.9% | 120 | 55.3% |
| | Lassiter | 1 | .3% | 62 | 17.4% | 290 | 81.5% | 3 | .8% |
| | Davis | 4 | 1.9% | 68 | 31.5% | 93 | 43.1% | 51 | 23.6% |
| | Tanner | 5 | 2.1% | 51 | 21.2% | 76 | 31.5% | 99 | 41.1% |
| | Goodwin | 2 | .6% | 2 | .6% | 44 | 14.3% | 108 | 35.1% |
| | Andrews | 8 | 1.3% | 317 | 52.3% | 274 | 45.2% | 7 | 1.2% |
| | Pascal | 1 | 4.0% | 2 | 8.0% | 21 | 84.0% | 1 | 4.0% |
| | Bates | | .0% | | .0% | 22 | 95.7% | | .0% |
| | Other | | .0% | | .0% | 2 | 100.0% | | .0% |
| | Total Visits | 35 | 1.3% | 611 | 22.5% | 1,294 | 47.6% | 565 | 20.8% |

WOMEN'S HEALTH CARE ASSOCIATES
New Patient Mix for Selected Services

|  |  | CPTCODE | | Total Visits | |
|---|---|---|---|---|---|
|  |  | 99205 | | | |
| DOCTOR |  | Sum | Row Sum % | Sum | Row Sum % |
|  | Meredith |  | .0% | 185 | 100.0% |
|  | Jackson | 1 | .5% | 207 | 100.0% |
|  | Weimer |  | .0% | 333 | 100.0% |
|  | Vetter | 50 | 23.0% | 217 | 100.0% |
|  | Lassiter |  | .0% | 356 | 100.0% |
|  | Davis |  | .0% | 216 | 100.0% |
|  | Tanner | 10 | 4.1% | 241 | 100.0% |
|  | Goodwin | 152 | 49.4% | 308 | 100.0% |
|  | Andrews |  | .0% | 606 | 100.0% |
|  | Pascal |  | .0% | 25 | 100.0% |
|  | Bates | 1 | 4.3% | 23 | 100.0% |
|  | Other |  | .0% | 2 | 100.0% |
| Total Visits |  | 214 | 7.9% | 2,719 | 100.0% |

WOMEN'S HEALTH CARE ASSOCIATES
PERIOD ENDING 123105 WITH 2005 WEIGHTS

| DOCTOR | | Activity | MD Work |
|---|---|---|---|
| Meredith | Sum | 7,833 | 14,417 |
| | Mean | | 1.89 |
| Jackson | Sum | 7,869 | 14,854 |
| | Mean | | 1.93 |
| Weimer | Sum | 7,406 | 13,000 |
| | Mean | | 1.79 |
| Vetter | Sum | 6,458 | 12,408 |
| | Mean | | 1.96 |
| Lassiter | Sum | 7,418 | 11,377 |
| | Mean | | 1.54 |
| Davis | Sum | 6,109 | 13,398 |
| | Mean | | 2.25 |
| Tanner | Sum | 6,725 | 13,925 |
| | Mean | | 2.14 |
| Goodwin | Sum | 4,139 | 8,365 |
| | Mean | | 2.06 |
| Andrews | Sum | 6,992 | 6,101 |
| | Mean | | .88 |
| Pascal | Sum | 3,752 | 7,009 |
| | Mean | | 2.50 |
| Bates | Sum | 1,898 | 5,060 |
| | Mean | | 3.48 |
| Other | Sum | 155 | 523 |
| | Mean | | 9.18 |
| Total | Sum | 66,754 | 120,436 |
| | Mean | | 1.88 |

Figure 10B

VOLUME

WOMEN'S HEALTH CARE ASSOCIATES
PERIOD ENDING 123105

| CPTCODE | | Meredith | Jackson | Weimer | Vetter | Lassiter | Davis | Tarner | Goodwin | Andrews |
|---|---|---|---|---|---|---|---|---|---|---|
| 59400 | | 163 | 164 | 149 | 108 | 114 | 177 | 104 | 81 | 64 |
| 59409 | | | | | 3 | 1 | 10 | | 1 | |
| 59410 | | 1 | 3 | 3 | 8 | 2 | 10 | 4 | 3 | 1 |
| 59510 | | 78 | 83 | 77 | 65 | 65 | 89 | 103 | 58 | 17 |
| 59514 | | 4 | 2 | 5 | 6 | 3 | 10 | 4 | 6 | |
| 59515 | | 1 | | | | | | | | |
| 59610 | | | 6 | 3 | 2 | 1 | | | 1 | |
| 59612 | | | | | | | | | | |
| TOTAL DELIVERIES | | 248 | 258 | 237 | 192 | 186 | 296 | 215 | 150 | 82 |

WOMEN'S HEALTH CARE ASSOCIATES
PERIOD ENDING 123105

VOLUME

| CPTCODE | DOCTOR | | | Total |
|---|---|---|---|---|
| | Pascal | Bates | Other | |
| 59400 | 194 | 153 | 1 | 1,472 |
| 59409 | 23 | 4 | | 44 |
| 59410 | 6 | 1 | | 61 |
| 59510 | 1 | 13 | 19 | 649 |
| 59514 | | | 10 | 50 |
| 59515 | | | | 1 |
| 59610 | 4 | | | 17 |
| 59612 | 1 | | | 1 |
| TOTAL DELIVERIES | 229 | 171 | 31 | 2,295 |

WOMEN'S HEALTH CARE ASSOCIATES
PERIOD ENDING 123105 WITH 2005 WEIGHTS

TOTAL PLM RVUS

| | | TYPE | | | |
|---|---|---|---|---|---|
| DOCTOR | | GYN | MEDICAL | OB | TOTAL PLM RVUS |
| | Meredith | 8,496 | 3,999 | 16,266 | 28,761 |
| | | 29.5% | 13.9% | 56.6% | 100.0% |
| | Jackson | 9,789 | 2,513 | 17,215 | 29,517 |
| | | 33.2% | 8.5% | 58.3% | 100.0% |
| | Weimer | 9,507 | 1,606 | 14,507 | 25,620 |
| | | 37.1% | 6.3% | 56.6% | 100.0% |
| | Vetter | 10,571 | 1,386 | 12,204 | 24,161 |
| | | 43.8% | 5.7% | 50.5% | 100.0% |
| | Lassiter | 7,805 | 2,451 | 12,403 | 22,660 |
| | | 34.4% | 10.8% | 54.7% | 100.0% |
| | Davis | 6,230 | 2,232 | 17,995 | 26,457 |
| | | 23.5% | 8.4% | 68.0% | 100.0% |
| | Tanner | 9,123 | 2,741 | 14,706 | 26,571 |
| | | 34.3% | 10.3% | 55.3% | 100.0% |
| | Goodwin | 6,096 | 810 | 9,355 | 16,262 |
| | | 37.5% | 5.0% | 57.5% | 100.0% |
| | Andrews | 5,100 | 1,711 | 5,999 | 12,811 |
| | | 39.8% | 13.4% | 46.8% | 100.0% |
| | Pascal | 948 | 172 | 13,388 | 14,507 |
| | | 6.5% | 1.2% | 92.3% | 100.0% |
| | Bates | 585 | 162 | 9,456 | 10,204 |
| | | 5.7% | 1.6% | 92.7% | 100.0% |
| | Other | 20 | 24 | 820 | 864 |
| | | 2.3% | 2.7% | 94.9% | 100.0% |
| | Total | 74,272 | 19,808 | 144,315 | 238,395 |
| | | 31.2% | 8.3% | 60.5% | 100.0% |

WOMEN'S HEALTH CARE ASSOCIATES
PERIOD ENDING 123105 WITH 2005 WEIGHTS

TOTAL PLM RVUS

| DOCTOR | SELF PAY | BLUE CROSS | MEDICARE | INSURANCE MEDICAID | FAMILY CLINIC | CIGNA | OTHER | TRICARE |
|---|---|---|---|---|---|---|---|---|
| Meredith | 3,402 | 17,297 | 925 | 2,899 | 48 | 111 | 2,059 | 1,443 |
|  | 11.7% | 59.6% | 3.2% | 10.0% | .2% | .4% | 7.1% | 5.0% |
| Jackson | 3,342 | 19,511 | 401 | 1,561 | 101 | 168 | 1,604 | 1,850 |
|  | 11.2% | 65.6% | 1.3% | 5.2% | .3% | .6% | 5.4% | 6.2% |
| Weimer | 2,784 | 14,612 | 602 | 3,922 |  | 52 | 1,340 | 1,948 |
|  | 10.8% | 56.7% | 2.3% | 15.2% |  | .2% | 5.2% | 7.6% |
| Vetter | 2,594 | 10,402 | 1,326 | 5,258 | 44 | 59 | 1,118 | 3,027 |
|  | 10.7% | 42.8% | 5.4% | 21.6% | .2% | .2% | 4.6% | 12.4% |
| Lassiter | 2,350 | 13,383 | 634 | 2,037 | 3 | 121 | 1,719 | 1,675 |
|  | 10.4% | 58.9% | 2.8% | 9.0% | .0% | .5% | 7.6% | 7.4% |
| Davis | 3,994 | 13,021 | 585 | 3,643 |  | 203 | 1,664 | 2,934 |
|  | 15.0% | 48.9% | 2.2% | 13.7% |  | .8% | 6.2% | 11.0% |
| Tanner | 3,196 | 10,271 | 669 | 5,791 | 62 | 126 | 1,232 | 4,516 |
|  | 11.9% | 38.2% | 2.5% | 21.6% | .2% | .5% | 4.6% | 16.8% |
| Goodwin | 1,993 | 5,873 | 785 | 3,530 | 2 | 75 | 826 | 2,969 |
|  | 12.2% | 35.9% | 4.8% | 21.6% | .0% | .5% | 5.0% | 18.1% |
| Andrews | 1,671 | 7,034 | 229 | 1,700 | 44 | 96 | 880 | 953 |
|  | 13.0% | 54.6% | 1.8% | 13.2% | .3% | .7% | 6.8% | 7.4% |
| Pascal | 3,710 | 1,553 | 1 | 8,739 |  |  | 95 | 360 |
|  | 25.6% | 10.7% | .0% | 60.2% |  |  | .7% | 2.5% |
| Bates | 1,623 | 244 | 46 | 5,677 | 2,487 |  | 64 | 63 |
|  | 15.9% | 2.4% | .5% | 55.6% | 24.4% |  | .6% | .6% |
| Other | 262 | 331 | 25 | 325 |  |  | 25 | 32 |
|  | 26.2% | 33.1% | 2.5% | 32.5% |  |  | 2.5% | 3.2% |
| Total | 30,923 | 113,532 | 6,227 | 45,083 | 2,791 | 1,011 | 12,626 | 21,768 |
|  | 12.9% | 47.3% | 2.6% | 18.8% | 1.2% | .4% | 5.3% | 9.1% |

WOMEN'S HEALTH CARE ASSOCIATES
PERIOD ENDING 123105 WITH 2005 WEIGHTS

TOTAL PLM RVUS

| DOCTOR | INSURANCE | |
|---|---|---|
| | UNITED HC | TOTAL ALL PAYERS |
| Meredith | 818 | 29,003 |
| | 2.8% | 100.0% |
| Jackson | 1,203 | 29,740 |
| | 4.0% | 100.0% |
| Weimer | 499 | 25,759 |
| | 1.9% | 100.0% |
| Vetter | 504 | 24,332 |
| | 2.1% | 100.0% |
| Lassiter | 780 | 22,703 |
| | 3.4% | 100.0% |
| Davis | 599 | 26,643 |
| | 2.2% | 100.0% |
| Tanner | 1,002 | 26,865 |
| | 3.7% | 100.0% |
| Goodwin | 313 | 16,366 |
| | 1.9% | 100.0% |
| Andrews | 273 | 12,879 |
| | 2.1% | 100.0% |
| Pascal | 50 | 14,507 |
| | .3% | 100.0% |
| Bates | | 10,204 |
| | | 100.0% |
| Other | | 1,000 |
| | | 100.0% |
| Total | 6,040 | 240,001 |
| | 2.5% | 100.0% |

TOTAL PLM RVUS

WOMEN'S HEALTH CARE ASSOCIATES
PERIOD ENDING 123105 WITH 2005 WEIGHTS

| | | DOCTOR | | | | | | | | |
|---|---|---|---|---|---|---|---|---|---|---|
| INSURANCE | | Meredith | Jackson | Weimer | Vetter | Lassiter | Davis | Tanner | Goodwin | Andrews |
| | SELF PAY | 3,402 | 3,342 | 2,784 | 2,594 | 2,350 | 3,994 | 3,196 | 1,993 | 1,671 |
| | | 11.0% | 10.8% | 9.0% | 8.4% | 7.6% | 12.9% | 10.3% | 6.4% | 5.4% |
| | BLUE CROSS | 17,297 | 19,511 | 14,612 | 10,402 | 13,383 | 13,021 | 10,271 | 5,873 | 7,034 |
| | | 15.2% | 17.2% | 12.9% | 9.2% | 11.8% | 11.5% | 9.0% | 5.2% | 6.2% |
| | MEDICARE | 925 | 401 | 602 | 1,326 | 634 | 585 | 669 | 785 | 229 |
| | | 14.9% | 6.4% | 9.7% | 21.3% | 10.2% | 9.4% | 10.7% | 12.6% | 3.7% |
| | MEDICAID | 2,899 | 1,561 | 3,922 | 5,258 | 2,037 | 3,643 | 5,791 | 3,530 | 1,700 |
| | | 6.4% | 3.5% | 8.7% | 11.7% | 4.5% | 8.1% | 12.8% | 7.8% | 3.8% |
| | FAMILY CLINIC | 48 | 101 | | 44 | 3 | | 62 | 2 | 44 |
| | | 1.7% | 3.6% | | 1.6% | .1% | | 2.2% | 1% | 1.6% |
| | CIGNA | 111 | 168 | 52 | 59 | 121 | 203 | 126 | 75 | 96 |
| | | 11.0% | 16.6% | 5.1% | 5.9% | 12.0% | 20.1% | 12.4% | 7.4% | 9.5% |
| | OTHER | 2,059 | 1,604 | 1,340 | 1,118 | 1,719 | 1,664 | 1,232 | 826 | 880 |
| | | 16.3% | 12.7% | 10.6% | 8.9% | 13.6% | 13.2% | 9.8% | 6.5% | 7.0% |
| | TRICARE | 1,443 | 1,850 | 1,948 | 3,027 | 1,675 | 2,934 | 4,516 | 2,969 | 953 |
| | | 6.6% | 8.5% | 8.9% | 13.9% | 7.7% | 13.5% | 20.7% | 13.6% | 4.4% |
| | UNITED HC | 818 | 1,203 | 499 | 504 | 780 | 599 | 1,002 | 313 | 273 |
| | | 13.5% | 19.9% | 8.3% | 8.4% | 12.9% | 9.9% | 16.6% | 5.2% | 4.5% |
| | TOTAL ALL PAYERS | 29,003 | 29,740 | 25,759 | 24,332 | 22,703 | 26,643 | 26,865 | 16,366 | 12,879 |
| | | 12.1% | 12.4% | 10.7% | 10.1% | 9.5% | 11.1% | 11.2% | 6.8% | 5.4% |

Figure 12E

TOTAL PLM RVUS

WOMEN'S HEALTH CARE ASSOCIATES
PERIOD ENDING 123105 WITH 2005 WEIGHTS

| INSURANCE | | DOCTOR | | | |
|---|---|---|---|---|---|
| | | Pascal | Bates | Other | Total |
| SELF PAY | | 3,710 | 1,623 | 262 | 30,923 |
| | | 12.0% | 5.2% | .8% | 100.0% |
| BLUE CROSS | | 1,553 | 244 | 331 | 113,532 |
| | | 1.4% | .2% | .3% | 100.0% |
| MEDICARE | | 1 | 46 | 25 | 6,227 |
| | | .0% | .7% | .4% | 100.0% |
| MEDICAID | | 8,739 | 5,677 | 325 | 45,083 |
| | | 19.4% | 12.6% | .7% | 100.0% |
| FAMILY CLINIC | | | 2,487 | | 2,791 |
| | | | 89.1% | | 100.0% |
| CIGNA | | | | | 1,011 |
| | | | | | 100.0% |
| OTHER | | 95 | 64 | 25 | 12,626 |
| | | .7% | .5% | .2% | 100.0% |
| TRICARE | | 360 | 63 | 32 | 21,768 |
| | | 1.7% | .3% | .1% | 100.0% |
| UNITED HC | | 50 | | | 6,040 |
| | | .8% | | | 100.0% |
| TOTAL ALL PAYERS | | 14,507 | 10,204 | 1,000 | 240,001 |
| | | 6.0% | 4.3% | .4% | 100.0% |

WOMEN'S HEALTH CARE ASSOCIATES
PERIOD ENDING 123105 WITH 2005 WEIGHTS

| | | QUARTER | | | | | | | | |
|---|---|---|---|---|---|---|---|---|---|---|
| | | 1QTR05 | | 2QTR05 | | 3QTR05 | | 4QTR05 | | Total |
| | | Total PLM RVUS | | Total PLM RVUS | | Total PLM RVUS | | Total PLM RVUS | | Total PLM RVUS |
| DOCTOR | Meredith | 5,775 | 10.3% | 8,026 | 13.3% | 7,648 | 12.2% | 7,554 | 12.3% | 29,003 12.1% |
| | Jackson | 6,865 | 12.3% | 8,135 | 13.5% | 8,195 | 13.1% | 6,545 | 10.7% | 29,740 12.4% |
| | Weimer | 6,744 | 12.1% | 6,190 | 10.2% | 6,711 | 10.7% | 6,113 | 10.0% | 25,759 10.7% |
| | Vetter | 5,820 | 10.4% | 5,972 | 9.9% | 6,126 | 9.8% | 6,413 | 10.5% | 24,332 10.1% |
| | Lassiter | 5,470 | 9.8% | 5,743 | 9.5% | 5,616 | 9.0% | 5,874 | 9.6% | 22,703 9.5% |
| | Davis | 7,347 | 13.2% | 6,508 | 10.8% | 6,430 | 10.3% | 6,358 | 10.4% | 26,643 11.1% |
| | Tanner | 6,504 | 11.6% | 6,536 | 10.8% | 6,945 | 11.1% | 6,880 | 11.2% | 26,865 11.2% |
| | Goodwin | 3,731 | 6.7% | 4,238 | 7.0% | 4,295 | 6.9% | 4,102 | 6.7% | 16,366 6.8% |
| | Andrews | 2,064 | 3.7% | 3,267 | 5.4% | 3,819 | 6.1% | 3,728 | 6.1% | 12,879 5.4% |
| | Pascal | 3,220 | 5.8% | 3,444 | 5.7% | 3,818 | 6.1% | 4,025 | 6.6% | 14,507 6.0% |
| | Bates | 2,292 | 4.1% | 2,194 | 3.6% | 2,565 | 4.1% | 3,154 | 5.1% | 10,204 4.3% |
| | Other | 6 | .0% | 141 | .2% | 330 | .5% | 523 | .9% | 1,000 .4% |
| | Total | 55,839 | 100.0% | 60,394 | 100.0% | 62,498 | 100.0% | 61,270 | 100.0% | 240,001 100.0% |

WOMEN'S HEALTH CARE ASSOCIATES
COMMERCIAL PAYER

| DOCTOR | MD Work | Practice | Malpractice | Total PLM RVUS |
|---|---|---|---|---|
| Meredith | 8,841 | 7,063 | 1,393 | 17,297 |
|  | 15.3% | 15.1% | 15.5% | 15.2% |
| Jackson | 9,939 | 7,926 | 1,645 | 19,511 |
|  | 17.2% | 17.0% | 18.3% | 17.2% |
| Weimer | 7,521 | 5,896 | 1,196 | 14,612 |
|  | 13.0% | 12.6% | 13.3% | 12.9% |
| Vetter | 5,358 | 4,287 | 757 | 10,402 |
|  | 9.3% | 9.2% | 8.4% | 9.2% |
| Lassiter | 6,741 | 5,612 | 1,030 | 13,383 |
|  | 11.6% | 12.0% | 11.5% | 11.8% |
| Davis | 6,620 | 5,280 | 1,120 | 13,021 |
|  | 11.4% | 11.3% | 12.5% | 11.5% |
| Tanner | 5,398 | 4,097 | 777 | 10,271 |
|  | 9.3% | 8.8% | 8.6% | 9.0% |
| Goodwin | 3,040 | 2,405 | 429 | 5,873 |
|  | 5.3% | 5.2% | 4.8% | 5.2% |
| Andrews | 3,329 | 3,296 | 408 | 7,034 |
|  | 5.8% | 7.1% | 4.5% | 6.2% |
| Pascal | 772 | 611 | 169 | 1,553 |
|  | 1.3% | 1.3% | 1.9% | 1.4% |
| Bates | 120 | 100 | 24 | 244 |
|  | .2% | .2% | .3% | .2% |
| Other | 202 | 91 | 38 | 331 |
|  | .3% | .2% | .4% | .3% |
| Total | 57,881 | 46,666 | 8,986 | 113,532 |
|  | 100.0% | 100.0% | 100.0% | 100.0% |

WOMEN'S HEALTH CARE ASSOCIATES
PROCEDURE COST, PROCEDURE MARGIN, PAYER MARGIN AND PAYER PERCENT MARGIN
COMMERCIAL PAYER

| CODE | DESCRIPTION | PAYER VOLUME | PROCEDURE COST | AGGREGATE COST | PAYER FEE | PROCEDURE MARGIN | PROJECTED COLLECTIONS | AGGREGATE MARGIN |
|---|---|---|---|---|---|---|---|---|
| 59400 | Obstetrical care | 607 | 1698.29 | 1030861.68 | 1999.00 | 300.71 | 1213393.00 | 182531.32 |
| 58563 | Hysteroscopy, ablation | 165 | 377.12 | 62224.34 | 810.00 | 432.88 | 133650.00 | 71425.66 |
| 59514-80 | Cesarean delivery only AS | 273 | 253.91 | 69318.29 | 407.50 | 153.59 | 111247.50 | 41929.21 |
| 76830 | Transvaginal us, non-ob | 1315 | 96.69 | 127150.20 | 122.00 | 25.31 | 160430.00 | 33279.80 |
| J1950 | Leuprolide acetate /3.75 MG | 342 | .00 | .00 | 90.35 | 90.35 | 30899.70 | 30899.70 |
| 58670 | Laparoscopy, tubal cautery | 62 | 370.41 | 22965.59 | 866.00 | 495.59 | 53692.00 | 30726.41 |
| 58605 | Division of fallopian tube | 78 | 337.30 | 26309.71 | 692.00 | 354.70 | 53976.00 | 27666.29 |
| 59510 | Cesarean delivery | 310 | 1925.19 | 596810.29 | 1999.00 | 73.81 | 619690.00 | 22879.71 |
| 58858 | Hysteroscopy, biopsy | 101 | 292.17 | 29509.63 | 495.00 | 202.83 | 49995.00 | 20485.37 |
| 49320 | Diag laparo separate proc | 55 | 325.39 | 17896.28 | 660.00 | 334.61 | 36300.00 | 18403.72 |
| 58661 | Laparoscopy, remove adnexa | 32 | 682.60 | 21843.23 | 1251.00 | 568.40 | 40032.00 | 18188.77 |
| 59025 | Fetal non-stress test | 988 | 42.86 | 42349.02 | 58.00 | 15.14 | 57304.00 | 14954.98 |
| J7302 | Levonorgestrel iu contracept | 36 | .00 | .00 | 395.00 | 395.00 | 14220.00 | 14220.00 |
| 59812 | Treatment of miscarriage | 98 | 290.44 | 28462.94 | 431.00 | 140.56 | 42238.00 | 13775.06 |
| 57288 | Repair bladder defect | 20 | 782.04 | 15640.77 | 1455.00 | 672.96 | 29100.00 | 13459.23 |
| 58662 | Laparoscopy, excise lesions | 114 | 739.97 | 84356.84 | 856.00 | 116.03 | 97584.00 | 13227.16 |
| 49000 | Exploration of abdomen | 25 | 722.95 | 18073.70 | 1251.00 | 528.05 | 31275.00 | 13201.30 |
| 84144 | Assay of progesterone | 1335 | .00 | .00 | 8.73 | 8.73 | 11654.55 | 11654.55 |
| 58750 | Repair oviduct | 8 | 936.37 | 7490.98 | 2375.00 | 1438.63 | 19000.00 | 11509.02 |
| 64450 | N block, other peripheral | 373 | 73.69 | 27486.92 | 103.00 | 29.31 | 38419.00 | 10932.08 |
| 58260 | Vaginal hysterectomy | 48 | 826.13 | 39654.33 | 1008.00 | 181.87 | 48384.00 | 8729.67 |
| 76856 | Us exam, pelvic, complete | 154 | 96.69 | 14890.59 | 146.00 | 49.31 | 22484.00 | 7593.41 |
| 57282 | Colpopexy, extraperitoneal | 8 | 480.10 | 3840.81 | 1333.00 | 852.90 | 10664.00 | 6823.19 |
| 58140 | Myomectomy abdom method | 14 | 915.27 | 12813.82 | 1390.00 | 474.73 | 19460.00 | 6646.18 |
| 58150 | Total hysterectomy | 125 | 956.05 | 119506.55 | 1008.00 | 51.95 | 126000.00 | 6493.45 |
| 87210 | Smear, wet mount, saline/ink | 1115 | .00 | .00 | 5.00 | 5.00 | 5575.00 | 5575.00 |
| 59025 | Fetal non-stress test | 365 | 42.86 | 15645.13 | 58.00 | 15.14 | 21170.00 | 5524.87 |
| 81025 | Urine pregnancy test | 661 | .00 | .00 | 8.10 | 8.10 | 5354.10 | 5354.10 |
| 58555 | Hysteroscopy, dx, sep proc | 36 | 229.52 | 8262.75 | 360.00 | 130.48 | 12960.00 | 4697.25 |
| J7300 | Intraut copper contraceptive | 14 | .00 | .00 | 326.88 | 326.88 | 4576.32 | 4576.32 |
| 57505 | Endocervical curettage | 58 | 104.21 | 6044.28 | 179.00 | 74.79 | 10382.00 | 4337.72 |
| 59514 | Cesarean delivery only | 7 | 1015.65 | 7109.57 | 1630.00 | 614.35 | 11410.00 | 4300.43 |
| 58858 | Hysteroscopy, biopsy | 21 | 292.17 | 6135.66 | 495.00 | 202.83 | 10395.00 | 4259.34 |
| 58340 | Catheter for hysterography | 94 | 62.64 | 5887.88 | 104.00 | 41.36 | 9776.00 | 3888.12 |
| 59410 | Obstetrical care | 12 | 960.08 | 11520.98 | 1266.00 | 305.92 | 15192.00 | 3671.02 |
| 59400 | Obstetrical care | 12 | 1698.29 | 20379.47 | 1999.00 | 300.71 | 23988.00 | 3608.53 |
| 57220 | Revision of urethra | 6 | 305.65 | 1833.93 | 887.00 | 581.35 | 5322.00 | 3488.07 |
| 57520 | Conization of cervix | 11 | 285.62 | 3141.82 | 554.00 | 268.38 | 6094.00 | 2952.18 |
| 82270 | Test for blood, feces | 668 | .00 | .00 | 4.20 | 4.20 | 2805.60 | 2805.60 |
| 59151 | Treat ectopic pregnancy | 4 | 788.41 | 3153.63 | 1435.00 | 646.59 | 5740.00 | 2586.37 |
| 81005 | Urinalysis | 431 | .00 | .00 | 6.00 | 6.00 | 2586.00 | 2586.00 |
| 57288-80 | Repair bladder defect AS | 15 | 195.51 | 2932.64 | 363.75 | 168.24 | 5456.25 | 2523.61 |
| 56620 | Partial removal of vulva | 3 | 509.71 | 1529.12 | 1333.00 | 823.29 | 3999.00 | 2469.88 |
| 58120 | Dilation and curettage | 16 | 215.04 | 3440.67 | 369.00 | 153.96 | 5904.00 | 2463.33 |
| 49321 | Laparoscopy, biopsy | 5 | 340.17 | 1700.87 | 825.00 | 494.83 | 4125.00 | 2424.13 |
| 56810 | Repair of perineum | 9 | 268.08 | 2412.74 | 528.00 | 259.92 | 4752.00 | 2339.26 |
| 58263 | Vag hyst w/t/o & vag repair | 11 | 1007.94 | 11087.36 | 1218.00 | 210.06 | 13398.00 | 2310.64 |
| 49000-80 | Exploration of abdomen AS | 17 | 180.74 | 3072.53 | 312.75 | 132.01 | 5316.75 | 2244.22 |
| 57061 | Destroy vag lesions, simple | 9 | 116.35 | 1047.17 | 338.00 | 221.65 | 3042.00 | 1994.83 |
| 58260-80 | Vaginal hysterectomy AS | 42 | 206.53 | 8674.38 | 252.00 | 45.47 | 10584.00 | 1909.62 |
| 99241 | Office consultation | 83 | 51.05 | 4237.08 | 74.00 | 22.95 | 6142.00 | 1904.92 |

Figure 14A

WOMEN'S HEALTH CARE ASSOCIATES
PROCEDURE COST, PROCEDURE MARGIN, PAYER MARGIN AND PAYER PERCENT MARGIN
COMMERCIAL PAYER

| CODE | DESCRIPTION | PAYER VOLUME | PROCEDURE COST | AGGREGATE COST | PAYER FEE | PROCEDURE MARGIN | PROJECTED COLLECTIONS | AGGREGATE MARGIN |
|---|---|---|---|---|---|---|---|---|
| 57260 | Repair of vagina | 10 | 546.48 | 5464.82 | 733.00 | 186.52 | 7330.00 | 1865.18 |
| 58550 | Laparo-asst vag hysterectomy | 9 | 902.57 | 8123.16 | 1108.00 | 205.43 | 9972.00 | 1848.84 |
| 58262 | Vag hyst including t/o | 10 | 931.93 | 9319.31 | 1108.00 | 176.07 | 11080.00 | 1760.69 |
| 58150-80 | Total hysterectomy AS | 130 | 239.01 | 31071.70 | 252.00 | 12.99 | 32760.00 | 1688.30 |
| 81002 | Urinalysis nonauto w/o scope | 350 | .00 | .00 | 4.50 | 4.50 | 1575.00 | 1575.00 |
| 51840 | Attach bladder/urethra | 2 | 674.77 | 1349.54 | 1451.00 | 776.23 | 2902.00 | 1552.46 |
| 58555 | Hysteroscopy, dx. sep proc | 10 | 206.17 | 2061.75 | 360.00 | 153.83 | 3600.00 | 1538.25 |
| 57282-80 | Colpopexy, extraperitoneal A | 7 | 120.03 | 840.18 | 333.25 | 213.22 | 2332.75 | 1492.57 |
| 56440 | Surgery for vulva lesion | 6 | 189.95 | 1139.69 | 436.00 | 246.05 | 2616.00 | 1476.31 |
| 59610 | Vbac delivery | 7 | 1794.85 | 12563.98 | 1999.00 | 204.15 | 13993.00 | 1429.02 |
| J2790 | Rho d immune globulin inj | 50 | .00 | .00 | 28.00 | 28.00 | 1400.00 | 1400.00 |
| 57250 | Repair rectum & vagina | 6 | 377.76 | 2266.53 | 584.00 | 206.24 | 3504.00 | 1237.47 |
| 59320 | Revision of cervix | 4 | 167.75 | 671.00 | 477.00 | 309.25 | 1908.00 | 1237.00 |
| 56605 | Biopsy of vulva/perineum | 14 | 88.38 | 1237.27 | 174.00 | 85.62 | 2436.00 | 1198.73 |
| 58750-80 | Repair oviduct AS | 3 | 234.09 | 702.28 | 593.75 | 359.66 | 1781.25 | 1078.97 |
| J0696 | Ceftriaxone sodium injection | 68 | .00 | .00 | 15.82 | 15.82 | 1075.76 | 1075.76 |
| 58140-80 | Myomectomy abdom method AS | 9 | 228.82 | 2059.36 | 347.50 | 118.68 | 3127.50 | 1068.14 |
| 58660 | Laparoscopy, lysis | 27 | 698.96 | 18871.89 | 730.00 | 31.04 | 19710.00 | 838.11 |
| 99211 | Office/outpatient visit, est | 150 | 21.46 | 3218.45 | 27.00 | 5.54 | 4050.00 | 831.55 |
| 57265 | Extensive repair of vagina | 3 | 727.07 | 2181.20 | 979.00 | 251.93 | 2937.00 | 755.80 |
| 59150 | Treat ectopic pregnancy | 12 | 795.03 | 9540.36 | 856.00 | 60.97 | 10272.00 | 731.64 |
| 58180-50 | Partial hysterectomy BP | 1 | 1425.44 | 1425.44 | 2067.00 | 641.56 | 2067.00 | 641.56 |
| 57284 | Repair paravaginal defect | 1 | 825.79 | 825.79 | 1461.00 | 635.21 | 1461.00 | 635.21 |
| 57240 | Repair bladder & vagina | 2 | 407.05 | 814.10 | 707.00 | 299.95 | 1414.00 | 599.90 |
| 49200 | Removal of abdominal lesion | 1 | 641.67 | 641.67 | 1199.00 | 557.33 | 1199.00 | 557.33 |
| 58263-80 | Vag hyst w/t/o & vag repair | 10 | 251.99 | 2519.86 | 304.50 | 52.51 | 3045.00 | 525.14 |
| 51550 | Partial removal of bladder | 1 | 926.77 | 926.77 | 1450.00 | 523.23 | 1450.00 | 523.23 |
| 58550-80 | Laparo-asst vag hysterectomy | 10 | 225.64 | 2256.43 | 277.00 | 51.36 | 2770.00 | 513.57 |
| 56405 | I & D of vulva/perineum | 8 | 113.11 | 904.85 | 174.00 | 60.89 | 1392.00 | 487.15 |
| 58180 | Partial hysterectomy | 1 | 950.29 | 950.29 | 1378.00 | 427.71 | 1378.00 | 427.71 |
| 59160 | D & c after delivery | 2 | 211.82 | 423.64 | 425.00 | 213.18 | 850.00 | 426.36 |
| 58300 | Insert intrauterine device | 47 | 97.13 | 4565.18 | 106.00 | 8.87 | 4982.00 | 416.82 |
| 58152 | Total hysterectomy | 6 | 1281.23 | 7687.40 | 1348.00 | 66.77 | 8088.00 | 400.60 |
| 49000-78 | Exploration of abdomen RTOR | 1 | 542.21 | 542.21 | 938.25 | 396.04 | 938.25 | 396.04 |
| 57280 | Suspension of vagina | 1 | 937.74 | 937.74 | 1322.00 | 384.26 | 1322.00 | 384.26 |
| 58262-80 | Vag hyst including t/o AS | 8 | 232.98 | 1863.86 | 277.00 | 44.02 | 2216.00 | 352.14 |
| 57505 | Endocervical curettage | 4 | 91.08 | 364.32 | 179.00 | 87.92 | 716.00 | 351.68 |
| 58720 | Removal of ovary/tube(s) | 1 | 720.35 | 720.35 | 1065.00 | 344.65 | 1065.00 | 344.65 |
| 59871 | Remove cerclage suture | 1 | 146.52 | 146.52 | 477.00 | 330.48 | 477.00 | 330.48 |
| 58322 | Artificial insemination | 4 | 93.12 | 372.47 | 174.00 | 80.88 | 696.00 | 323.53 |
| J1055 | Medrxyprogester acetate inj | 40 | .00 | .00 | 7.64 | 7.64 | 305.60 | 305.60 |
| 57452 | Exam of cervix w/scope | 53 | 113.69 | 6025.83 | 119.00 | 5.31 | 6307.00 | 281.17 |
| 58560 | Hysteroscopy, resect septum | 1 | 426.07 | 426.07 | 707.00 | 280.93 | 707.00 | 280.93 |
| 13160 | Late closure of wound | 1 | 740.37 | 740.37 | 1005.00 | 264.63 | 1005.00 | 264.63 |
| 52000 | Cystoscopy | 23 | 114.06 | 2623.37 | 125.00 | 10.94 | 2875.00 | 251.63 |
| 57260-80 | Repair of vagina AS | 5 | 136.62 | 683.10 | 183.25 | 46.63 | 916.25 | 233.15 |
| 56605 | Biopsy of vulva/perineum | 2 | 66.12 | 132.25 | 174.00 | 107.88 | 348.00 | 215.75 |
| 76946 | Echo guide for amniocentesis | 5 | 80.55 | 402.74 | 120.00 | 39.45 | 600.00 | 197.26 |
| 76946 | Echo guide for amniocentesis | 5 | 80.55 | 402.74 | 120.00 | 39.45 | 600.00 | 197.26 |
| 51840-80 | Attach bladder/urethra AS | 1 | 168.69 | 168.69 | 362.75 | 194.06 | 362.75 | 194.06 |
| 64640 | Injection treatment of nerve | 12 | 189.12 | 2269.41 | 205.00 | 15.88 | 2460.00 | 190.59 |

Figure 14B

WOMEN'S HEALTH CARE ASSOCIATES
PROCEDURE COST, PROCEDURE MARGIN, PAYER MARGIN AND PAYER PERCENT MARGIN
COMMERCIAL PAYER

| CODE | DESCRIPTION | PAYER VOLUME | PROCEDURE COST | AGGREGATE COST | PAYER FEE | PROCEDURE MARGIN | PROJECTED COLLECTIONS | AGGREGATE MARGIN |
|---|---|---|---|---|---|---|---|---|
| 57065 | Destroy vag lesions, complex | 1 | 200.68 | 200.68 | 390.00 | 189.32 | 390.00 | 189.32 |
| 59409-51 | Obstetrical care MP | 1 | 430.17 | 430.17 | 615.00 | 184.83 | 615.00 | 184.83 |
| 56605-25 | Biopsy of vulva/perineum SP | 2 | 88.38 | 176.75 | 174.00 | 85.62 | 348.00 | 171.25 |
| 57250-80 | Repair rectum & vagina AS | 3 | 94.44 | 283.32 | 146.00 | 51.56 | 438.00 | 154.68 |
| 57505-25 | Endocervical curettage SP | 2 | 104.21 | 208.42 | 179.00 | 74.79 | 358.00 | 149.58 |
| 76770 | Us exam abdo back wall, comp | 2 | 115.88 | 231.75 | 190.00 | 74.12 | 380.00 | 148.25 |
| 57220-80 | Revision of urethra AS | 1 | 76.41 | 76.41 | 221.75 | 145.34 | 221.75 | 145.34 |
| 56700 | Partial removal of hymen | 2 | 109.52 | 219.03 | 246.00 | 66.11 | 492.00 | 132.23 |
| 57410 | Pelvic examination | 4 | 109.52 | 438.09 | 142.00 | 32.48 | 568.00 | 129.91 |
| 57265-51 | Extensive repair of vagina M | 1 | 363.53 | 363.53 | 489.50 | 125.97 | 489.50 | 125.97 |
| 57265-80 | Extensive repair of vagina A | 2 | 181.77 | 363.53 | 244.75 | 62.98 | 489.50 | 125.97 |
| 90658 | Flu vaccine, 3 yrs & >, im | 16 | .00 | .00 | 7.50 | 7.50 | 120.00 | 120.00 |
| 87480 | Candida, dna, dir probe | 2 | .00 | .00 | 59.50 | 59.50 | 119.00 | 119.00 |
| J1390 | Estradiol valerate 20 MG inj | 76 | .00 | .00 | 1.32 | 1.32 | 100.32 | 100.32 |
| 76818 | Fetal biophys profile w/nst | 7 | 121.08 | 847.53 | 135.00 | 13.92 | 945.00 | 97.47 |
| 57280-80 | Suspension of vagina AS | 1 | 234.44 | 234.44 | 330.50 | 96.06 | 330.50 | 96.06 |
| G0008 | Admin influenza virus vac. | 16 | .00 | .00 | 6.00 | 6.00 | 96.00 | 96.00 |
| 76076 | Dxa bone density/peripheral | 4 | 41.48 | 165.92 | 65.00 | 23.52 | 260.00 | 94.08 |
| 59510-80 | Cesarean delivery AS | 5 | 481.30 | 2406.49 | 499.75 | 18.45 | 2498.75 | 92.26 |
| 99242 | Office consultation | 5 | 72.59 | 362.94 | 91.00 | 18.41 | 455.00 | 92.06 |
| 57135 | Remove vagina lesion | 1 | 179.74 | 179.74 | 267.00 | 87.26 | 267.00 | 87.26 |
| 58720-80 | Removal of ovary/tube(s) AS | 1 | 180.09 | 180.09 | 266.25 | 86.16 | 266.25 | 86.16 |
| 59841 | Abortion | 2 | 366.98 | 733.96 | 410.00 | 43.02 | 820.00 | 86.04 |
| 99213 | Office/outpatient visit, est | 10 | 36.88 | 368.79 | 45.00 | 8.12 | 450.00 | 81.21 |
| 58700 | Removal of fallopian tube | 1 | 760.87 | 760.87 | 841.00 | 80.13 | 841.00 | 80.13 |
| 57240-80 | Repair bladder & vagina AS | 1 | 101.76 | 101.76 | 176.75 | 74.99 | 176.75 | 74.99 |
| 56405 | I & D of vulva/perineum | 1 | 106.17 | 106.17 | 174.00 | 67.83 | 174.00 | 67.83 |
| 58152-80 | Total hysterectomy AS | 4 | 320.31 | 1281.23 | 337.00 | 16.69 | 1348.00 | 66.77 |
| 87510 | Gardner vag, dna, dir probe | 1 | .00 | .00 | 59.50 | 59.50 | 59.50 | 59.50 |
| 87797 | Detect agent nos, dna, dir | 1 | .00 | .00 | 59.50 | 59.50 | 59.50 | 59.50 |
| 76810 | Ob us >/= 14 wks, addl fetus | 4 | 100.33 | 401.31 | 115.00 | 14.67 | 460.00 | 58.69 |
| 59020 | Fetal contract stress test | 5 | 65.21 | 326.03 | 76.00 | 10.79 | 380.00 | 53.97 |
| J0970 | Estradiol valerate injection | 2 | 26.65 | 53.30 | 26.65 | 26.65 | 53.30 | 53.30 |
| 76857 | Us exam, pelvic, limited | 9 | 85.18 | 766.61 | 91.00 | 5.82 | 819.00 | 52.39 |
| 99253 | Initial inpatient consult | 14 | 102.32 | 1432.51 | 106.00 | 3.68 | 1484.00 | 51.49 |
| 58558-80 | Hysteroscopy, biopsy AS | 1 | 73.04 | 73.04 | 123.75 | 50.71 | 123.75 | 50.71 |
| 76830 | Transvaginal us, non-ob | 2 | 96.69 | 193.38 | 122.00 | 25.31 | 244.00 | 50.62 |
| 57800 | Dilation of cervical canal | 1 | 62.23 | 62.23 | 106.00 | 43.77 | 106.00 | 43.77 |
| 59020 | Fetal contract stress test | 4 | 65.21 | 260.83 | 76.00 | 10.79 | 304.00 | 43.17 |
| 76818 | Fetal biophys profile w/nst | 3 | 121.08 | 363.23 | 135.00 | 13.92 | 405.00 | 41.77 |
| J9260 | Methotrexate sodium inj | 10 | .00 | .00 | 4.16 | 4.16 | 41.60 | 41.60 |
| J1080 | Testosterone cypionat 200 MG | 4 | .00 | .00 | 9.41 | 9.41 | 37.64 | 37.64 |
| 10180 | Complex drainage, wound | 1 | 212.15 | 212.15 | 246.00 | 33.85 | 246.00 | 33.85 |
| 99252 | Initial inpatient consult | 2 | 74.86 | 149.72 | 91.00 | 16.14 | 182.00 | 32.28 |
| 56501 | Destroy, vulva lesions, sim | 4 | 113.44 | 453.77 | 120.00 | 6.56 | 480.00 | 26.23 |
| 84703 | Chorionic gonadotropin assay | 3 | .00 | .00 | 8.10 | 8.10 | 24.30 | 24.30 |
| 99231 | Subsequent hospital care | 5 | 35.31 | 176.54 | 39.00 | 3.69 | 195.00 | 18.46 |
| 57454 | Bx/curett of cervix w/scope | 2 | 146.65 | 293.31 | 155.00 | 8.35 | 310.00 | 16.69 |
| 87430 | Strep a ag, eia | 1 | .00 | .00 | 16.00 | 16.00 | 16.00 | 16.00 |
| 59000 | Amniocentesis, diagnostic | 7 | 88.90 | 622.28 | 91.00 | 2.10 | 637.00 | 14.72 |
| 99243 | Office consultation | 1 | 97.26 | 97.26 | 107.00 | 9.74 | 107.00 | 9.74 |

Figure 14C

WOMEN'S HEALTH CARE ASSOCIATES
PROCEDURE COST, PROCEDURE MARGIN, PAYER MARGIN AND PAYER PERCENT MARGIN
COMMERCIAL PAYER

| CODE | DESCRIPTION | PAYER VOLUME | PROCEDURE COST | AGGREGATE COST | PAYER FEE | PROCEDURE MARGIN | PROJECTED COLLECTIONS | AGGREGATE MARGIN |
|---|---|---|---|---|---|---|---|---|
| 58673 | Laparoscopy, salpingostomy | 1 | 856.64 | 856.64 | 866.00 | 9.36 | 866.00 | 9.36 |
| 88150 | Cytopath, c/v, manual | 1 | .00 | .00 | 8.50 | 8.50 | 8.50 | 8.50 |
| J3301 | Triamcinolone acetonide inj | 5 | .00 | .00 | 1.60 | 1.60 | 8.00 | 8.00 |
| J0704 | Betamethasone sod phosp/4 MG | 3 | .00 | .00 | 2.38 | 2.38 | 7.14 | 7.14 |
| 76705 | Echo exam of abdomen | 2 | 86.78 | 173.56 | 90.00 | 3.22 | 180.00 | 6.44 |
| 52000-51 | Cystoscopy MP | 1 | 57.03 | 57.03 | 62.50 | 5.47 | 62.50 | 5.47 |
| 57452-25 | Exam of cervix w/scope SP | 1 | 113.69 | 113.69 | 119.00 | 5.31 | 119.00 | 5.31 |
| 87210 | Smear, wet mount, saline/ink | 1 | .00 | .00 | 5.00 | 5.00 | 5.00 | 5.00 |
| 99218 | Observation care | 1 | 69.89 | 69.89 | 74.00 | 4.11 | 74.00 | 4.11 |
| 64450 | N block, other peripheral | 2 | 101.41 | 202.83 | 103.00 | 1.59 | 206.00 | 3.17 |
| J3420 | vitamin b12 injection | 3 | .00 | .00 | 1.00 | 1.00 | 3.00 | 3.00 |
| 56420 | Drainage of gland abscess | 1 | 100.12 | 100.12 | 103.00 | 2.88 | 103.00 | 2.88 |
| J3480 | Inj potassium chloride | 2 | .00 | .00 | 1.00 | 1.00 | 2.00 | 2.00 |
| 99202 | Office/outpatient visit, new | 1 | 48.66 | 48.66 | 50.00 | 1.34 | 50.00 | 1.34 |
| J3140 | Testosterone suspension inj | 1 | .00 | .00 | 1.00 | 1.00 | 1.00 | 1.00 |
| 81000 | Urinalysis, nonauto w/scope | 107 | .00 | .00 | .00 | .00 | .00 | .00 |
| 81007 | Urine screen for bacteria | 34 | .00 | .00 | .00 | .00 | .00 | .00 |
| 82120 | Amines, vaginal fluid qual | 510 | .00 | .00 | .00 | .00 | .00 | .00 |
| 82670 | Assay of estradiol | 299 | .00 | .00 | .00 | .00 | .00 | .00 |
| 83001 | Gonadotropin (FSH) | 284 | .00 | .00 | .00 | .00 | .00 | .00 |
| 83002 | Gonadotropin (LH) | 176 | .00 | .00 | .00 | .00 | .00 | .00 |
| 83986 | Assay of body fluid acidity | 588 | .00 | .00 | .00 | .00 | .00 | .00 |
| 84146 | Assay of prolactin | 154 | .00 | .00 | .00 | .00 | .00 | .00 |
| 84403 | Assay of total testosterone | 57 | .00 | .00 | .00 | .00 | .00 | .00 |
| 84443 | Assay thyroid stim hormone | 644 | .00 | .00 | .00 | .00 | .00 | .00 |
| 84479 | Assay of thyroid (t3 or t4) | 1 | .00 | .00 | .00 | .00 | .00 | .00 |
| 84702 | Chorionic gonadotropin test | 1022 | .00 | .00 | .00 | .00 | .00 | .00 |
| 85014 | Hematocrit | 6 | .00 | .00 | .00 | .00 | .00 | .00 |
| 85018 | Hemoglobin | 7 | .00 | .00 | .00 | .00 | .00 | .00 |
| 85025 | Complete cbc w/auto diff wbc | 768 | .00 | .00 | .00 | .00 | .00 | .00 |
| 86304 | Immunoassay, tumor, ca 125 | 6 | .00 | .00 | .00 | .00 | .00 | .00 |
| 87081 | Culture screen only | 1 | .00 | .00 | .00 | .00 | .00 | .00 |
| 87490 | Chylmd trach, dna, dir probe | 11 | .00 | .00 | .00 | .00 | .00 | .00 |
| 87590 | N.gonorrhoeae, dna, dir prob | 10 | .00 | .00 | .00 | .00 | .00 | .00 |
| 87880 | Strep a assay w/optic | 1 | .00 | .00 | .00 | .00 | .00 | .00 |
| 89320 | Semen analysis, complete | 3 | .00 | .00 | .00 | .00 | .00 | .00 |
| 90384 | Rh 1g, full-dose, im | 30 | .00 | .00 | .00 | .00 | .00 | .00 |
| 99000 | Specimen handling | 42 | .00 | .00 | .00 | .00 | .00 | .00 |
| A4338 | Indwelling catheter latex | 1 | .00 | .00 | .00 | .00 | .00 | .00 |
| A4561 | Pessary, rubber, any type | 2 | .00 | .00 | .00 | .00 | .00 | .00 |
| A4562 | Pessary, non rubber,any type | 1 | .00 | .00 | .00 | .00 | .00 | .00 |
| J1000 | Depo-estradiol cypionate inj | 1 | .00 | .00 | .00 | .00 | .00 | .00 |
| J1030 | Methylprednisolone 40 MG inj | 1 | .00 | .00 | .00 | .00 | .00 | .00 |
| J1051 | Medroxyprogesterone inj | 9 | .00 | .00 | .00 | .00 | .00 | .00 |
| J2001 | Lidocaine injection | 9 | .00 | .00 | .00 | .00 | .00 | .00 |
| J3490 | Drugs unclassified injection | 9 | .00 | .00 | .00 | .00 | .00 | .00 |
| Q0111 | Wet mounts/ w preparations | 1 | .00 | .00 | .00 | .00 | .00 | .00 |
| S4993 | Contraceptive pills for bc | 12 | .00 | .00 | .00 | .00 | .00 | .00 |
| S4993-FP | Contraceptive pills for bc | 13 | .00 | .00 | .00 | .00 | .00 | .00 |
| 99201 | Office/outpatient visit, new | 12 | 37.15 | 445.81 | 37.00 | -.15 | 444.00 | -1.81 |
| 99214 | Office/outpatient visit, est | 1 | 61.16 | 61.16 | 58.00 | -3.16 | 58.00 | -3.16 |

Figure 14D

WOMEN'S HEALTH CARE ASSOCIATES
PROCEDURE COST, PROCEDURE MARGIN, PAYER MARGIN AND PAYER PERCENT MARGIN
COMMERCIAL PAYER

| CODE | DESCRIPTION | PAYER VOLUME | PROCEDURE COST | AGGREGATE COST | PAYER FEE | PROCEDURE MARGIN | PROJECTED COLLECTIONS | AGGREGATE MARGIN |
|---|---|---|---|---|---|---|---|---|
| 86585 | TB tine test | 2 | 7.69 | 15.38 | 6.00 | -1.69 | 12.00 | -3.38 |
| 99212-25 | Office/outpatient visit, est | 1 | 38.97 | 38.97 | 35.00 | -3.97 | 35.00 | -3.97 |
| 99244 | Office consultation | 1 | 143.61 | 143.61 | 138.00 | -5.61 | 138.00 | -5.61 |
| 58100-53 | Biopsy of uterus lining DP | 1 | 116.75 | 116.75 | 111.00 | -5.75 | 111.00 | -5.75 |
| 56606 | Biopsy of vulva/perineum | 1 | 42.74 | 42.74 | 34.00 | -8.74 | 34.00 | -8.74 |
| 17000 | Destroy benign/premlg lesion | 1 | 60.69 | 60.69 | 45.00 | -15.69 | 45.00 | -15.69 |
| 99213-FP | Office/outpatient visit, est | 2 | 53.29 | 106.59 | 45.00 | -8.29 | 90.00 | -16.59 |
| 57100 | Biopsy of vagina | 1 | 93.16 | 93.16 | 73.00 | -20.16 | 73.00 | -20.16 |
| 99205-FP | Office/outpatient visit, new | 1 | 177.45 | 177.45 | 155.00 | -22.45 | 155.00 | -22.45 |
| 99214-FP | Office/outpatient visit, est | 1 | 83.78 | 83.78 | 58.00 | -25.78 | 58.00 | -25.78 |
| 57454-25 | Bx/curett of cervix w/scope | 3 | 164.53 | 493.58 | 155.00 | -9.53 | 465.00 | -28.58 |
| 76805 | Ob us >/= 14 wks, sngl fetus | 1 | 135.11 | 135.11 | 100.00 | -35.11 | 100.00 | -35.11 |
| 11400 | Exc tr-ext b9+marg 0.5 < cm | 3 | 69.04 | 207.11 | 57.00 | -12.04 | 171.00 | -36.11 |
| 99215-25 | Office/outpatient visit, est | 1 | 122.48 | 122.48 | 86.00 | -36.48 | 86.00 | -36.48 |
| 57500-25 | Biopsy of cervix SP | 1 | 135.99 | 135.99 | 96.00 | -39.99 | 96.00 | -39.99 |
| 11100 | Biopsy, skin lesion | 2 | 79.75 | 159.49 | 57.00 | -22.75 | 114.00 | -45.49 |
| 57023 | I & d vag hematoma, non-ob | 1 | 305.98 | 305.98 | 256.00 | -49.98 | 256.00 | -49.98 |
| 58100-25 | Biopsy of uterus lining SP | 10 | 116.75 | 1167.53 | 111.00 | -5.75 | 1110.00 | -57.53 |
| 57160 | Insert pessary/other device | 7 | 76.56 | 535.95 | 67.00 | -9.56 | 469.00 | -66.95 |
| 58301 | Remove intrauterine device | 2 | 74.48 | 148.95 | 41.00 | -33.48 | 82.00 | -66.95 |
| 57010 | Drainage of pelvic abscess | 1 | 407.43 | 407.43 | 338.00 | -69.43 | 338.00 | -69.43 |
| 99402-FP | Preventive counseling, indiv | 1 | 71.94 | 71.94 | .00 | -71.94 | .00 | -71.94 |
| 99395 | Prev visit, est, age 18-39 | 3 | 75.63 | 226.89 | 51.00 | -24.63 | 153.00 | -73.89 |
| 51701 | Insert bladder catheter | 1 | 79.32 | 79.32 | .00 | -79.32 | .00 | -79.32 |
| 99284 | Emergency dept visit | 3 | 101.07 | 303.20 | 73.00 | -28.07 | 219.00 | -84.20 |
| 11420 | Exc h-f-nk-sp b9+marg 0.5 < | 2 | 107.54 | 215.08 | 65.00 | -42.54 | 130.00 | -85.08 |
| 51702 | Insert temp bladder cath | 1 | 97.55 | 97.55 | .00 | -97.55 | .00 | -97.55 |
| 11976 | Removal of contraceptive cap | 1 | 142.58 | 142.58 | 42.00 | -100.58 | 42.00 | -100.58 |
| 11200 | Removal of skin tags | 7 | 70.87 | 496.08 | 56.00 | -14.87 | 392.00 | -104.08 |
| 76815 | Ob us, limited, fetus(s) | 7 | 90.65 | 634.55 | 75.00 | -15.65 | 525.00 | -109.55 |
| 99273 | Confirmatory consultation | 6 | 92.28 | 553.66 | 74.00 | -18.28 | 444.00 | -109.66 |
| 11421 | Exc h-f-nk-sp b9+marg 0.6-1 | 2 | 137.36 | 274.72 | 79.00 | -58.36 | 158.00 | -116.72 |
| 57455 | Biopsy of cervix w/scope | 1 | 121.19 | 121.19 | .00 | -121.19 | .00 | -121.19 |
| 46917 | Laser surgery, anal lesions | 1 | 123.91 | 123.91 | .00 | -123.91 | .00 | -123.91 |
| 58145-80 | Myomectomy vag method AS | 1 | 133.84 | 133.84 | .00 | -133.84 | .00 | -133.84 |
| 11401 | Exc tr-ext b9+marg 0.6-1 cm | 3 | 128.18 | 384.53 | 82.00 | -46.18 | 246.00 | -138.53 |
| 54150 | Circumcision | 3 | 237.76 | 237.76 | 96.00 | -141.76 | 96.00 | -141.76 |
| 56821 | Exam/biopsy of vulva w/scope | 1 | 155.71 | 155.71 | .00 | -155.71 | .00 | -155.71 |
| 11400 | Exc tr-ext b9+marg 0.5 < cm | 1 | 109.53 | 328.58 | 57.00 | -52.53 | 171.00 | -157.58 |
| 57421-25 | Exam/biopsy of vag w/scope S | 1 | 165.81 | 165.81 | .00 | -165.81 | .00 | -165.81 |
| 10060 | Drainage of skin abscess | 6 | 95.91 | 575.44 | 65.00 | -30.91 | 390.00 | -185.44 |
| 11426 | Exc h-f-nk-sp b9+marg > 4 cm | 4 | 295.06 | 1180.24 | 245.00 | -50.06 | 980.00 | -200.24 |
| 57305-80 | Repair rectum-vagina fistula | 1 | 211.93 | 211.93 | .00 | -211.93 | .00 | -211.93 |
| 56501 | Destroy, vulva lesions, sim | 17 | 133.14 | 2263.39 | 120.00 | -13.14 | 2040.00 | -223.39 |
| 59412 | Antepartum manipulation | 2 | 114.03 | 228.05 | .00 | -114.03 | .00 | -228.05 |
| 99387 | Prev visit, new, 65 & over | 3 | 153.81 | 461.44 | 74.00 | -79.81 | 222.00 | -239.44 |
| G0351 | Therapeutic/diagnostic injec | 13 | 18.54 | 240.99 | .00 | -18.54 | .00 | -240.99 |
| 76801 | Ob us < 14 wks, single fetus | 2 | 135.11 | 270.21 | .00 | -135.11 | .00 | -270.21 |
| 58350 | Reopen fallopian tube | 46 | 78.89 | 3629.05 | 73.00 | -5.89 | 3358.00 | -271.05 |
| 57456-25 | Endocerv curettage w/scope S | 2 | 143.23 | 286.46 | .00 | -143.23 | .00 | -286.46 |
| 56420 | Drainage of gland abscess | 7 | 144.99 | 1014.94 | 103.00 | -41.99 | 721.00 | -293.94 |

Figure 14E

WOMEN'S HEALTH CARE ASSOCIATES
PROCEDURE COST, PROCEDURE MARGIN, PAYER MARGIN AND PAYER PERCENT MARGIN
COMMERCIAL PAYER

| CODE | DESCRIPTION | PAYER VOLUME | PROCEDURE COST | AGGREGATE COST | PAYER FEE | PROCEDURE MARGIN | PROJECTED COLLECTIONS | AGGREGATE MARGIN |
|---|---|---|---|---|---|---|---|---|
| 58146-80 | Myomectomy abdom complex AS | 1 | 295.10 | 295.10 | .00 | -295.10 | .00 | -295.10 |
| 58290-80 | Vag hyst complex AS | 1 | 296.29 | 296.29 | .00 | -296.29 | .00 | -296.29 |
| 57421 | Exam/biopsy of vag w/scope | 2 | 165.81 | 331.62 | .00 | -165.81 | .00 | -331.62 |
| 57210 | Repair vagina/perineum | 4 | 356.60 | 1426.40 | 272.00 | -84.60 | 1088.00 | -338.40 |
| 99397 | Prev visit, est. 65 & over | 6 | 120.74 | 724.44 | 64.00 | -56.74 | 384.00 | -340.44 |
| 58956-80 | Bso, omentectomy w/tab AS | 1 | 342.03 | 342.03 | .00 | -342.03 | .00 | -342.03 |
| 57283-51 | Colpopexy, intraperitoneal M | 1 | 345.80 | 345.80 | .00 | -345.80 | .00 | -345.80 |
| 58925-51 | Removal of ovarian cyst(s) M | 1 | 358.93 | 358.93 | .00 | -358.93 | .00 | -358.93 |
| 57420 | Exam of vagina w/scope | 3 | 120.66 | 361.99 | .00 | -120.66 | .00 | -361.99 |
| 59425 | Antepartum care only | 10 | 390.63 | 3906.27 | 354.00 | -36.63 | 3540.00 | -366.27 |
| 76831 | Echo exam, uterus | 4 | 98.63 | 394.51 | .00 | -98.63 | .00 | -394.51 |
| 99233 | Subsequent hospital care | 5 | 82.05 | 410.27 | .00 | -82.05 | .00 | -410.27 |
| 57511 | Cryocautery of cervix | 13 | 151.44 | 1968.77 | 119.00 | -32.44 | 1547.00 | -421.77 |
| 99242 | Office consultation | 157 | 93.75 | 14718.07 | 91.00 | -2.75 | 14287.00 | -431.07 |
| 99283 | Emergency dept visit | 76 | 64.71 | 4918.19 | 59.00 | -5.71 | 4484.00 | -434.19 |
| 51720 | Treatment of bladder lesion | 3 | 147.80 | 443.39 | .00 | -147.80 | .00 | -443.39 |
| 90788 | Injection of antibiotic | 28 | 16.71 | 468.00 | .00 | -16.71 | .00 | -468.00 |
| 59000 | Amniocentesis, diagnostic | 10 | 139.97 | 1399.66 | 91.00 | -48.97 | 910.00 | -489.66 |
| 99220 | Observation care | 3 | 163.32 | 489.97 | .00 | -163.32 | .00 | -489.97 |
| 57500 | Biopsy of cervix | 13 | 135.99 | 1767.82 | 96.00 | -39.99 | 1248.00 | -519.82 |
| 58145 | Myomectomy vag method | 1 | 535.38 | 535.38 | .00 | -535.38 | .00 | -535.38 |
| 58925-80 | Removal of ovarian cyst(s) A | 3 | 179.46 | 538.39 | .00 | -179.46 | .00 | -538.39 |
| 99217 | Observation care discharge | 54 | 73.17 | 3951.12 | 63.00 | -10.17 | 3402.00 | -549.12 |
| 76075-TC | Dxa bone density, axial TC | 5 | 119.39 | 596.96 | .00 | -119.39 | .00 | -596.96 |
| 58100 | Biopsy of uterus lining | 105 | 116.75 | 12259.09 | 111.00 | -5.75 | 11655.00 | -604.09 |
| 99394 | Prev visit, est. age 12-17 | 14 | 97.88 | 1370.33 | 51.00 | -46.88 | 714.00 | -656.33 |
| 59426 | Antepartum care only | 5 | 684.22 | 3421.10 | 533.00 | -151.22 | 2665.00 | -756.10 |
| 99223 | Initial hospital care | 5 | 162.93 | 814.65 | .00 | -162.93 | .00 | -814.65 |
| 99384 | Prev visit, new, age 12-17 | 14 | 120.43 | 1686.04 | 62.00 | -58.43 | 868.00 | -818.04 |
| 64435 | N block inj, paracervical | 9 | 156.13 | 1405.19 | 64.00 | -92.13 | 576.00 | -829.19 |
| 57305 | Repair rectum-vagina fistula | 1 | 847.72 | 847.72 | .00 | -847.72 | .00 | -847.72 |
| 99243 | Office consultation | 49 | 124.98 | 6124.26 | 107.00 | -17.98 | 5243.00 | -881.26 |
| 58301 | Remove intrauterine device | 16 | 105.12 | 1681.90 | 41.00 | -64.12 | 656.00 | -1025.90 |
| 51700 | Irrigation of bladder | 11 | 96.51 | 1061.57 | .00 | -96.51 | .00 | -1061.57 |
| 76970 | Ultrasound exam follow-up | 18 | 62.27 | 1120.91 | .00 | -62.27 | .00 | -1120.91 |
| 99238 | Hospital discharge day | 112 | 73.14 | 8191.80 | 63.00 | -10.14 | 7056.00 | -1135.80 |
| 58553 | Laparo-vag hyst, complex | 1 | 1177.88 | 1177.88 | .00 | -1177.88 | .00 | -1177.88 |
| 58146 | Myomectomy abdom complex | 1 | 1180.38 | 1180.38 | .00 | -1180.38 | .00 | -1180.38 |
| 99215 | Office/outpatient visit, est | 36 | 122.48 | 4409.25 | 86.00 | -36.48 | 3096.00 | -1313.25 |
| 58956 | Bso, omentectomy w/tab | 1 | 1368.11 | 1368.11 | .00 | -1368.11 | .00 | -1368.11 |
| 57283-80 | Colpopexy, intraperitoneal A | 9 | 172.90 | 1556.11 | .00 | -172.90 | .00 | -1556.11 |
| 57454 | Bx/curett of cervix w/scope | 172 | 164.53 | 28298.75 | 155.00 | -9.53 | 26660.00 | -1638.75 |
| 99245 | Office consultation | 23 | 228.60 | 5257.76 | 153.00 | -75.60 | 3519.00 | -1738.76 |
| 76075 | Dxa bone density, axial | 272 | 135.50 | 36855.71 | 129.00 | -6.50 | 35088.00 | -1767.71 |
| 76375 | 3d/holograph reconstr add-on | 13 | 144.85 | 1883.08 | .00 | -144.85 | .00 | -1883.08 |
| 76802 | Ob us < 14 wks, addnl fetus | 25 | 88.54 | 2213.62 | .00 | -88.54 | .00 | -2213.62 |
| 58290 | Vag hyst complex | 2 | 1185.15 | 2370.30 | .00 | -1185.15 | .00 | -2370.30 |
| 99205 | Office/outpatient visit, new | 115 | 177.45 | 20406.39 | 155.00 | -22.45 | 17825.00 | -2581.39 |
| 58545 | Laparoscopic myomectomy | 3 | 917.41 | 2752.22 | .00 | -917.41 | .00 | -2752.22 |
| 57460 | Bx of cervix w/scope, leep | 16 | 177.51 | 2840.13 | .00 | -177.51 | .00 | -2840.13 |
| 58925 | Removal of ovarian cyst(s) | 4 | 717.85 | 2871.41 | .00 | -717.85 | .00 | -2871.41 |

Figure 14F

WOMEN'S HEALTH CARE ASSOCIATES
PROCEDURE COST, PROCEDURE MARGIN, PAYER MARGIN AND PAYER PERCENT MARGIN
COMMERCIAL PAYER

| CODE | DESCRIPTION | PAYER VOLUME | PROCEDURE COST | AGGREGATE COST | PAYER FEE | PROCEDURE MARGIN | PROJECTED COLLECTIONS | AGGREGATE MARGIN |
|---|---|---|---|---|---|---|---|---|
| 99222 | Initial hospital care | 130 | 116.99 | 15208.42 | 94.00 | -22.99 | 12220.00 | -2988.42 |
| 99244 | Office consultation | 78 | 176.44 | 13762.04 | 138.00 | -38.44 | 10764.00 | -2998.04 |
| 51741 | Electro-uroflowmetry, first | 38 | 78.99 | 3001.47 | .00 | -78.99 | .00 | -3001.47 |
| 54150 | Circumcision | 372 | 104.61 | 38915.89 | 96.00 | -8.61 | 35712.00 | -3203.89 |
| 50715 | Release of ureter | 3 | 1160.23 | 3480.68 | .00 | -1160.23 | .00 | -3480.68 |
| 57456 | Endocerv curettage w/scope | 28 | 143.23 | 4010.49 | .00 | -143.23 | .00 | -4010.49 |
| 58611 | Ligate oviduct(s) add-on | 51 | 85.78 | 4375.01 | .00 | -85.78 | .00 | -4375.01 |
| 99232 | Subsequent hospital care | 510 | 57.70 | 29426.54 | 49.00 | -8.70 | 24990.00 | -4436.54 |
| 99219 | Observation care | 256 | 116.26 | 29762.13 | 94.00 | -22.26 | 24064.00 | -5698.13 |
| 99202 | Office/outpatient visit, new | 362 | 66.17 | 23954.73 | 50.00 | -16.17 | 18100.00 | -5854.73 |
| 58552-80 | Laparo-vag hyst incl t/o AS | 26 | 250.41 | 6510.61 | .00 | -250.41 | .00 | -6510.61 |
| 51772 | Urethra pressure profile | 38 | 275.76 | 10478.91 | 95.00 | -180.76 | 3610.00 | -6868.91 |
| 57283 | Colpopexy, intraperitoneal | 11 | 691.61 | 7607.66 | .00 | -691.61 | .00 | -7607.66 |
| 51784 | Anal/urinary muscle study | 36 | 213.00 | 7668.00 | .00 | -213.00 | .00 | -7668.00 |
| 51726 | Complex cystometrogram | 38 | 349.43 | 13278.27 | 132.00 | -217.43 | 5016.00 | -8262.27 |
| 99212 | Office/outpatient visit, est | 2205 | 38.97 | 85938.79 | 35.00 | -3.97 | 77175.00 | -8763.79 |
| 76805 | Ob us >/= 14 wks, sngl fetus | 266 | 135.11 | 35938.10 | 100.00 | -35.11 | 26600.00 | -9338.10 |
| 76817 | Transvaginal us, obstetric | 97 | 98.63 | 9567.01 | .00 | -98.63 | .00 | -9567.01 |
| 57455 | Biopsy of cervix w/scope | 64 | 152.20 | 9740.86 | .00 | -152.20 | .00 | -9740.86 |
| 99386 | Prev visit, new, age 40-64 | 112 | 141.83 | 15885.11 | 52.00 | -89.83 | 5824.00 | -10061.11 |
| 90782 | Injection, sc/im | 873 | 18.90 | 16502.17 | 5.00 | -13.90 | 4365.00 | -12137.17 |
| 99204 | Office/outpatient visit, new | 340 | 139.87 | 47554.46 | 103.00 | -36.87 | 35020.00 | -12534.46 |
| 51795 | Urine voiding pressure study | 38 | 336.10 | 12771.76 | .00 | -336.10 | .00 | -12771.76 |
| 57460 | Bx of cervix w/scope, leep | 43 | 340.20 | 14628.66 | .00 | -340.20 | .00 | -14628.66 |
| 99203 | Office/outpatient visit, new | 731 | 98.65 | 72110.96 | 74.00 | -24.65 | 54094.00 | -18016.96 |
| 76815 | Ob us, limited, fetus(s) | 1176 | 90.65 | 106604.74 | 75.00 | -15.65 | 88200.00 | -18404.74 |
| 76816 | Ob us, follow-up, per fetus | 226 | 90.28 | 20402.40 | .00 | -90.28 | .00 | -20402.40 |
| 99385 | Prev visit, new, age 18-39 | 379 | 120.43 | 45643.50 | 65.00 | -55.43 | 24635.00 | -21008.50 |
| 58552 | Laparo-vag hyst incl t/o | 28 | 1001.63 | 28045.71 | .00 | -1001.63 | .00 | -28045.71 |
| 99213 | Office/outpatient visit, est | 4316 | 53.29 | 230018.17 | 45.00 | -8.29 | 194220.00 | -35798.17 |
| 99396 | Prev visit, est, age 40-64 | 794 | 109.49 | 86933.40 | 59.00 | -50.49 | 46846.00 | -40087.40 |
| 99214 | Office/outpatient visit, est | 1717 | 83.78 | 143843.61 | 58.00 | -25.78 | 99586.00 | -44257.61 |
| 99395 | Prev visit, est, age 18-39 | 1497 | 98.98 | 148165.70 | 51.00 | -47.98 | 76347.00 | -71818.70 |
| 76801 | Ob us < 14 wks, single fetus | 755 | 135.11 | 102004.76 | .00 | -135.11 | .00 | -102004.76 |
| 86588 | Unknown | 9 | . | . | .00 | . | .00 | . |
| ERR | Unknown | 6 | . | . | .00 | . | .00 | . |
| ERR | Unknown | 1 | . | . | .00 | . | .00 | . |
| HIV | Unknown | 3 | . | . | .00 | . | .00 | . |
| SERVI | Unknown | 1 | . | . | .00 | . | .00 | . |
| Sum | | | | 4382991.62 | | | 4532764.93 | 149773.31 |

Payer Percent Margin                                                                                                                           3.30%

Figure 14G

METHOD AND SYSTEM FOR MEDICAL PROCEDURE ACTIVITY-BASED COSTING AND MARGIN ANALYSIS

CLAIM OF PRIORITY

This Application claims priority to and the benefit of U.S. Provisional Application No. 60/719,186, filed Sep. 22, 2005, which is incorporated by reference herein in its entirety.

FIELD OF THE INVENTION

The present invention generally relates to a system and methods for full and accurate articulation of a medical practice's production in terms of standardized units, which utilizes these units as the cost driver for allocating the practice's operating costs to the produced services.

BACKGROUND OF INVENTION

Modern medical practices are often complex businesses that routinely manage large quantities of detailed clinical and financial data. Primary attention is, of course, focused on patient clinical data, as these data are fundamental to patient care. Financial data, though directly related to clinical data, receive secondary attention through such business activities as billing, collections, accounts receivable management, accounts payable management, and financial reporting.

Medical practices frequently operate in ways that treat clinical and financial data as separate and minimally-related matters. However, integration of clinical and financial data can provide valuable information that most industries rely upon for production cost control and operations management. Most medical practices rely on standard financial reporting information to guide business decisions, with minimal or no detailed information about the costs associated with the production of services. Where cost information exists, it is usually found for frequently-performed diagnostic or surgical procedures. Cost analysis for all procedures or services represents a task that is generally beyond the medical practice's analytical capabilities or economic resources.

Traditional cost accounting is based on the allocation of direct and indirect costs to production departments. The assignment of direct costs to respective production departments is usually readily accepted. However, the rationale for allocation of indirect costs among production departments is typically more subjective and arguable. Furthermore, when significant costs are allocated to departments that produce great varieties of unique outputs, which is often the case in medical specialties, the assumptions supporting the allocation of indirect costs may be challenged for a number of theoretical or empirical reasons.

Activity-based costing (ABC) is more arduous than traditional cost analysis as it requires detailed information about actual activities that are generating costs—information that is often difficult and costly to develop and manage. Nevertheless, ABC produces information that is much more useful managerially because attention is focused directly on the services or products generating costs rather than on departments, cost definitions, or cost allocation strategies.

The essential requirements for ABC are as follows: Specification of the produced services, determination of costs associated with producing the services, and identification of cost drivers that permit allocation of costs to the produced services. The determination of medical practice production costs is based on generally-available financial data, with adjustments made for identified overstatement or understatement of costs. The greater challenges in medical practice ABC come from the difficulties related to specification of produced services and identification of cost drivers. Medical practices oftentimes produce hundreds of unique services during a typical year, and the lack of any standardized valuation across these services makes it difficult to quantify total production. What is unknown in the art are processes and methods for full and accurate articulation of the medical practice's production in terms of standardized units, which utilizes these units as the cost driver for allocating the practice's operating costs to the produced services.

In 1989, the United States Congress authorized the creation of a national physician fee schedule for Medicare services. The initial research supporting this fee schedule was performed for the Health Care Financing Administration (now Centers for Medicare and Medicaid Services) by researchers at the Harvard University School of Public Health. The initial Resource Based Relative Value Scale (RBRVS) resulted in the development of resource-requirement values for more than 7,000 physician services which, when combined with a national "conversion factor" and regional price adjustments, translated the RBRVS scale into a physician services fee schedule. The RBRVS fee schedule was initiated on Jan. 1, 1992 for selected procedures and fees and was successively expanded to full implementation effective Jan. 1, 1996. The 2006 version of the RBRVS now provides values for more than 10,000 physician services, along with national and regional pricing adjustment factors. Ongoing research and input from numerous professional and public organizations contributes to interim updates of the RBRVS, with prevailing values published annually in the Federal Register. RBRVS information is available directly from the Federal Register, the Centers for Medicare and Medicaid Services (CMS), or several value-added private publishers.

The RBRVS scale provides standardized values for distinct, resource-defined components of the medical service production process for services defined by descriptions of medical procedures with assigned numeric codes and other explanatory material used for describing and reporting of physician services provided under the service name CPT (Current Procedural Terminology) codes (provided by the American Medical Association of Chicago, Ill.). The standardized values assigned to these components and to the summation of these components are generally referred to as Relative Value Units (RVUs). The RBRVS scale is composed of three distinct components for each service: Physician Work (RBRVS_Work), Practice Expense for both facility and non-facility service locations (RBRVS_Practice), and Malpractice Insurance (RBRVS_Liability). RBRVS scale components combine to produce a total for facility and non-facility service locations (RBRVS_Total) for a specific CPT-defined physician service. The RBRVS representation of the RVUs for a medical procedure is simplistically represented as follows:

$$RBRVS\_Total = RBRVS\_Work + RBRVS\_Practice + RBRVS\_Liability.$$

The RBRVS is a dynamic scale providing RVU values for many, but not all, medical procedures. Some services are included in the RBRVS, but are assigned RVUs of zero, as the production of those services is considered incidental to the resources represented in other services. Practices may offer unique services that are not included in CPT definitions and, therefore, not included in the RBRVS. Sometimes new services are developed and introduced into the RBRVS and, at other times, services become obsolete and are removed from the RBRVS. The manner in which a procedure is performed may change over time, affecting the resources required to produce the service. For reasons such as these, the RBRVS provides RVU component weights for medical services for a specific time period (RVU Year).

RBRVS does not provide RVUs for most procedures that are performed in an exceptional manner or circumstance. Such variations in procedures are indicated through the use of Modifiers that oftentimes imply important differences in the resources required to perform a service and similar differences in the reimbursement generated by the altered service.

Location of Service is an important determinant of Practice Expense, as evidenced in the RBRVS differentiation between facility and non-facility service sites. The correct RBRVS_Practice value reflecting the procedure's Location of Service must be utilized to accurately represent the Practice Expense resources involved in the service's production.

Accurate specification of the practice's production is compromised or invalidated if valid CPT-defined services are excluded, Modifiers are disregarded, or Location of Service is ignored or incorrectly specified. Failure to fully and accurately define the services produced by the practice adversely affects the quantification of RVUs representing the practice's production, leading to faulty determinations of production, costs, and margins. Accurate representation of the practice outputs as RVUs requires procedure-specific, location-specific, modifier-adjusted (PLM) calculation of RVUs for all valid CPT procedures performed by the medical practice.

Thus, there is a desire and a need in the art to provide a process for accurate calculation of RVUs by including all valid services in the determination of medical practice outputs, permitting the selection of RVU weights from CMS-published RVU weight tables including Location of Service as an attribute of output, calculating Modifier-adjusted RVU values, and recognizing all of these effects in the calculation of the PLM RVUs that represent the practice's services during the Reference Period.

SUMMARY OF INVENTION

Accordingly, the present invention provides a method and system of a process for accurate calculation of Relative Value Units (RVUs) from CMS' Resource Based Relative Value Scale (RBRVS) by including all valid services in the determination of medical practice outputs, permitting the selection of RVU weights from CMS-published RVU weight tables, including Location of Service as an attribute of service output, calculating Modifier-adjusted RVU values, and recognizing all of these effects in the calculation of the PLM RVUs that represent the practice's services during the Reference Period.

Additional features of the present invention further add a method and system of analyzing medical procedure activity-based costing and margin and includes an Activity File, an RVU File, and a Payer Fee File in a common Database that is analyzed with a Process Module with input from Financial Data, which outputs an analysis in a predetermined table or graph.

The Activity File can be for a designated Reference Period. The RVU File comprises RVU weights data, and can contain RVU weights for procedures with valid Modifiers. The values assigned to procedures with valid Modifiers may be determined by CMS reimbursement practices, Payer-specific reimbursement experience, payer-mix weighted values, and studied determination of procedure costs.

RVU weights data can be based on Procedure Code, Modifier, Location of Service, and RVU File. The Payer Fee File can be based on Payer Fee Schedules. The Payer Fee Schedules can be based on differences in geographic location, service coverage, enrollment group utilization experience, or market strategy.

The Process Module can use Financial Data to calculate Adjusted Total Collections, Adjusted Total Operating Costs, RVU Component Adjusted Total Operating Costs, Adjusted Total Operating Costs per PLM RVU, Component Adjusted Total Operating Costs per Component PLM RVU, PLM Procedure Cost based on either aggregate or component cost allocations, PLM Procedure margin, Practice margin, and other financial measures.

Other features of the present invention will become more apparent to persons having ordinary skill in the art to which the present invention pertains from the following description and claims.

BRIEF DESCRIPTION OF THE FIGURES

The foregoing features, as well as other features, will become apparent with reference to the description and figures below, in which like numerals represent elements, and in which:

FIGS. 2-14 illustrates typical reports that can be produced in accordance with an embodiment of the present invention.

DETAILED DESCRIPTION OF THE INVENTION

Figure 1:
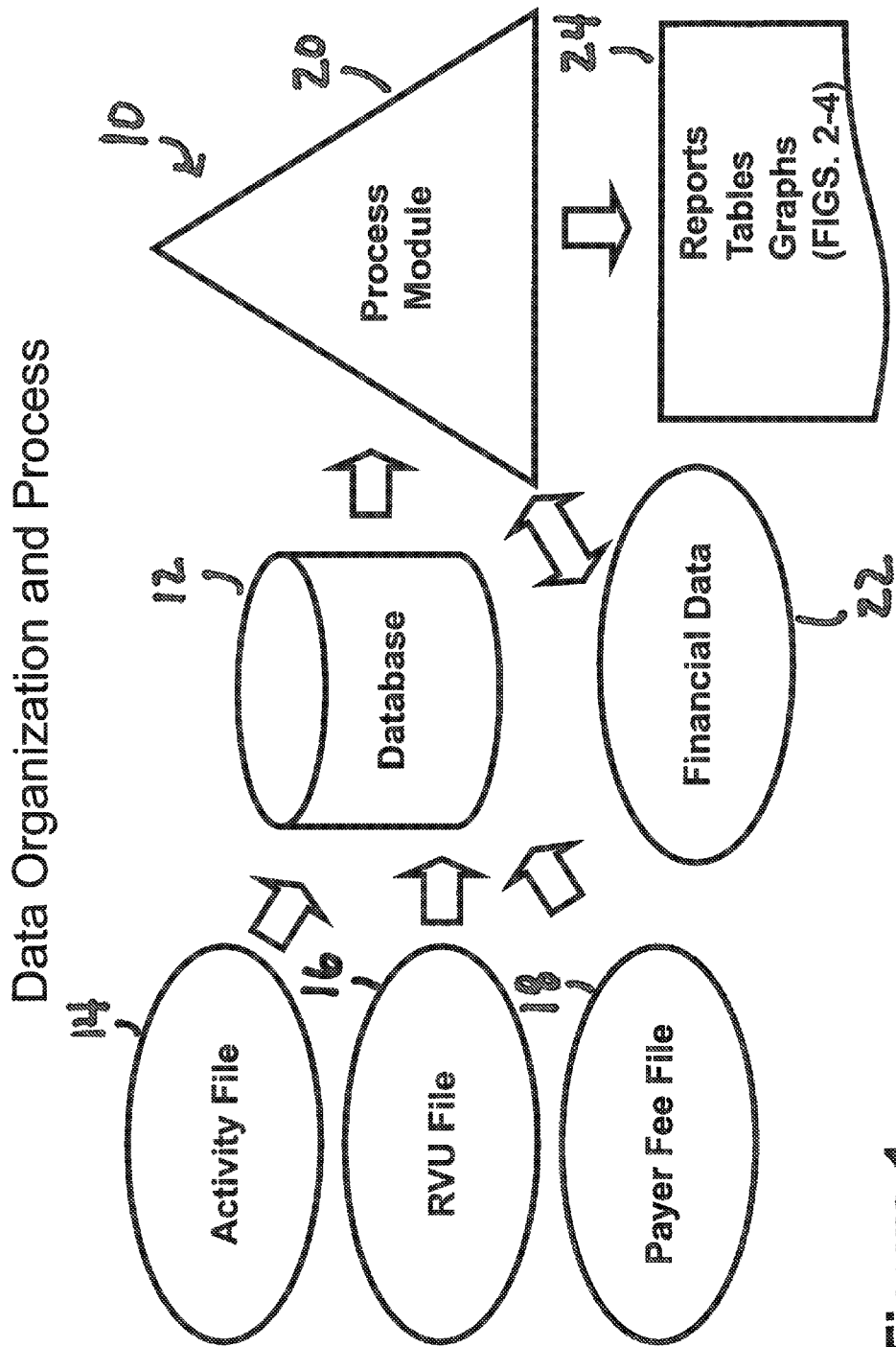
FIG. 1 illustrates major data components and functional relationships in accordance with an embodiment of the present invention.
Figure 2B:
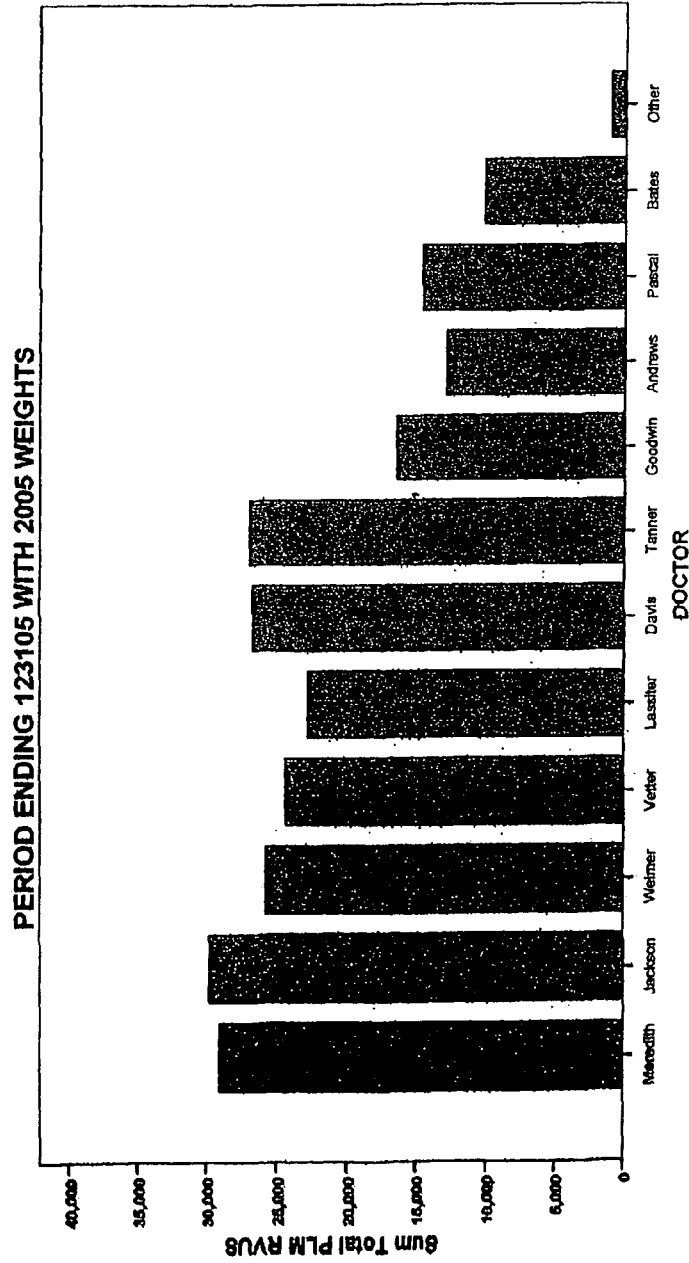
Figure 7B:
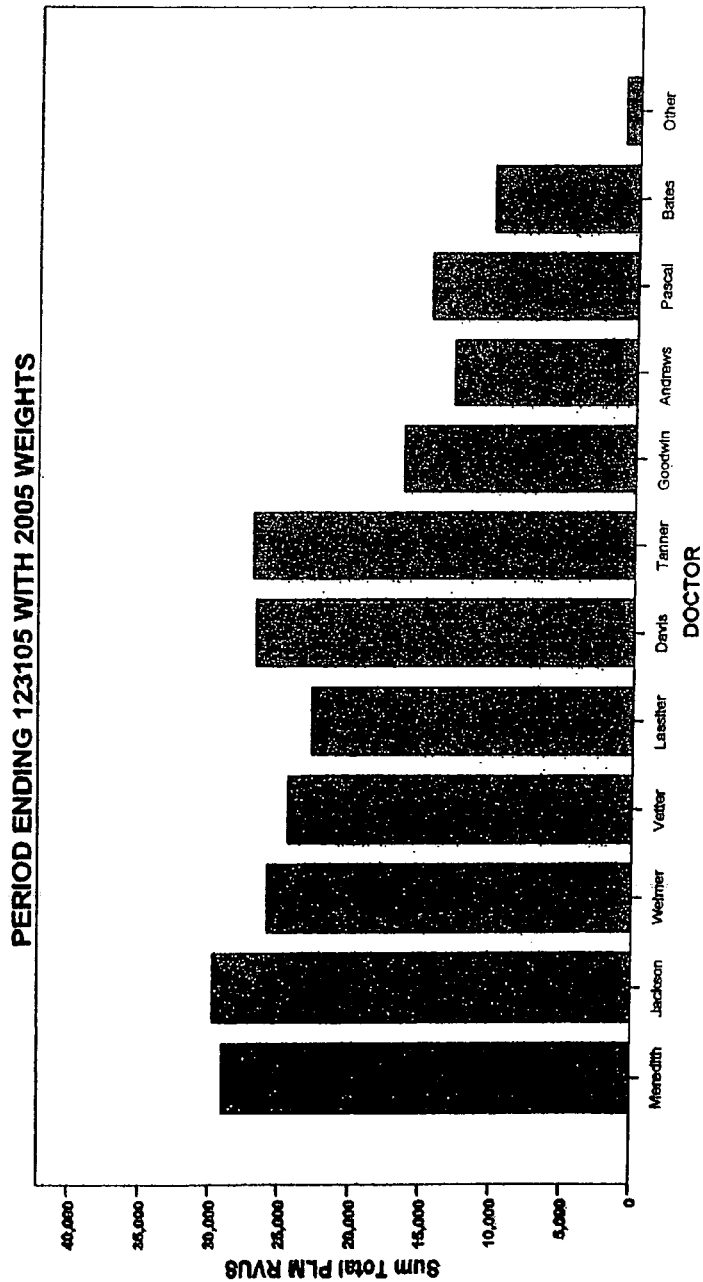
Figure 11A:
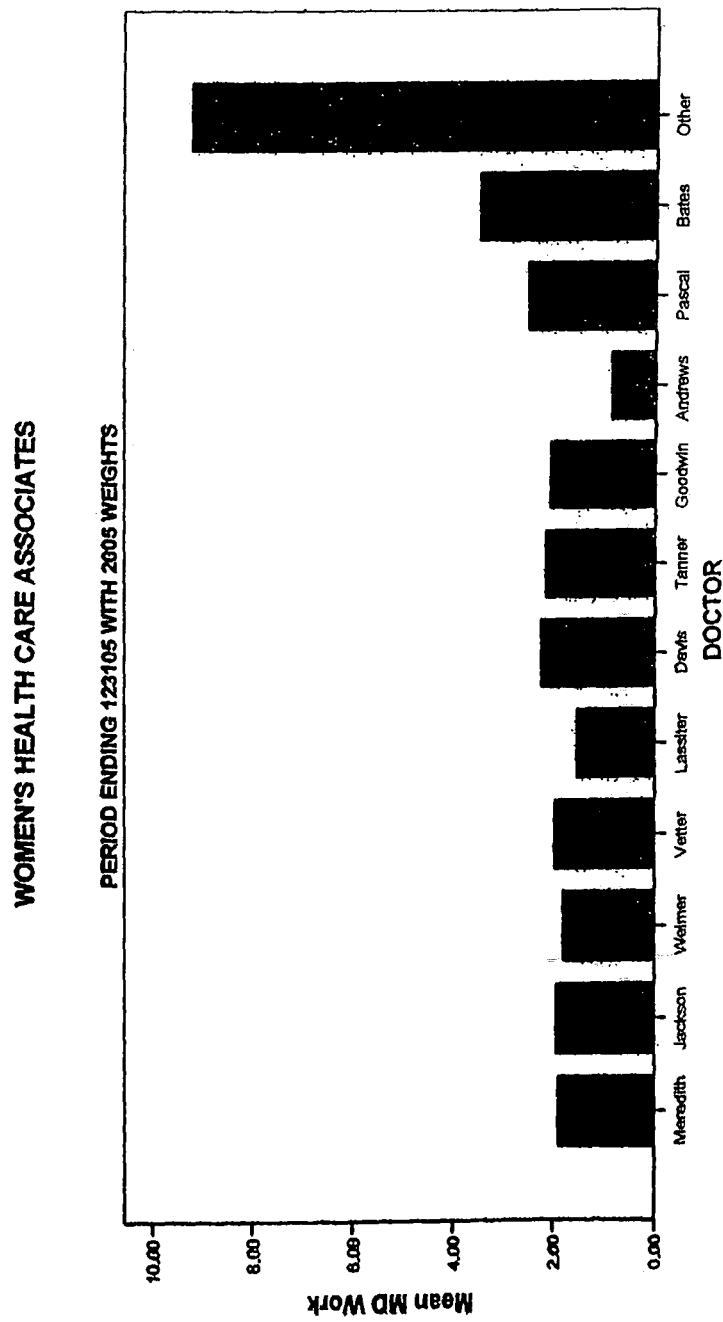
Figure 12G:
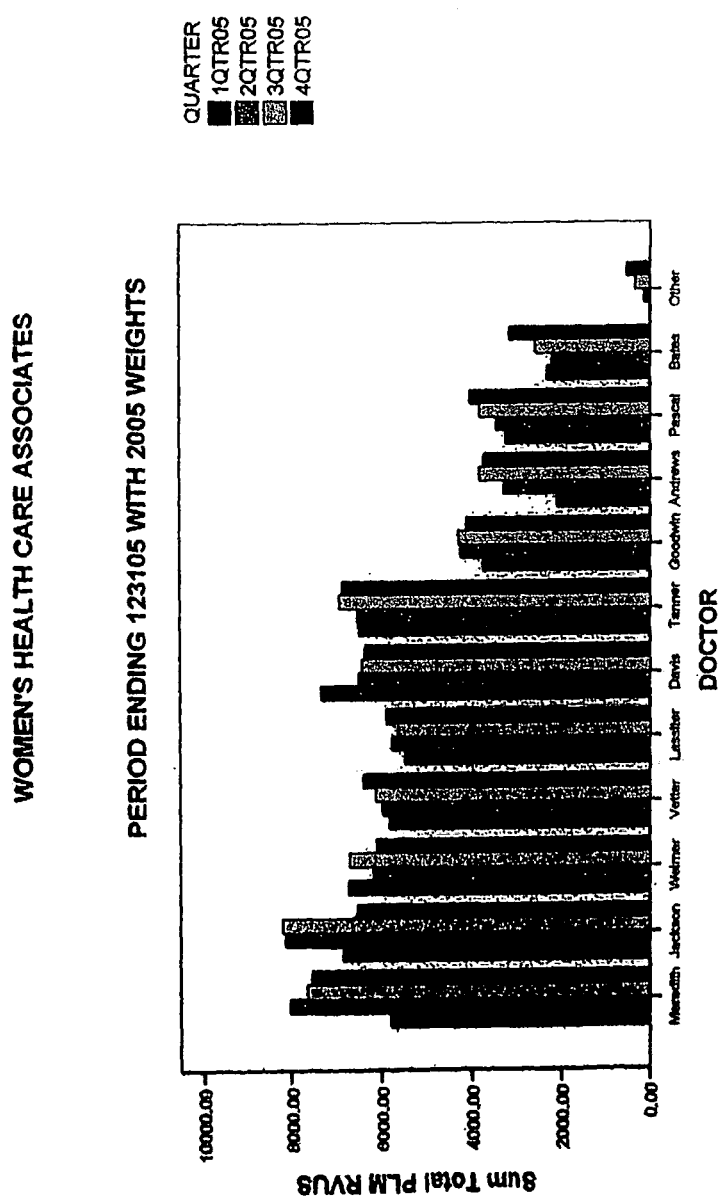
Figure 13B:
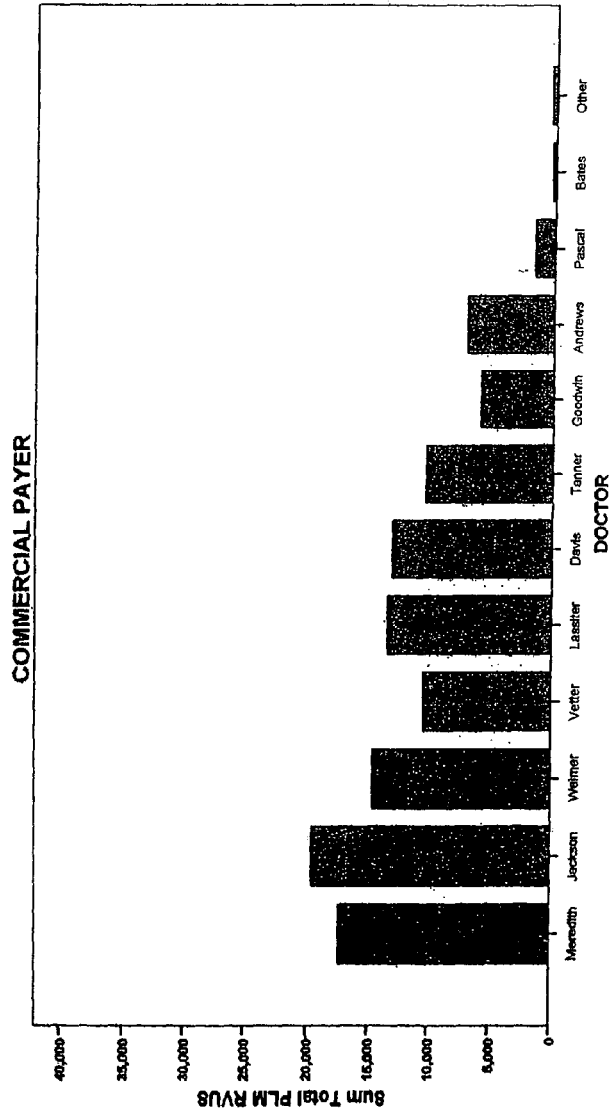

In general, the present invention can be realized as methods or systems in hardware, software, or a combination of hardware and software of a computer system, including a computer network system. The present invention can be realized in a centralized fashion in one computer system or in a distributed fashion where different elements are spread across several computer systems. Any kind of computer system or other apparatus adapted for carrying out the methods described herein is suited. A typical combination of hardware and software may include a general purpose computer system with a computer program that, when being loaded and executed, controls the computer system such that it carries out the systems and methods described herein. The present invention may also be voluntarily embedded in a computer program product (or any computer useable medium having computer readable program code embodied therein) which comprises all the features enabling the implementation of the methods and systems described herein and which, when loaded in a computer system, is able to carry out these systems and methods.

Computer program or computer program product in the present context means any expression, in any language, code, or notation, of a set of instructions intended to cause a system having an information processing capability to perform a particular function, either directly or after either or both of the following: (a) conversion to another language, code, or notation; and (b) reproduction in a different material or electronic form.

A medical practice can have a variety of different business or clinical operating components, some of which may be unrelated to the production of the medical services. The present invention utilizes medical practice data that represent activities directly and indirectly related to the production of medical services with assigned Relative Value Units (RVU) values. Any practice costs or income from activities not directly or indirectly related to the practice's production of medical services with assigned RVUs (e.g., real estate, teaching, or research) are excluded from consideration.

Activity Data are obtained from the medical practice for services rendered during a designated timeframe, referred to as the Reference Period. The Reference Period is typically defined as a twelve month activity period corresponding to the practice's financial reporting period. The Reference Period can be any contiguous period of practice operations for which Activity Data and Financial Data exist.

Activity Data can include procedure-specific data for services performed by the medical practice during the Reference Period. These data are typically retained in the practice's billing system in the format of CPT codes and related information, although unique, practice-created codes are oftentimes included to describe additional services provided by the practice. In the typical situation, the medical practice exports a standardized format data file from its billing system containing the required Activity Data for the Reference Period. The Activity Data are comprised of the following specific data elements for each procedure provided during the Reference Period: Procedure Code, Modifier, Location of Service; Provider, Payer, Date of Service. The Activity Data are stored in the Activity File, which can be accessed by the invention's Process Module.

RVU Weights Data for services rendered during the Reference Period are obtained from the appropriate RVU Year tables published in the Federal Register by the Centers for Medicare and Medicaid Services. The RVU File is created utilizing the unique Procedure Code and Modifier combinations presented in the Activity File. RVU Weights Data are obtained by CPT code for Physician Work, Practice Expense (both facility and non-facility), Malpractice Insurance, and Total (both facility and non-facility). RVU Weights Data associated with the services identified in the Reference Period's Activity File for the designated RVU Year are entered into the RVU File.

The Location of Service is an important determinant of the resources and costs involved in the production of many services. The present invention utilizes the Location of Service data in the Activity File to select the appropriate Practice Expense RVU Weights Data (facility or non-facility) for each procedure.

Unfortunately, CMS generally does not provide RVU Weights Data for Procedure Codes with Modifiers. The present invention provides a method and system for the calculation of practice-specific RVU Weights Data for Procedure Codes with valid Modifiers. The Modifier adjustment is practice-specific, but can be based on CMS reimbursement practices, the practice's Payer-specific reimbursement experience, a payer-mix weighted value, the practice's studied determination of its procedure Modifier costs, or any other value that the practice believes to be appropriate. The RVU Weights Data adjustment for a specific Modifier can be Payer-specific, or the adjustment value can be applied to all services with a specific Modifier. The Modifier-adjusted RVU Weights Data are included as a part of the RVU File such that these values can be linked to the practice's Activity File and included in the full activity-based costing.

Sometimes additional, detailed cost information is available for a procedure. For example, the practice may have developed information on the costs of providing a procedure because they have invested in time and motion studies or other intensive cost investigations. These cost determinations can be converted to RVU values based on the practice's operating costs and directly entered into the RVU File. Similarly, the values for unique, practice-specific Procedure Codes can be included in the analyses, further increasing the accuracy and validity of the calculations of total resources utilized and total outputs produced.

The invention provides control over the RVU weights assigned to services produced during the Reference Period based on the following attributes: Procedure Code, Modifier, Location of Service, and RVU Year. The PLM RVU weights based on the designated RVU Year are included in the RVU File.

The Payer Fee Data represents a Payer's fees for designated services. Typically, Payers provide these data in the form of a Payer Fee Schedule that can have an array of services and associated fees. The Payer Fee Schedule represents a Payer's established reimbursement for specific services provided by the practice to specific beneficiaries and is applicable to a proscribed period of time. A Payer may offer different Payer Fee Schedules or Plans based upon differences in geographic location, service coverage, enrollment group utilization experience, market strategy, or other relevant characteristic. Payer Fee Schedules change periodically, so services must be referenced against the prevailing Fee Schedule at the Date of Service. A practice may be a participating provider in numerous Plans offered by a Payer, with a different Payer Fee Schedule for each Plan, such that services must be referenced against the correct Payer Plan.

The present invention combines practice-specific Payer Fee Schedules into a Payer Fee File that organizes and retains Payer Fee Schedules for subsequent reference and analysis. The Payer Fee File is created utilizing the unique Procedure Code, Modifier, and Location of Service combinations presented in the practice's Activity File. The Payer Fee File contains Payer Fee Schedules of fees for services in as much detail as available from the Payer. Generally, a Payer Fee Schedule contains only Procedure Codes but sometimes, the Payer Fee Schedule includes Modifiers (e.g., Modifiers for professional or technical service components). Fees are adjusted based upon Modifier and Location of Service to determine the Payer PLM Fees. In cases where specific Payer Fee Data are not represented in the Payer Fee Schedule, the practice can enter fees based on any relevant experience with the Payer's reimbursement practices. The current invention produces a Payer Fee File containing Payer PLM Fees that is specific for Practice, Activity Data, Payer, Plan, Procedure, Modifier, Location of Service, and Reference Period.

Financial Data are utilized to determine the practice's Adjusted Total Operating Costs and Adjusted Total Collections for the Reference Period. This information is obtained from the practice's financial reports for the Reference Period, adjusted on the basis of relevant information supplied by the practice's management. Relevant information may include business activities, costs, or other circumstances affecting the accuracy of the practice's financial statements as a representation of the production costs for the Reference Period. The determination of Adjusted Total Operating Costs for the Reference Period is based on the totality of the financial information available on the practice with the objective being the fair representation of the operating costs associated with the production of the RVU-represented services during the Reference Period.

Illustrative Embodiments of the Present Invention

A Process for Determination of Adjusted Total Operating Costs

The invention can provide a process for the determination of Adjusted_Total_Operating_Costs. A typical determination of Adjusted_Total_Operating_Costs begins with the determination of Total Operating Costs incurred during the Reference Period, based upon the practice's income statement, and is followed with reasoned exclusions or additions of costs. Medical practice Adjusted_Total_Operating_Costs for the Reference Period may be represented as follows:

$$Adjusted\_Total\_Operating\_Costs = C - Q - R - U + V$$

where:
C=Total Operating Costs during the Reference Period
Q=Exceptional Physician compensation paid during the Reference Period (e.g., compensation in excess of the $90^{th}$ percentile as compared to industry standards, or compensation derived from non-RVU represented services)
R=Costs associated with the production of services not represented in the analysis
U=Non-Reference Period costs recognized financially during the Reference Period
V=Reference Period costs not recognized financially during the Reference Period

A Process for Determination of Component Adjusted Total Operating Costs

The invention can provide a process for the determination of Component Adjusted Total Operating Costs. Adjusted_Total_Operating_Costs is partitioned into components that represent Physician Work, Practice Expense, and Malpractice Insurance costs. All expenditures for Physician Work (or other independent provider) compensation and benefits (salaries, bonuses, health insurance, etc.) are assigned to Adjusted Total Physician Work Component Costs. All expenditures for Malpractice Insurance are assigned to Adjusted Total Malpractice Insurance Component Costs. Expenditures that are neither providers' compensation and benefits costs, nor malpractice insurance costs are assigned to Adjusted Total Practice Expense Component Costs (e.g., office rent, utilities, supplies, etc.).

The structure of these component costs can be represented as follows:

$$Adjusted\_Total\_Operating\_Costs = G + H + I$$

where:
G=Adjusted Total Physician Work Component Costs
H=Adjusted Total Practice Expense Component Costs
I=Adjusted Total Malpractice Insurance Component Costs

A Process for Determination of Adjusted Total Collections

The invention can provide a process for the determination of Adjusted_Total_Collections, which represents collections attributable to the services included in the practice's RVU-represented services for the Reference Period. For example, if a practice operates programs such as aesthetic services or childbirth classes that are not included as a part of the practice's RVU activity (because there are no established RVU weights for these services and/or the practice has not created the RVU weights for the services), then any collections attributable to these services are subtracted from Gross Collections. In one possible formulation, Adjusted_Total_Collections for the Reference Period may be determined as follows:

$$Adjusted\_Total\_Collections = D - J - K + L$$

where:
D=Total Gross Collections during the Reference Period
J=Collections from non-RVU represented services or activities
K=Collections from non-Reference Period services that were recognized financially during the Reference Period
L=Collections from Reference Period services that were not recognized financially during the Reference Period The actual determination of Adjusted_Total_Collections for the Reference Period is based on the totality of the financial information available on the practice for the Reference Period. The objective is to fairly represent the collections associated with the RVU-represented activities performed by the practice during the Reference Period.

In use, the RBRVS quantifies the resources consumed in the production of medical services. RVUs represent the best proxy measure for the outputs produced by medical practices; however, RVUs are not established for all medical services, and many procedures that are billed with Modifiers do not have established RVUs.

Excluding significant numbers of valid procedures from consideration, failing to properly adjust for Modifiers, or ignoring the Location of Service materially impacts the quantification of medical practice outputs, which adversely affects the validity of cost and margin determinations. Full and accurate quantification of the outputs of a medical practice in terms of RVU weights requires the inclusion of all services produced by the practice for which RVU weights exist or have been created, inclusion of Modifiers in the definition of services, appropriate practice-specific weighting of RVUs based on Modifiers, and recognition of Location of Service as a determinant of proper RVU Practice Expense values. Omission or improper attention to any of these factors will result in inaccurate determination of actual RVU production outputs that is essential to valid determination of medical practice costs and margins. The current invention can provide a process for the accurate calculation of PLM RVUs as a fundamental precursor to valid medical practice activity-based costing.

Definitions

To facilitate ease of understanding the present invention, the following definitions are provided:

Service: Each billable procedure performed during the Reference Period is a Service. If the first two patients of the Reference Period each receive a billable procedure, these procedures are designated as Services 1 and 2. The next billable procedure performed on a patient would be Service 3.

PLM_Procedure: The values of PLM_Procedures are modified CPT codes (American Medical Association, copyright 2006) whose values reflect not only the Procedure (the "P" of "PLM"), but the Location of Service ("L" of "PLM") and Modifier (the "M" of "PLM") associated with the procedure.

Volume: The Volume is the number of PLM_Procedures performed during the Reference Period.

Adjustment: The Adjustment is the Practice-specific weight assigned to a specific Modifier.

RBRVS_Work, RBRVS_Practice_F, RVU_Practice_NF, RVU_Practice, RVU_Liability: RBRVS variables are published RBRVS Relative Value Units (RVUs) developed for each of thousands of medical procedures. RBRVS_Work is a measure of the physician's work. RBRVS_Practice is a measure of the cost of overhead, such as supplies and rent. RBRVS_Practice is either RBVS_Practice_F (for services performed in a hospital or other facility setting) or RBRVS_Practice_NF (for services performed in a medical office setting). RVU_Liability is a measure of professional liability insurance expense.

Payer_Fee: The Payer_Fee is a specific Payer's established fee for a specific PLM_Procedure.

A Process to Determine PLM Component RVUs for a Medical Procedure

The invention provides a process for the determination of PLM Component RVUs for Physician Work, Practice Expense, and Malpractice Insurance for each service. The PLM Component RVUs are calculated as follows:

PLM_Work=RBRVS_Work·Adjustment

PLM_Liability=RBRVS_Liability·Adjustment

If Location of Service is Facility, then:

PLM_Practice=RBRVS_Practice_$F$·Adjustment

If Location of Service is Non-facility, then:

PLM_Practice=RBRVS_Practice_$NF$·Adjustment

A Process to Determine PLM Total RVUs for a Medical Procedure

The invention can provide a process for the accurate calculation of PLM_Total_RVUs for a medical procedure based on Procedure Code, Modifier, and Location of Service attributes. Complete, accurate specification of practice RVUs is required for accurate, valid determinations of total production, unit production costs, procedure costs, and margins. PLM_Total_RVUs for each procedure is calculated as follows:

PLM_Total_RVUs=PLM_Work+PLM_Practice+PLM_Liability

A Process to Determine Extended PLM RVUs for Medical Procedures

The extended values for each PLM procedure are the volume times the unit value per service. For all Services of a specific PLM_Procedure, Extended PLM RVUs is calculated as follows:

$$\text{Extend\_PLM\_Work} = \sum_{Services} \text{PLM\_Work} = \text{Volume} \cdot \text{PLM\_Work}$$

For example, if the practice had two billings for PLM_Procedure 49000-78f, with PLM_Work value of 8.75 and Volume of 2, Extend_PLM_Work would be 17.50. The other variables are defined in a similar manner for each PLM_Procedure.

$$\text{Extend\_PLM\_Practice} = \sum_{Services} \text{PLM\_Practice} = \text{Volume} \cdot \text{PLM\_Practice}$$

$$\text{Extend\_PLM\_Liability} = \sum_{Services} \text{PLM\_Liability} = \text{Volume} \cdot \text{PLM\_Liability}$$

$$\text{Extend\_PLM\_Total} = \sum_{Services} \text{PLM\_Total\_RVUs} = \text{Volume} \cdot \text{PLM\_Total\_RVUs}$$

A Process for Calculation of Total PLM Total RVUs for all Procedures

The invention can provide a process for the calculation of Total_PLM_Total_RVUs for all procedures performed by the practice. Total_PLM_Total_RVUs for all procedures performed during the Reference Period is calculated as follows:

$$\text{Total\_PLM\_Total\_RVUs} = \sum_{Services} \text{PLM\_Total\_RVUs} = \sum_{PLM\_Procedures} \text{Extend\_PLM\_Total}$$

$$\text{Total\_PLM\_Total\_RVUs} = \sum_{Services} \text{PLM\_Work} + \sum_{Services} \text{PLM\_Practice} + \sum_{Services} \text{PLM\_Liability}$$

A Process to Determine Total PLM Component RVUs for all Procedures

The invention can provide a process for the calculation of Total PLM Component RVUs for all services produced by the practice during the Reference Period. PLM RVUs are summed by the RBRVS Components of Physician Work, Practice Expense and Malpractice Insurance. For all Services provided by the practice, Total_PLM_Work_RVUs is calculated as follows:

$$\text{Total\_PLM\_Work\_RVUs} = \sum_{Services} \text{PLM\_Work} = \sum_{PLM\_Procedures} \text{Extend\_PLM\_Work}$$

For all Services provided by the practice, Total_PLM_Practice_RVUs is calculated as follows:

$$\text{Total\_PLM\_Practice\_RVUs} = \sum_{Services} \text{PLM\_Practice} = \sum_{PLM\_Procedures} \text{Extend\_PLM\_Practice}$$

For all Services provided by the practice, Total_PLM_Liability_RVUs is calculated as follows:

$$\text{Total\_PLM\_Liability\_RVUs} = \sum_{Services} \text{PLM\_Liabilty} = \sum_{PLM\_Procedures} \text{Extend\_PLM\_Liability}$$

Medical Procedure Activity-Based Costing

Activity-based Costing allocates Adjusted_Total_Operating Costs across the PLM RVUs for the activities generating these costs. Allocations can utilize either aggregate Adjusted_Total_Operating_Costs with aggregate Total PLM RVUs or Component Adjusted Total Operating Costs with their associated Component PLM RVUs.

PLM Cost Calculations

A Process to Determine Adjusted Total Operating Costs Per PLM RVU

The invention provides a process for the calculation of Adjusted_Total_Operating_Costs_per_PLM_RVU, a basic measure of practice efficiency, as follows:

$$\text{Adjusted\_Total\_Operating\_Costs\_per\_PLM\_RVU} = \frac{\text{Adjusted\_Total\_Operating\_Costs}}{\text{Total\_PLM\_Total\_RVUs}}$$

A Process to Determine Component Adjusted Total Operating Costs Per Component PLM RVU The invention can provide processes for the calculations of Component Adjusted Total Operating Costs per Component PLM RVU. Work_Component_Costs_per_PLM_Work_RVU is calculated as follows:

$$\text{Work\_Component\_Cost\_per\_PLM\_Work\_RVU} = \frac{[\text{total of work costs}]}{\sum_{\text{Services}} \text{PLM\_Work}}$$

Practice_Component_Costs_per_PLM_Practice_RVU is calculated as follows:

$$\text{Practice\_Component\_Cost\_per\_PLM\_Practice\_RVU} = \frac{[\text{total of practice costs}]}{\sum_{\text{Services}} \text{PLM\_Practice}}$$

Liability_ComponentCosts_per_PLM_Liability_RVU is calculated as follows:

$$\text{Liability\_Component\_Cost\_per\_PLM\_Liability\_RVU} = \frac{[\text{total of liability costs}]}{\sum_{\text{Services}} \text{PLM\_Liability}}$$

A Process to Determine Calculation of Component Costs Per Component PLM RVU

The Component cost for each procedure is calculated as follows.
The Work_Component_Cost for each procedure is calculated as follows:

Work_Component_Cost=Work_Component_Cost_per_PLM_Work_RVU·PLM_Work

The Practice_Component_Cost for each procedure is calculated as follows:

Practice_Component_Cost=Practice_Component_Cost_per_Practice_RVU·PLM_Practice

The Liability_Component_Cost for each procedure is calculated as follows:

Liability_Component_Cost=Liability_Component_Cost_per_Liability_RVU·PLM_Liability

A Process to Determine Adjusted Total Collections Per PLM RVU

The invention provides a process for the determination of medical practice Adjusted Total Collections per PLM RVU, calculated as follows:

$$\text{Adjusted\_Total\_Collections\_per\_PLM\_RVU} = \frac{\text{Adjusted\_Total\_Collections}}{\text{Total\_PLM\_Total\_RVUs}}$$

A Process to Determine Calculation of PLM Procedure Cost by Allocation of Aggregate Adjusted Total Operating Costs The invention can provide a process for the calculation of PLM Procedure Cost based on Adjusted_Total_Operating_Costs_per_PLM_RVU and PLM_Total_RVUs, as follows:

PLM_Procedure_Cost=PLM_Total_RVUs·Adjusted_Total_Operating_Costs_per_PLM_$_{RVU}$ As provided above, the methodology calculates the cost of each procedure by multiplying each procedure's PLM Total RVUs by Adjusted_Total_Operating_Costs_per_PLM_RVU. For example, if PLM Total RVUs for hypothetical Procedure Code 12345-80 are 5.46, and Adjusted_Total_Operating_Costs_per_PLM_RVU is $30.18, then the costs allocated to the production of Procedure 12345-80 are $165.78.

A Process to Determine PLM Procedure Cost by Allocation of Component Adjusted Total Operating Costs The invention can provide an alternative process for the calculation of PLM Procedure Cost by allocation of Component Adjusted Total Operating Costs per Component PLM RVU, as follows:

PLM_Procedure_Cost=Work_Component_Cost+Practice_Component_Cost+Liability_Component_Cost As provided above, the methodology calculates the cost of each procedure by multiplying each procedure's RVU components (Physician Work, Practice Expense, and Malpractice Insurance) by the determined value of their respective Component Adjusted Total Operating Costs Per PLM RVU. For example, for hypothetical Procedure Code 12345-80, if PLM_Work, PLM_Practice and PLM_Liability are 2.00, 3.31, and 0.15, respectively; and Component Adjusted Total Operating Costs for Physician Work, Practice Expense, and Malpractice Insurance are $34.00, $28.50, and $32.25, respectively; then the cost allocated to the provision of Procedure 12345-80 is $167.17.

Medical Procedure Margin Analysis

Unfortunately, it is altogether too easy to construct computations of costs or margins that are theoretically unsound, empirically incorrect, or naively simplistic. Sometimes factors that materially affect costs or fees, such as Modifier or Location of Service, are minimized or totally disregarded. At other times, as a computational shortcut, costs or fees may be reduced to a single index or conversion factor value that fails to represent true, procedure-specific margin variations. Computational conveniences (such as the "80-20 rule" or assumptions about service mixes among payers) involve untenable assumptions procedure margins, or the distributions of margins, that produce conclusions that are tenuous at best-misleading or invalid at worst. Calculations of valid procedure margins depend upon proper calculation of costs, appropriate allocation of costs, and correct specification of Payer fees.

The invention can provide processes for the calculations of valid procedure-specific and aggregated margins for PLM medical services. These margins reflect the differences between the medical practice's production costs and the Payer's fees for services, which can be accumulated in a number of meaningful ways (e.g., by Payer, by Provider, etc.). The calculations of PLM Procedure Margin, Payer Margin, and Percent Payer Margin, along with associated analyses and reports, herein referred to as Medical Procedure Margin Analysis.

A Process to Determine PLM RVU Margin and PLM RVU Percent Margin

The invention can provide processes for calculations of the PLM_RVU_Margin and PLM_RVU_Percent_Margin for the medical practice.
The PLM_RVU_Margin is calculated as follows:

PLM_RVU_Margin=Adjusted_Total_Collections_per_PLM_RVU−Adjusted_Total_Operating_ Costs_per_PLM_RVU The PLM_RVU_Percent_Margin can be represented as the proportion of PLM_RVU_Margin to Adjusted_Total_Collections_per_PLM_RVU, which is calculated as follows:

$$\text{PLM\_RVU\_Percent\_Margin} = \frac{\text{PLM\_RVU\_Margin}}{\text{Adjusted\_Total\_Collections\_per\_PLM\_RVU}}$$

A Process to Determine Calculation of Medical Practice Margin and Medical Practice Percent Margin The invention can provide a process for the calculation of the Medical_Practice_Margin and Medical_Practice_Percent_Margin which are derived from Adjusted_Total_Collections and Adjusted_Total_Operating_Costs for the Reference Period.
Medical_Practice_Margin is calculated as follows:

Medical_Practice_Margin=Adjusted_Total_Collections−Adjusted_Total_Operating_Costs For all services provided by the medical practice during the Reference Period, Medical_Practice_Percent_Margin is calculated as follows:

$$\text{Medical\_Practice\_Percent\_Margin} = \frac{\text{Medical\_Practice\_Margin}}{\text{Adjusted\_Total\_Collections}}$$

A Process for Calculation of Paver PLM Procedure Margin, Paver Margin and Paver Percent Margin The invention can provide processes for the calculation of Payer_PLM_Procedure_Margin, Payer_Margin, and Payer_Percent_Margin which are informative measures of margins for services rendered to subscribers of a specific Payer for the Reference Period. These Payer-specific calculations represent the unique mix of services provided to Payer's subscribers, the medical practice's costs of production, the Payer's PLM fees for services, and the PLM margins on services.
The Payer_PLM_Procedure_Margin is the difference between the expected reimbursement and the cost for a particular PLM procedure. The calculation of Payer_PLM_Procedure_Margin is accomplished as follows:

Payer_PLM_Procedure_Margin=Payer_Fee−PLM_Procedure_Cost

The Payer Margin is the difference between Payer's established fees and the cost of services produced for Payer's subscribers for the Reference Period, calculated as follows:

$$\sum_{Services} \text{Payer\_PLM\_Procedure\_Margin} = \text{Payer\_Margin} = \sum_{PLM\_Procedures} \text{Volume} \cdot \text{Payer\_PLM\_Procedure\_Margin}$$

The Payer_Percent_Margin is the margin for a particular Payer for the Reference Period. The calculation of Payer Percent Margin is accomplished as follows:

$$\text{Payer\_Percent\_Margin} = \frac{\text{Payer\_Margin}}{\sum_{Services} \text{Payer\_Fee}}$$

Data Management, Data Analysis and Reporting

A Process for Data Management and Data Analysis for Medical Procedure Activity-Based Costing and Medical Procedure Margin Analysis The methodologies described for ABC and Medical Procedure Margin Analysis are supported by automated processes that have been developed utilizing SPSS application software. These processes direct the invention's data management and data analysis activities including the calculations of PLM RVUs, ABC, and Medical Procedure Margin Analysis.
The invention's major data components and functional relationships are presented in FIG. 1. The Process Module controls data management and data analysis processes that are required to accomplish the PLM RVU calculations and tabulations, ABC, and Medical Procedure Margin Analysis. The Process Module permits specification of analysis determinants such as the following: Medical Practice, Reference Period, RVU Year; Payer Fee Schedules, Payer Fee Schedule experience or adjustment, Plan identifier; Modifier adjustment weights, Type of Service, Providers, and elective labels and identifiers that enhance the interpretation or readability of reports. The Process Module integrates medical services Activity Data, RVU Data, and Financial Data to produce analyses of Procedure and Payer costs and margins. Aggregation and segregation of data are performed on numerous dimensions (e.g., specific Procedure Codes, Provider, Payer, or Type of Service).
As shown in FIG. 1, a Process Module, generally shown at 10, has a database 12 that receives input from an Activity File 14, RVU File 16, and Payer Fee File 18 as described herein. A Process Module 20 receives input from Database 12 and from Financial Data 22. Process Module 20 then outputs to Financial Data 22 and to various reports at 24 (examples of which are shown at FIGS. 2-41).

A Process for Reporting Medical Procedure Activity-Based Costing and Medical Procedure Margin Analysis Examples of typical reports produced by the invention are presented in the attached FIGS. 2 through 41. These Figures do not include all variations in analyses and reports that can be accomplished by the invention, but are intended to be illustrative of the types of reports that are representative of the invention.
As shown in the Figures, the invention produces reports, tables, graphs, and other representations of the results of the calculations, cost allocations, cost determinations, margin calculations, and related computations. Names, labels, or other identifiers are incorporated into the reports for clarification and enhanced readability.

Reports, tables, and graphs present the results of the analyses in numerous meaningful formats including, but not limited to, the following: tables, reports, and graphs of PLM RVU component and total production by total practice, Provider, Payer, Service, or Location of Service; tables and graphs of RVU payer mix analysis; Reports of procedure costs, procedure margins, and aggregate procedure margins; Tables reflecting categorical service production and categorical payer production; a "market basket" report comprised of high impact procedures based on volumes and margins designed for easy use in the analysis of insurance plan participation proposals; Reports detailing Payer PLM Procedure Margin, Payer Margin and Payer Percent Margin; additional ad hoc reports and representations utilizing the available data and calculations performed by the invention.

The description of the present invention herein is presented to enable any person skilled in the art to make and use the invention and is provided in the context of particular applications of the invention and their requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A method of analyzing medical procedure activity-based costing and margin, the method comprising:

calculating, using a computing device, Relative Value Units (RVUs) stored in a common database by including all valid services in a determination of medical practice outputs;

providing a selection of RVU weights from Centers for Medicare and Medicaid Services (CMS)-published RVU weight tables, stored in the common database, including Location of Service as an attribute of output;

associating, using the computing device, a performed medical procedure with at least one of the RVUs;

modifying, using the computing device, the at least one of the RVUs in accordance with the performed medical procedure to produce a procedure-specific, location-specific, and a modifier-adjusted (PLM) RVU value; and calculating, using the computing device, a PLM service product cost based on the PLM RVU value and a service product cost during a predetermined reference period, wherein the service product cost is a calculated cost of the performed medical procedure, the location of service defines that the medical procedure was performed at a facility or a non-facility location, and the RVUs are product-specific and location-specific, the facility location is defined as a site in which medical procedures are delivered with designations provided by the CMS, and the non-facility location is defined as a site that is not the facility location.

2. A method of analyzing medical procedure activity-based costing and margin, the method comprising:

creating an Activity File, and RVU file, and a Payer Fee file and storing the files into a common database;

analyzing the files stored in the common database with a computer processor using input from financial data;

outputting, using the computer processor, an analysis in a predetermined table or graph;

associating, using the computer processor, a performed medical procedure with at least one of the RVUs;

modifying, using the computer processor, the at least one of the RVUs in accordance with the performed medical procedure to produce a procedure-specific, location-specific, and a modifier-adjusted (PLM) RVU value; and calculating, using the computer processor, a PLM service product cost based on the PLM RVU value and a service product cost during a predetermined reference period, wherein the service product cost is a calculated cost of the performed medical procedure, the location of service defines that the medical procedure was performed at a facility or a non-facility location, and the RVUs are product-specific and location-specific, the facility location is defined as a site in which medical procedures are delivered with designations provided by the CMS, and the non-facility location is defined as a site that is not the facility location.

3. The method of claim 2, wherein said Activity File are for a designated Reference Period.

4. The method of claim 2, wherein said RVU file comprises RVU weights data.

5. The method of claim 4, wherein said RVU weights in said data comprises weights for procedures with valid modifiers or no modifiers.

6. The method of claim 5, wherein said valid modifier's weight are selected from the list comprising CMS reimbursement practices, practice's Payer-specific reimbursement experience, payer-mix weighted value, and practice studied determination of its procedure Modifier costs.

7. The method of claim 4, wherein said weights data are based on Procedure Code, Modifier, Location of Service, and RVU File.

8. The method of claim 2, wherein the Payer Fee File is based on Payer Fee Schedules.

9. The method of claim 8, wherein said Payer Fee Schedules are based on differences in geographic location, service coverage, enrollment group utilization experience, or market strategy.

10. The method of claim 2, wherein said Process Module uses said Financial Data to calculate Adjusted Total Operating Costs and Adjusted Total Collections.

11. The method of claim 10, wherein said Adjusted Total Operating Costs is Total Operating Costs (C)−Exceptional Physician Compensation (Q)−Costs not Represented (R)−Non-Reference Period Costs Recognized (U)+Reference Period Costs Not Recognized (V).

12. A non-transitory computer readable medium having a computer program stored thereon to analyze medical procedure activity-based costing and margin, the program executable by a computer and comprising:

calculating Relative Value Units (RVUs) including all valid services in a determination of medical practice outputs;

selecting of RVU weights from Centers for Medicare and Medicaid Services (CMS)-published RVU weight tables, including Location of Service as an attribute of output;

associating a performed medical procedure with at least one of the RVUs;

modifying the at least one of the RVUs in accordance with the performed medical procedure to produce a procedure-specific, location-specific, and a modifier-adjusted (PLM) RVU value; and calculating a PLM service product cost based on the PLM RVU value and a service product cost during a predetermined reference period, wherein the service product cost is a calculated cost of the performed medical procedure, the location of service defines that the medical procedure was performed at a facility or a non-facility location, and the RVUs are product-specific and location-specific, the facility location is defined as a site in which medical procedures are delivered with designations provided by the CMS, and the non-facility location is defined as a site that is not the facility location.

13. A system to analyze medical procedure activity-based costing and margin, comprising:

a common database including an Activity File, an Relative Value Unit (RVU) file, and a Payer Fee file;

a Process Module configured to access the common database and financial data input;

a table or graph outputting data representing the analyzed medical procedure activity-based costing and margin;

a non-transitory computer readable medium having a computer program stored thereon to analyze medical procedure activity-based costing and margin, the program executable by a computer and comprising:

associating a performed medical procedure with at least one of the RVUs;

modifying the at least one of the RVUs in accordance with the performed medical procedure to produce a procedure-specific, location-specific, and a modifier-adjusted (PLM) RVU value; and calculating a PLM service product cost based on the PLM RVU value and a service product cost during a predetermined reference period, wherein the service product cost is a calculated cost of the performed medical procedure, the location of service defines that the medical procedure was performed at a facility or a non-facility location, and the RVUs are product-specific and location-specific, the facility location is defined as a site in which medical procedures are delivered with designations provided by the CMS, and the non-facility location is defined as a site that is not the facility location.

\* \* \* \* \*